(12) United States Patent
Fukasawa et al.

(10) Patent No.: US 7,064,900 B2
(45) Date of Patent: Jun. 20, 2006

(54) OPTICAL PICKUP DEVICE AND OPTICAL DISK DEVICE AND OPTICAL DEVICE AND COMPOSITE OPTICAL ELEMENT

(75) Inventors: Norio Fukasawa, Kanagawa (JP); Junichi Suzuki, Kanagawa (JP); Kiyoshi Toyota, Tokyo (JP); Tetsu Tanaka, Tokyo (JP); Takeshi Kubo, Kanagawa (JP); Masahiro Saito, Kanagawa (JP); Satoru Ishii, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/492,657

(22) PCT Filed: Nov. 19, 2002

(86) PCT No.: PCT/JP02/12079

§ 371 (c)(1),
(2), (4) Date: Apr. 14, 2004

(87) PCT Pub. No.: WO03/044784

PCT Pub. Date: May 30, 2003

(65) Prior Publication Data

US 2005/0088951 A1    Apr. 28, 2005

(30) Foreign Application Priority Data

Nov. 22, 2001 (JP) ............................. 2001-358244

(51) Int. Cl.
*G02B 27/10* (2006.01)
*G11B 7/00* (2006.01)
*G11B 7/135* (2006.01)

(52) U.S. Cl. ................. 359/618; 369/112.01
(58) Field of Classification Search ............... 359/618; 369/112.01, 112.04, 44.14, 44.23
See application file for complete search history.

(56) References Cited

U.S. PATENT DOCUMENTS 5,029,154 A * 7/1991 Sumi et al. .............. 369/44.23
5,044,718 A * 9/1991 Kando .......................... 385/4
5,253,537 A * 10/1993 Tomita et al. ........... 73/861.17

(Continued)

FOREIGN PATENT DOCUMENTS

JP      08124189 A * 5/1996

(Continued)

OTHER PUBLICATIONS

International Search Report dated Feb. 25, 2003.

*Primary Examiner*—Alicia M Harrington
(74) *Attorney, Agent, or Firm*—Rader, Fishman & Grauer PLLC; Ronald P. Kananen

(57) ABSTRACT

An optical pickup device is provided which includes a first diffraction grating (45) that splits a light beam emitted from a light-emitting/-detecting element (31) into a zero-order light beam and positive and negative first-order light beams, a second diffraction grating (46) that diffracts return light from an optical disk (2) for traveling along a light path separate from that of the outgoing light, and a third diffraction grating (47) that corrects the deviation of the light path by diffracting the positive first-order light beam diffracted by the second diffraction grating (46). The light-emitting/-detecting element (31) provides a focusing error signal FE by detecting the negative first-order light beam, and a tracking error signal by detecting return portions of the positive and negative first-order light beams from the first diffraction grating (45).

20 Claims, 27 Drawing Sheets

U.S. PATENT DOCUMENTS 5,481,386 A * 1/1996 Shimano et al. ......... 369/44.12
5,515,353 A * 5/1996 Miyazaki et al. ...... 369/112.04
6,208,596 B1 * 3/2001 Imai et al. ............... 369/44.23
6,212,150 B1 * 4/2001 Inoue et al. ........... 369/112.04
6,868,055 B1 * 3/2005 Ueyama et al. ........ 369/112.15

FOREIGN PATENT DOCUMENTS

JP          11-134700 A        5/1999

* cited by examiner

FE>0

FE=0

FE<0

FE>0

FE=0

FE<0

OPTICAL PICKUP DEVICE AND OPTICAL DISK DEVICE AND OPTICAL DEVICE AND COMPOSITE OPTICAL ELEMENT

TECHNICAL FIELD

The present invention relates to an optical pickup device used to write and read information optically to and from an optical disk to and from which information is optically written and read, such as magneto-optical disk, phase-change optical disk or the like, and an optical disk drive using the optical pickup device, and also to an optical device used in these optical pickup device and optical disk drive, and a composite optical element having the optical device formed integrally therein.

This application claims the priority of the Japanese Patent Application No. 2001-358244 filed on Nov. 22, 2001, the entirety of which is incorporated by reference herein.

BACKGROUND ART

Conventionally, optical pickup devices are known that are used to write and read information optically to and from an optical disk to and from which information is optically written and read, such as magneto-optical disk, phase-change optical disk or the like.

As a typical one of the optical pickup devices of the above type, below a conventional optical pickup device including an optical system will be described below, generally indicated with a reference 201 and configured as in FIG. 1. As shown in FIG. 1, the optical system 201 includes, in the order following the light path, a light source 211 that emits a laser beam for irradiation to an optical disk 204 set in place, a composite optical element 212 including a three-beam generating diffraction grating 212a that splits, by diffraction, the light emitted from the light source 211 into three beams and a beam-splitter diffraction grating 212b that separates the outgoing light and return light from the optical disk 204 from each other, a limiting aperture 214 that limits the outgoing light to a predetermined numerical aperture NA, an objective lens 215 that focuses the outgoing light onto the optical disk 204, and a photodetector assembly 216 that detects the return light from the optical disk 204. It should be noted here that the "laser beam emitted from the light source" or "light emitted from the light source" will also be referred to as "outgoing light" wherever appropriate hereinafter.

The above light source 211 uses a semiconductor laser which emits a laser beam. The composite optical element 212 is an integral combination of the three-beam generating diffraction grating 212a and beam-splitter diffraction grating 212b. The three-beam generating diffraction grating 212a splits, by diffraction, the light beam emitted from the light source 211 into three beams including a zero-order light beam and positive and negative first-order light beams to provide a tracking error signal by the so-called three-beam method. The beam-splitter diffraction grating 212b splits, by diffraction, return light from the optical disk 204 into a zero-order light beam and positive and negative first-order light beams and separates, from the outgoing light, the positive first-order light beam, for example, as return light to be directed to the photodetector assembly 216.

The photodetector assembly 216 includes a main-beam photodetector 221, shown in FIGS. 2A, 2B and 2C, that detects a zero-order light beam as a result of the splitting, by diffraction, of the return light by the three-beam generating diffraction grating 212a, and a pair of side-beam photodetectors (not shown) that detect positive and negative first-order light beams, respectively, resulted from the splitting, by diffraction, of the return light by the three-beam generating diffraction grating 212a.

The optical system 201 uses the so-called astigmatism to provide a focusing error signal. On this account, a main-beam photodetector 221 included in the photodetector assembly 216 has a generally square light-detecting surface whose split pattern is quadrisected into four light-detecting areas $a_5$, $b_5$, $c_5$ and $d_5$ by a set of parting lines passing by the center of the light-detecting surface and perpendicular to each other as shown in FIGS. 2A, 2B and 2C. The light-detecting surface detects return light from the optical disk 204. The side-beam photodetectors (not shown) are disposed across the main-beam photodetector 221 oppositely to each other.

In the optical system 201, optical parts are disposed along the forward light path from the light source 211 to the optical disk 204 in such a manner that an image point being a conjugate point of the light-emitting point, as object point, of the light source 211 will be positioned on a recording layer 205 in the optical disk 204, as shown in FIG. 1. Also, in the optical system 201, the optical parts are disposed along the backward light path from the optical disk 204 to the photodetector assembly 216 in such a manner that the image point being a conjugate point of a point, as object point, on the recording layer 205 in the optical disk 204 will be positioned on the light-detecting surface of the main-beam photodetector 221 of the photodetector assembly 216.

Therefore, in the optical system 201, the light-emitting point of the light source 211 is also in a conjugate relation with the point on the light-detecting surface of the main-beam photodetector 221 of the photodetector assembly 216.

A focusing error signal is provided by the light-detecting areas $a_5$, $b_5$, $c_5$ and $d_5$ of the above-mentioned main-beam photodetector 221 as will be described below.

First, when the objective lens 215 is placed in an optimum position, namely, in a so-called just-in-focus position, in relation to the recording layer 205 in the optical disk 204, a beam spot defined on the light-detecting surface of the main-beam photodetector 221 will be circular as shown in FIG. 2B.

However, if the objective lens 215 is excessively close to the recording layer 205 in the optical disk 204, it will be off the just-in-focus position, and return light split by the beam-splitter diffraction grating 212b and passing by the composite optical element 212 will cause astigmatism that will cause the beam spot defined on the light-detecting surface of the main-beam photodetector 221 to have the form of an ellipse whose major axis extends over the light-detecting areas $a_5$ and $c_5$ as shown in FIG. 2A.

Further, if the objective lens 215 is excessively apart from the recording layer 205 in the optical disk 204, it will be off the just-in-focus position, and return light split by the beam-splitter diffraction grating 212b and passing by the composite optical element 212 will cause astigmatism that will cause the beam spot defined on the light-detecting surface of the main-beam photodetector 221 to have the form of an ellipse whose major axis extends over the light-detecting areas $b_5$ and $d_5$ as shown in FIG. 2C, namely, an ellipse whose major axis is inclined 90 deg. in relation to that of the beam spot shown in FIG. 2A.

Given that return-light detection outputs from the light-detecting areas $a_5$, $b_5$, $c_5$ and $d_5$ of the main-beam photodetector 221 are $Sa_5$, $Sb_5$, $Sc_5$ and $Sd_5$, respectively, a focusing error signal FE can be calculated using the following formula (1):

$$FE = (Sa_5 + Sc_5) - (Sb_5 + Sd_5) \qquad (1)$$

More specifically, in the main-beam photodetector 221, when the objective lens 215 is in the in-focus position, namely, in the so-called just-in-focus position, as shown in FIG. 2B, the focusing error signal FE given by the formula (1) will be zero.

Also in the main-beam photodetector 221, if the objective lens 215 is excessively close to the recording layer 205 in the optical disk 204, the focusing error signal FE will be positive. On the contrary, if the objective lens 215 is excessively apart from the recording layer 205 in the optical disk 204, the focusing error signal FE will be negative.

A tracking error signal TE is provided by calculating a difference between outputs from the side-beam photodetectors having detected positive and negative first-order light beams, respectively, from the three-beam generating diffraction grating 212a.

In the optical pickup device using the optical system 201 configured as above, the objective lens 215 is moved to the in-focus position in relation to the recording layer 205 in the optical disk 204 according to the focusing error signal FE from the main-beam photodetector 221 of the photodetector assembly 216 and tracking error signal TE from the side-beam photodetectors, the outgoing light is focused on the recording layer 205 in the optical disk 204 and information is read from the optical disk 204.

Note here that generally, the light source 211, such as semiconductor laser, emits light whose wavelength depends upon the ambient temperature. Given that the ambient temperature is T, the wavelength of the laser beam emitted from the semiconductor laser at the ambient temperature T can be expressed approximately as given by the following formula (2):

$$\lambda_T = \lambda_0 + c \cdot \Delta T \quad (2)$$

where $\lambda_T$ is a wavelength of light emitted at the ambient temperature T, $\lambda_0$ is a wavelength at the normal temperature, $\Delta T$ is a temperature deviation from the normal temperature, and c is a temperature coefficient.

Also, in case the laser beam is incident at an angle $\theta$ upon the diffraction grating such as the aforementioned beam-splitter diffraction grating 212b in which it is diffracted at an angle $\theta'$, the relation between the incident angle $\theta$ and diffraction angle $\theta'$ can be expressed as given by the following formula (3):

$$n' \cdot \sin \theta' - n \cdot \sin \theta = m \cdot \lambda / d \quad (3)$$

where $\lambda$ is the wavelength of the laser beam, d is the grating constant of the diffraction grating, m is the grating order of the diffraction grating, n is the refractive index of incident-side medium of the diffraction grating and n' is the refractive index of an outgoing-side medium of the diffraction grating.

In the aforementioned optical system 201, since the beam-splitter diffraction grating 212b of the composite optical element 212 diffracts return light with a refractive index of n=1 at an incident angle of $\theta=0$ with respect to the main beam, the following formula (4) can be derived from the formula (3) on the assumption that the diffraction order m is +1:

$$n' \cdot \sin \theta' = \lambda / d \quad (4)$$

In case the ambient temperature around the optical system 201 varies, the following formula (5) can be provided by placing formula (2) in formula (4) with the diffraction angle at the ambient temperature T being taken as $\theta'_T$:

$$n' \cdot \sin \theta'_T = (\lambda_0 + c \cdot \Delta T)/d \quad (5)$$

Further, the following formula (6) can be derived from the above formula (5) with the diffraction angle at the normal temperature given as $\theta'_0$:

$$n' \cdot \sin \theta'_T = n' \cdot \sin \theta'_0 + c \cdot \Delta T / d \quad (6)$$

Based on the above formula (6), the diffraction angle $\theta'_T$ at the ambient temperature T can be expressed as given by the following formula (7):

$$\theta'_T = \theta'_0 + \sin^{-1}((c \cdot \Delta T)/(d \cdot n')) \quad (7)$$

It is known from the above formula (7) that the diffraction angle $\theta'_T$ of return light at the ambient temperature T depends upon the deviation $\Delta T$ from the normal temperature, that is, on the ambient temperature around the optical system 201.

The optical pickup device is produced at the normal temperature. Therefore, the position of the photodetector assembly 216 is adjusted on the assumption that return light is diffracted at an angle $\theta'_0$. However, if the ambient temperature varies after the position of the photodetector assembly 216 is adjusted, the return light will be diffracted at an angle that varies as given by the formula (7), and the center of a beam spot defined on the light-detecting surface of the main-beam photodetector 221 of the photodetector assembly 216 will be off a predetermined position as shown in FIG. 3.

In the aforementioned optical system 201 provided in the optical pickup device, when the photodetector assembly 216 provides a focusing error signal FE, if the center of a beam spot defined on the light-detecting surface of the mea-beam photodetector 221 is even slightly off that of the main-beam photodetector 221 in any direction, the output from the main-beam photodetector 221, which would be when the objective lens 215 is in the just-in-focus position, will not be zero. Consequently, the focusing error signal FE will be offset.

As above, in the optical pickup device, since the focus is controlled to obtain a focusing error signal FE equal to zero, the objective lens 215 cannot be driven to move precisely to any in-focus position.

In the optical pickup device including the optical block allowing light to pass through as above, astigmatism caused in the optical block will cause return light not to be appropriately collected to a desired position, so that the beam spot incident upon the light-detecting surface of the main-beam photodetector 221 of the photodetector assembly 216 will not have any appropriate generally circular form.

Also in this case, any focusing error signal FE cannot appropriately be provided in the optical pickup device.

DISCLOSURE OF THE INVENTION

Accordingly, the present invention has an object to overcome the above-mentioned drawbacks of the related art by providing an optical pickup device and optical disk drive, in which return light from an optical disk can be directed to an appropriate position to provide a more reliable focusing error signal, and an optical device and composite optical element, used in the optical pickup device and optical disk drive.

The present invention has another object to provide an optical pickup device and optical disk drive, in which return light from an optical disk is inhibited from being deformed in beam-spot form due to astigmatism taking place in an optical system to provide a more reliable focusing error signal, and an optical device and composite optical element, used in the optical pickup device and optical disk drive.

The above object can be attained by providing an optical pickup device including according to the present invention:

a light source that emits light having a predetermined wavelength;

an objective lens that focuses the light beam emitted from the light source onto an optical disk and collects return light from the optical disk;

a composite optical element including a diffraction element that allows the light beam emitted from the light source to pass through, while diffracting the return light from the optical disk, and a light-path deviation correcting means disposed in a position where the return light diffracted by the diffraction element is incident to correct a light-path deviation of the return light, caused in the diffraction element by a variation in wavelength of the light beam emitted from the light source and direct the return light to a predetermined position; and a light-detecting means for detecting, at a plurality of light-detecting areas thereof, the return light having the light-path deviation thereof corrected by the light-path deviation correcting means.

In the optical pickup device configured as above according to the present invention, the light beam emitted from the light source is focused by the objective lens onto the optical disk, and the return light from the optical disk is diffracted by the diffraction element included in the composite optical element to travel along a light path separate from that along which the outgoing light travels. Also in the optical pickup device, a light-path deviation of the return light, caused in the diffraction element by a variation in wavelength of the light beam emitted from the light source, is corrected by the light-path deviation correcting means to direct the return light to a predetermined position on the light-detecting means, and the return light directed to the predetermined position is detected at the plurality of light-detecting areas of the light-detecting means, to thereby provide an appropriate focusing error signal.

Also the above object can be attained by providing an optical pickup device including according to the present invention:

a light source that emits light having a predetermined wavelength;

a beam splitter that makes the light beam emitted from the light source travel along a light path and return light from an optical disk travel along another light path, and corrects astigmatism on the light path of the return light;

an objective lens that focuses the light beam emitted from the light source onto the optical disk and collects the return light from the optical disk;

a return-light splitting means disposed in a position where the return light split by the beam splitter is incident to split the return light into a plurality of beams; and a light-detecting means for detecting, at a plurality of light-detecting areas thereof, the plurality of beams resulted from splitting of the return light by the return-light splitting means, the return-light splitting means being a prism having a plurality of flat or curved surfaces.

In the optical pickup device configured as above according to the present invention, the light beam emitted from the light source is directed to the optical disk, return light from the optical disk is made, by the beam splitter, to travel along a light path different from that of the outgoing light, and the astigmatism of the return light is appropriately corrected to adjust the beam shape of the return light incident upon the return-light splitting means.

Also the above object can be attained by providing an optical disk drive including an optical pickup that writes and/or reads information to and/or from an optical disk, and a disk rotation driving means that drives to rotate the optical disk, the optical pickup including according to the present invention:

a light source that emits light having a predetermined wavelength;

an objective lens that focuses the light beam emitted from the light source onto the optical disk and collects return light from the optical disk;

a composite optical element including a diffraction element that allows the light beam emitted from the light source to pass through, while diffracting the return light from the optical disk, and a light-path deviation correcting means disposed in a position where the return light diffracted by the diffraction element is incident to correct a light-path deviation of the return light, caused in the diffraction element by a variation in wavelength of the light beam emitted from the light source, and direct the return light to a predetermined position; and a light-detecting means for detecting, at a plurality of light-detecting areas thereof, the return light having the light-path deviation thereof corrected by the light-path deviation correcting means.

In the optical disk drive configured as above according to the present invention, the optical disk is rotated by the disk rotation driving means and information is written and/or read to and/or from the optical disk by the optical pickup device. During this operation of information write or read, the light beam emitted from the light source is focused onto the optical disk by the objective lens, and the return light from the optical disk is diffracted by the diffraction element included in the composite optical element to travel along a light path separate from that of the outgoing light. Also in the optical pickup device included in the optical disk drive, a light-path deviation of the return light, caused in the diffraction element by a variation in wavelength of the light beam emitted from the light source, is corrected by the light-path deviation correcting means to direct the return light to a predetermined position on the light-detecting means, and the return light directed to the predetermined position is detected at the plurality of light-detecting areas of the light-detecting means, to thereby provide an appropriate focusing error signal.

Also the above object can be attained by providing an optical disk drive including an optical pickup that writes and/or reads information to and/or from an optical disk, and a disk rotation driving means that drives to rotate the optical disk, the optical pickup including according to the present invention:

a light source that emits light having a predetermined wavelength;

a beam splitter that makes the light beam emitted from the light source travel along a light path and return light from the optical disk travel along another light path, and corrects astigmatism on the light path of the return light;

an objective lens that focuses the light beam emitted from the light source onto the optical disk and collects the return light from the optical disk;

a return-light splitting means disposed in a position where the return light split by the beam splitter is incident to split the return light into a plurality of beams; and a light-detecting means for detecting, at a plurality of light-detecting areas thereof, the plurality of beams resulted from splitting of the return light by the return-light splitting means, the return-light splitting means being a prism having a plurality of flat or curved surfaces.

In the optical disk drive configured as above according to the present invention, the light beam emitted from the light source is directed to the optical disk, return light from the optical disk is made, by the beam splitter, to travel along a light path different from that of the light beam emitted from the light source, and the astigmatism of the return light is appropriately corrected to adjust the beam shape of the return light incident upon the return-light splitting means.

Also the above object can be attained by providing an optical device including according to the present invention:

a diffraction element that allows light emitted from the light source to pass through, while diffracting return light from an optical disk; and a light-path deviation correcting means disposed in a position where the return light diffracted by the diffraction element is incident to correct a light-path deviation of the return light, caused in the diffraction element by a variation in wavelength of the light beam emitted from the light source, and direct the return light to a predetermined position.

In the above optical device, the light beam emitted from the light source is directed to the optical disk, return light from the optical disk is diffracted by the diffraction element to travel along a light path different from that of the outgoing light, and a light-path deviation of the return light, caused in the diffraction element by a variation in wavelength of the light beam emitted from the light source, is corrected by the light-path deviation correcting means, to thereby direct the return light to an appropriate position on the light-detecting means having a plurality of light-detecting areas for providing a focusing error signal for use in an optical pickup device.

Also the above object can be attained by providing an optical device including according to the present invention:

a beam splitter that makes light emitted from the light source travel along a light path and return light from an optical disk travel along another light path, and corrects astigmatism on the light path of the return light; and a return-light splitting means disposed in a position where the return light split by the beam splitter is incident to split the return light into a plurality of beams, and direct the plurality of beams to a light-detecting means having a plurality of light-detecting areas, the return-light splitting means being a prism having a plurality of flat or curved surfaces.

In the optical device configured as above, the light beam emitted from the light source is directed to the optical disk, return light from the optical disk is made by the beam splitter to travel along a light path different from that of the outgoing light, and astigmatism of the return light is appropriately corrected to adjust the beam shape of the return light incident upon the return-light splitting means.

Also the above object can be attained by providing a composite optical element including according to the present invention:

a diffraction element that allows light emitted from a light source to pass through, while diffracting return light from an optical disk; and a light-path deviation correcting means disposed in a position where the return light diffracted by the diffraction element is incident to correct a light-path deviation of the return light, caused in the diffraction element by a variation in wavelength of the light beam emitted from the light source, and direct the return light to a predetermined position.

In the above composite optical element, the light beam emitted from the light source is directed to the optical disk, return light from the optical disk is diffracted by the diffraction element to travel along a light path different from that of the outgoing light, and the light-path deviation of the return light, caused in the diffraction element by a variation in wavelength of the light beam emitted from the light source, is corrected by the light-path deviation correcting means, to thereby direct the return light to an appropriate position on the light-detecting means having a plurality of light-detecting areas for providing a focusing error signal for use in an optical pickup device.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 2A to 2C show together a beam spot in each light-detecting surface of a main-beam photodetector provided in the optical system included in the conventional optical pickup device, in which FIG. 2A shows a beam spot formed when the objective lens is close to the optical disk, FIG. 2B shows a beam spot formed when the objective lens is in the in-focus position and FIG. 2C shows a beam spot formed when the objective lens is apart from the optical disk.

FIGS. 10A to 10C show together a beam spot in each light-detecting surface of the main-beam photodetector provided in the optical pickup according to the present invention, in which FIG. 10A shows a beam spot formed when the objective lens is close to the optical disk, FIG. 10B shows a beam spot formed when the objective lens is in the in-focus position and FIG. 10C shows a beam spot formed when the objective lens is apart from the optical disk.

FIGS. 17A to 17C show together diffracted light incident upon the beam-splitting prism included in the composite optical element in the optical pickup in FIG. 11, in which FIG. 17A shows incident diffracted light when the objective lens is close to the optical disk, FIG. 17B shows incident diffracted light when the objective lens is in the in-focus position and FIG. 17C shows incident diffracted light when the objective lens is apart from the optical disk.

FIGS. 18A to 18C show together the beam spot on each light-detecting surface of the main-beam photodetector provided in the optical pickup in FIG. 11, in which FIG. 18A shows a beam spot formed when the objective lens is close to the optical disk, FIG. 18B shows a beam spot formed when the objective lens is in the in-focus position and FIG. 18C shows a beam spot formed when the objective lens is apart from the optical disk.

FIGS. 23A to 23C show together diffracted light incident upon the beam-splitting prism included in the composite optical element in the optical pickup in FIG. 19, in which FIG. 23A shows incident diffracted light when the objective lens is close to the optical disk, FIG. 23B shows diffracted light incident when the objective lens is in the in-focus position and FIG. 23C shows incident diffracted light when the objective lens is apart from the optical disk.

FIGS. 24A to 24C show together a beam spot on each light-detecting surface of the main-beam photodetector provided in the optical pickup in FIG. 19, in which FIG. 24A shows a beam spot formed when the objective lens is close to the optical disk, FIG. 24B shows a beam spot formed when the objective lens is in the in-focus position and FIG. 24C shows a beam spot formed when the objective lens is apart from the optical disk.

FIGS. 33A to 33C show together diffracted light incident upon the beam-splitting prism included in the composite optical element in the optical pickup device in FIG. 28, in which FIG. 33A shows incident diffracted light when the objective lens is close to the optical disk, FIG. 33B shows incident diffracted light when the objective lens is in the in-focus position and FIG. 33C shows incident diffracted light when the objective lens is apart from the optical disk.

FIGS. 34A to 34C show together a beam spot on each light-detecting surface of the main-beam photodetector provided in the optical system of the optical pickup in FIG. 28, in which FIG. 34A shows a beam spot formed when the objective lens is close to the optical disk, FIG. 34B shows a beam spot formed when the objective lens is in the in-focus position and FIG. 34C shows a beam spot formed when the objective lens is apart from the optical disk.

BEST MODE FOR CARRYING OUT THE INVENTION

The present invention will be described in detail concerning the optical disk drive as an embodiment thereof with reference to the accompanying drawings.

Figure 1:
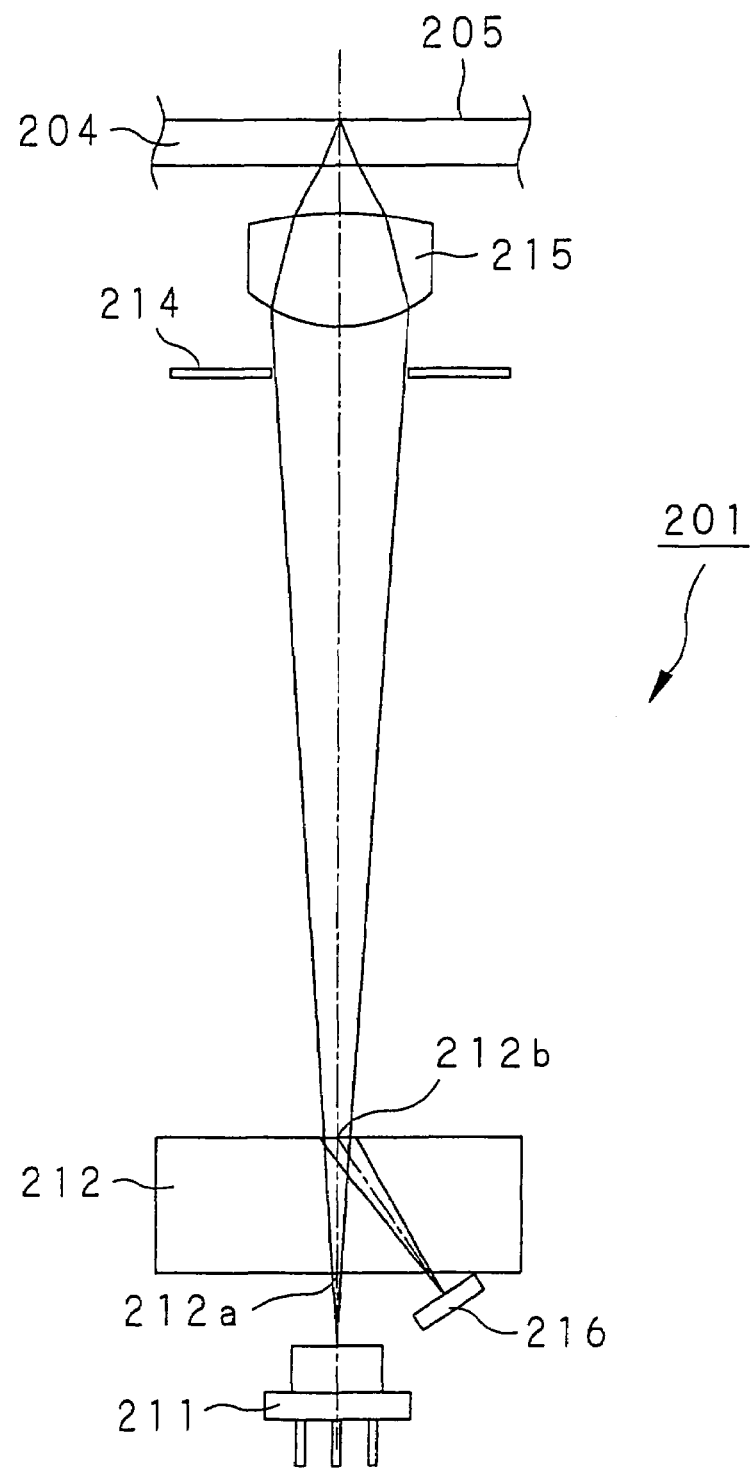
FIG. 1 is a schematic side elevation of the optical system included in the conventional optical pickup device.
Figure 2A:
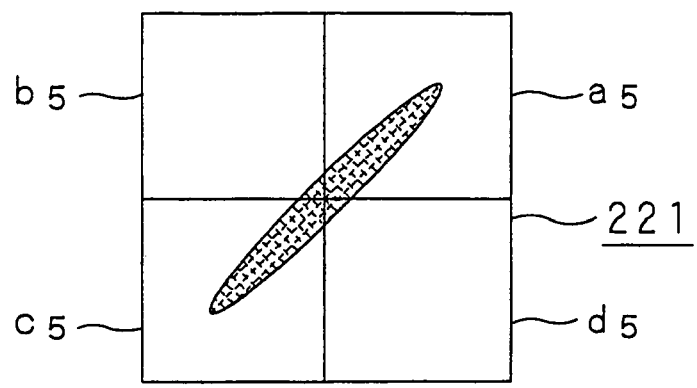
Figure 2B:
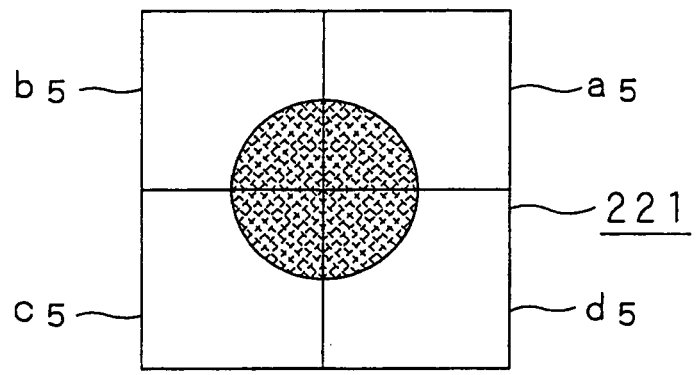
Figure 2C:
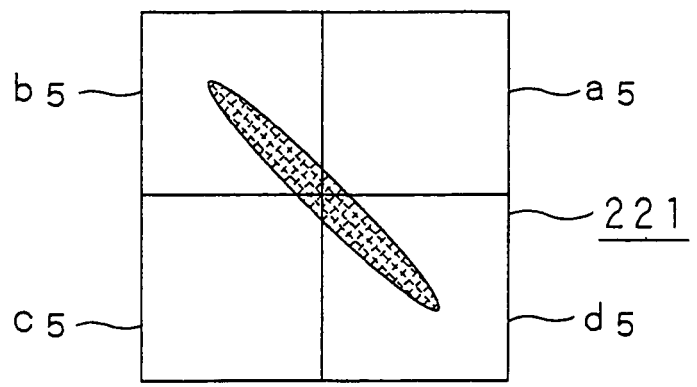
Figure 3:
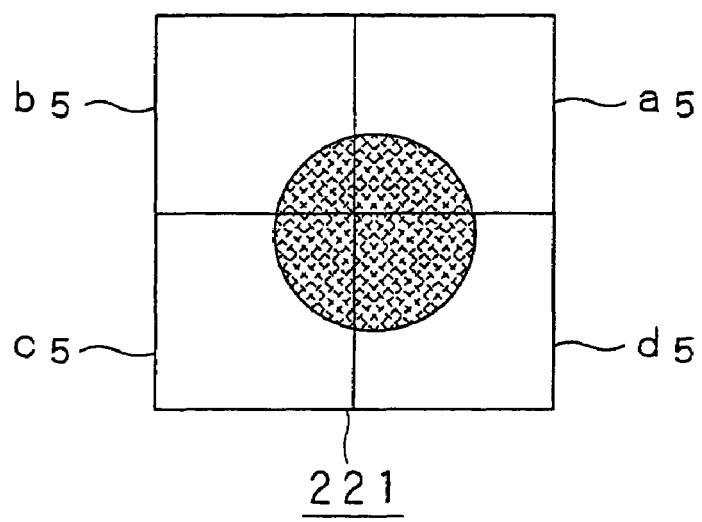
FIG. 3 illustrates a beam spot whose center is off that of the light-detecting surface of the main-beam photodetector in the conventional optical system.
Figure 4:
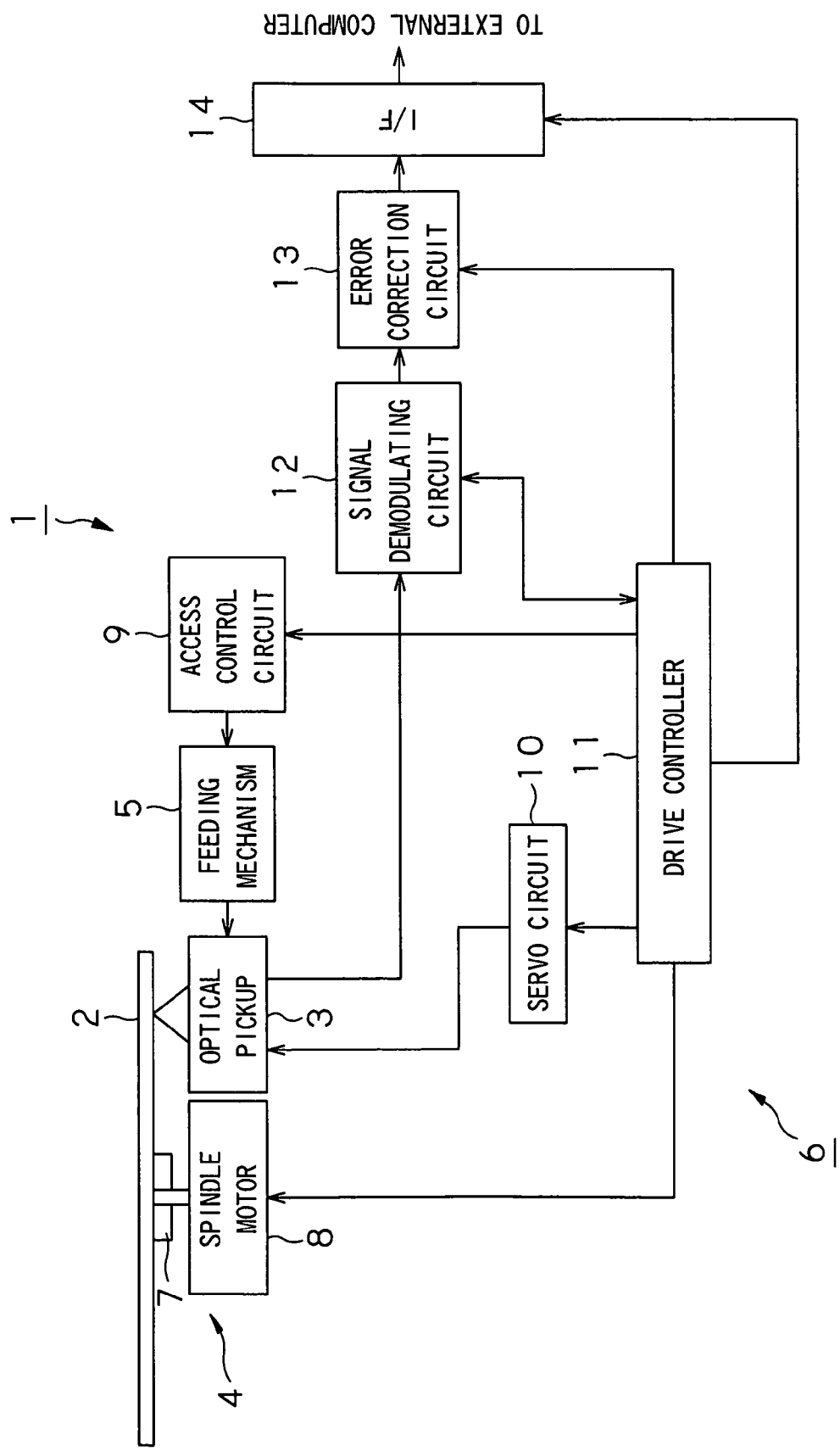
FIG. 4 is a schematic block diagram of an optical disk drive according to the present invention.

FIG. 4 schematically illustrates the optical disk drive according to the present invention in a block diagram form. The optical disk drive is generally indicated with a reference 1. The optical disk drive 1 writes and reads information to and from an optical disk 2 such as CD (compact disk), DVD (digital versatile disk), CD-R (recordable CD), CD-RW (rewritable CD), magneto-optical disk or the like.

According to the present invention, the optical disk drive 1 includes an optical pickup 3 that writes and reads information to and from the optical disk 2, a disk rotation driving mechanism 4 that drives to rotate the optical disk 2, a feeding mechanism 5 that moves the optical pickup 3 radially with respect to the optical disk 2, and a controller 6 that controls the optical pickup 3, disk rotation driving mechanism 4 and feeding mechanism 5.

The above disk rotation driving mechanism 4 includes a disk table 7 on which the optical disk 2 is mounted, and a spindle motor 8 to rotate the disk table 7. The feeding mechanism 5 includes a support base (not shown) to support the optical pickup 3, main and sub shafts (not shown) to support the support base movably, and a sled motor (not shown) to move the support base.

As shown in FIG. 4, the controller 6 includes an access control circuit 9 that drives the feeding mechanism 5 to control the position of the optical pickup 3 in the radial direction of the optical disk 2, a servo circuit 10 to control a biaxial actuator of the optical pickup 3, and a drive controller 11 to control these access control circuit 9 and servo circuit 10. The controller 6 further includes a signal demodulation circuit 12 that demodulates signals from the optical pickup 3, an error correction circuit 13 that corrects errors of the demodulated signals, and an interface 14 that outputs the error-corrected signals to an external apparatus such as computer or the like.

In the optical disk drive 1 configured as above, the disk table 7 having an optical disk 2 mounted thereon is driven by the spindle motor 8 of the disk rotation driving mechanism 4, the feeding mechanism 5 is driven according to a control signal supplied from the access control circuit 9 in the controller 6, and the optical pickup 3 is moved to a position corresponding to a desired recording track on the optical disk 2, to thereby write or read information to or from the optical disk 2.

Figure 5:
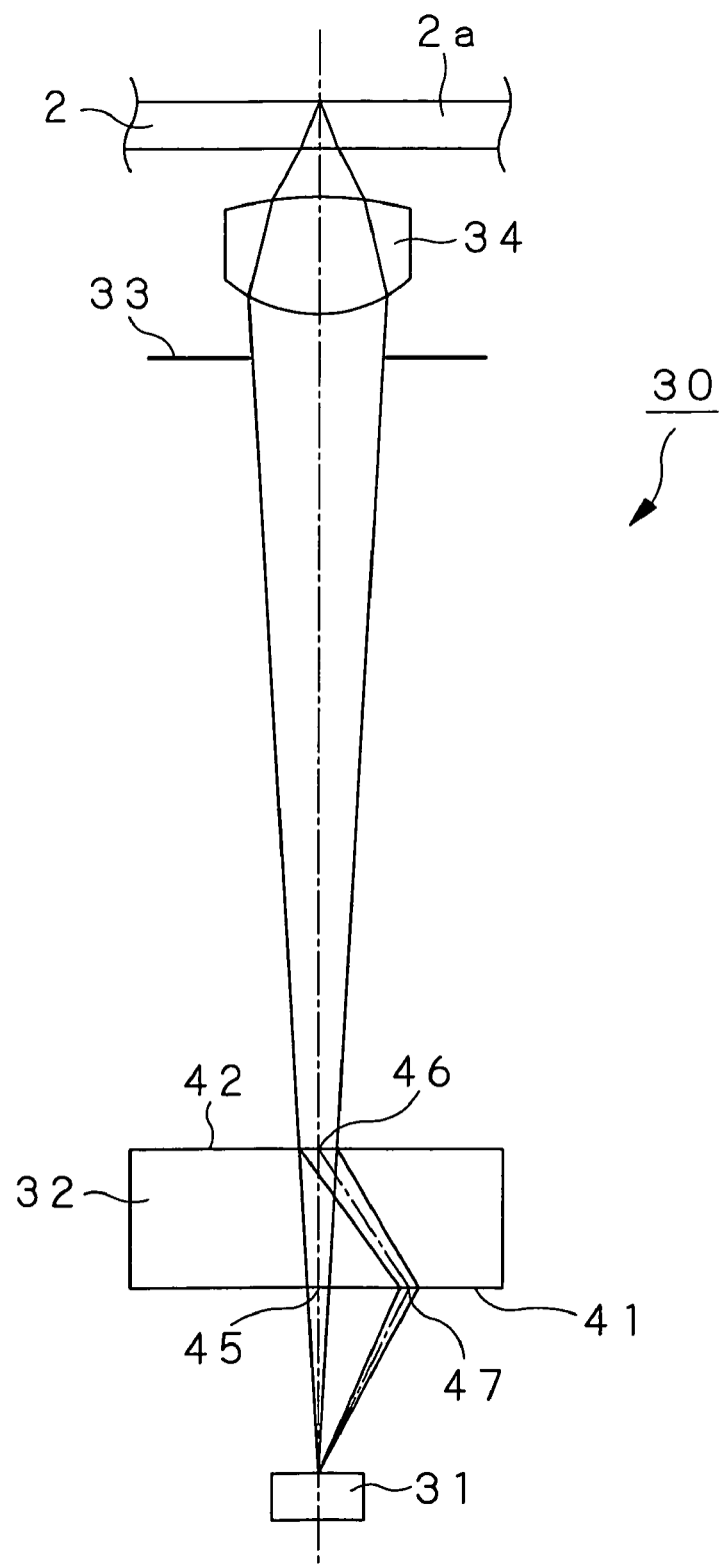
FIG. 5 is a schematic side elevation of an optical system included in the optical disk drive according to the present invention.

The above optical pickup 3 will be described in detail herebelow:

As shown in FIG. 5 for example, the optical pickup 3 includes an optical system 30 that reads information from the optical disk 2, and a lens driving mechanism (not shown) that moves an objective lens (will be described in detail later) included in the optical system 30.

The optical system 30 included in the optical pickup 3 includes, in the order following the light path, a light-emitting/-detecting element 31 which is an integral combination of a light source that emits a laser beam and a light-detecting element to detect return light from the optical disk 2, a composite optical element 32 that splits the light beam emitted from the light-emitting/-detecting element 31 and separates the return light from the optical disk 2 from the light beam emitted from the light-emitting/-detecting element 31, a limiting aperture 33 that limits the light beam emitted from the light-emitting/-detecting element 31 and passing by the composite optical element 32 to a predetermined numerical aperture NA, and an objective lens 34 that focuses the outgoing light limited by the limiting aperture 33 onto a recording layer 2a in the optical disk 2. It should be noted that the "laser beam emitted from the light-emitting/-detecting element" or "light emitted from the light-emitting/-detecting element" will be referred to as "outgoing light" wherever appropriate hereinafter.

In the light-emitting element/light-detecting element 31, the light-emitting block, is a semiconductor laser that emits a laser beam having a wavelength of about 780 nm, and the light-detecting block is a photodetector whose light-detecting area is divided as will be described in detail later.

Figure 6:
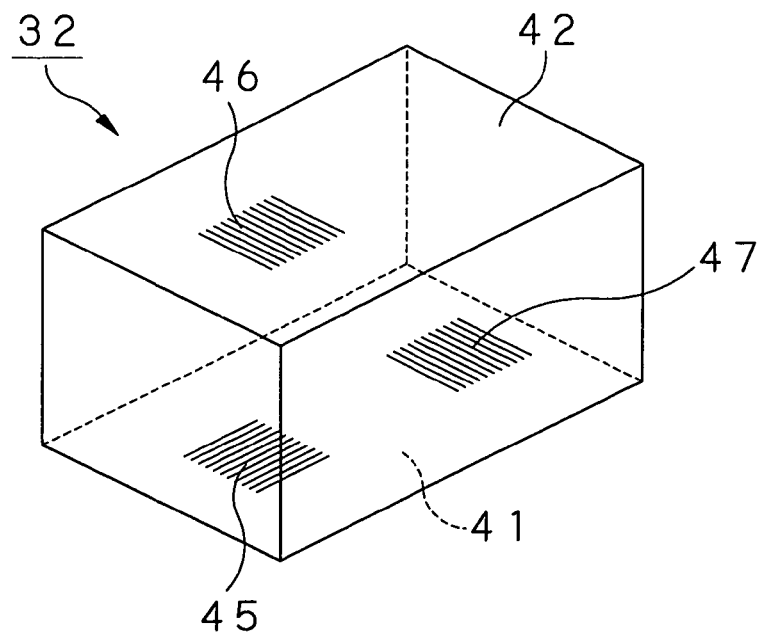
FIG. 6 is a perspective view of a composite optical element provided in the optical system of the optical pickup according to the present invention.
Figure 7:
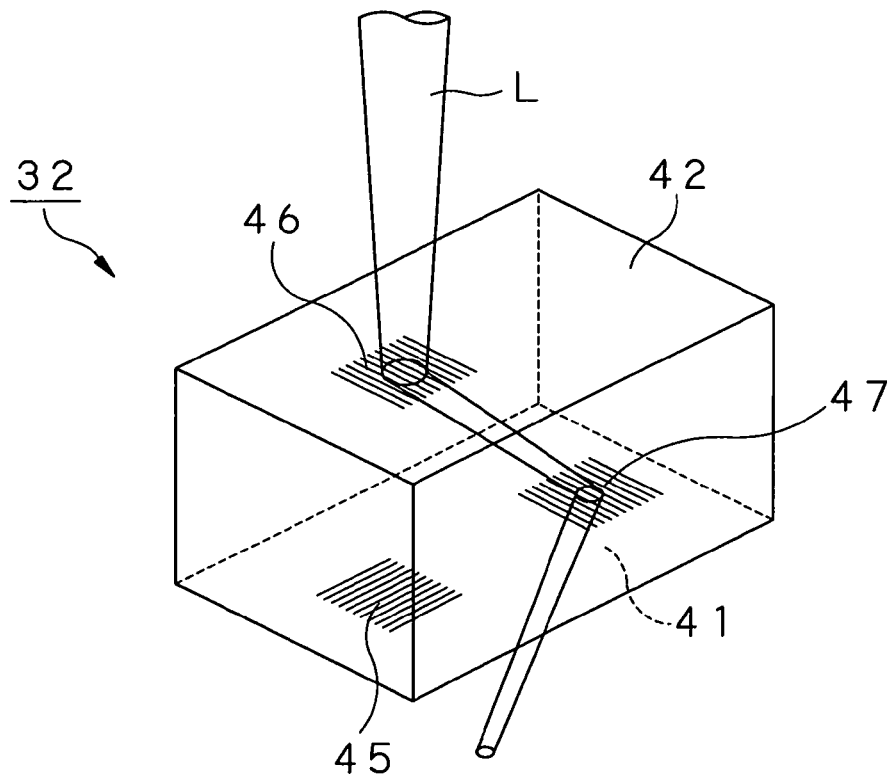
FIG. 7 is a perspective view of the composite optical element provided in the optical system of the optical pickup according to the present invention, showing the light path along which the return light travels in the composite optical element.

The above composite optical element 32 is formed by injection molding of a resin material, for example, to have a block-like shape formed from a first surface 41 that faces the light-emitting/-detecting element 31 and is perpendicular to the optical axis of the light beam emitted from the light-emitting/-detecting element 31, and a second surface 42 parallel to the first surface 41 as shown in FIGS. 5 to 7.

On the first surface 41, a first diffraction grating 45 is provided that splits the light beam emitted from the light-emitting/-detecting element 31 into three beams including a zero-order light beam and positive and negative first-order light beams. The optical system 30 adopts the so-called three-spot method (three-beam method) to provide a tracking error signal TE. It provides a tracking servo control by detecting, by the light-emitting/-detecting element 31, the positive and negative first-order light beams resulted from the light splitting by the first diffraction grating 45, and detecting a difference between the positive and negative first-order light beams outputs.

On the second surface 42, a second diffraction grating 46 is provided that diffracts the zero-order light beam and positive and negative first-order light beams, resulted from splitting of the return light from the optical disk 2 by the first diffraction grating 45, further splits, by diffraction, the zero-order light beam and positive and negative first-order light beams into a zero-order light beam and positive and negative first-order light beams, and makes the positive first-order light beam, for example, as return light travel along a light path separate from that of the outgoing light.

Further on the first surface 41, a third diffraction grating 47 is provided. The third diffraction grating 47 is disposed on the light path of the return light having the light path thereof separated by the second diffraction grating 46 from that of the outgoing light to split, by diffraction, the return light into a zero-order light beam and positive and negative first-order light beams, and direct the negative first-order light beam, for example, to the light-emitting/-detecting element 31. The third diffraction grating 47 is disposed adjacent to one side of the first diffraction grating 45 in the same plane.

The composite optical element 32 imparts a predetermined extent of astigmatism to the return light incident upon the third diffraction grating 47 when the return light having the light path thereof separated by the second diffraction grating 46 from that of the outgoing light passes by the composite optical element 32. The composite optical element 32 can easily adjust defocusing in relation to the optical disk 2 by adjusting the optical-axial position of the light beam emitted from the light-emitting/-detecting element 31.

The composite optical element 32 is formed by injection molding of a resin material as above. Alternatively, it may have the first, second and third diffraction gratings 45, 46 and 47 formed thereon by etching or any other mechanical processing. It should be noted that the material of the composite optical element 32 is not limited to resin material but may be a transparent optical material such as nitric material. Further, the composite optical element 32 may be formed from a combination of these optical materials so that one part thereof may be different in material from the other part.

The composite optical element 32 may be configured to have an internal reflecting surface. It can be configured with an improved degree of optical design by bending the light path by the reflecting surface.

In the composite optical element 32, the return light from the optical disk 2 has the light path thereof deviated due to a variation in wavelength of the light beam emitted from the light source block of the light-emitting/-detecting element 31 as will be described here below.

The composite optical element 32 is configured such that the return light (as L) from the optical disk 2 is directed to the light-emitting/-detecting element 31 by diffracting it by the second diffraction grating 46 so as to be a positive first-order light beam which will travel along a light path separate from that of the outgoing light, and diffracting the return light L, made by the second diffraction grating 46 to travel along the separate light path, by the third diffraction grating 47 so as to be a negative first-order light beam, as shown in FIG. 7.

Figure 8:
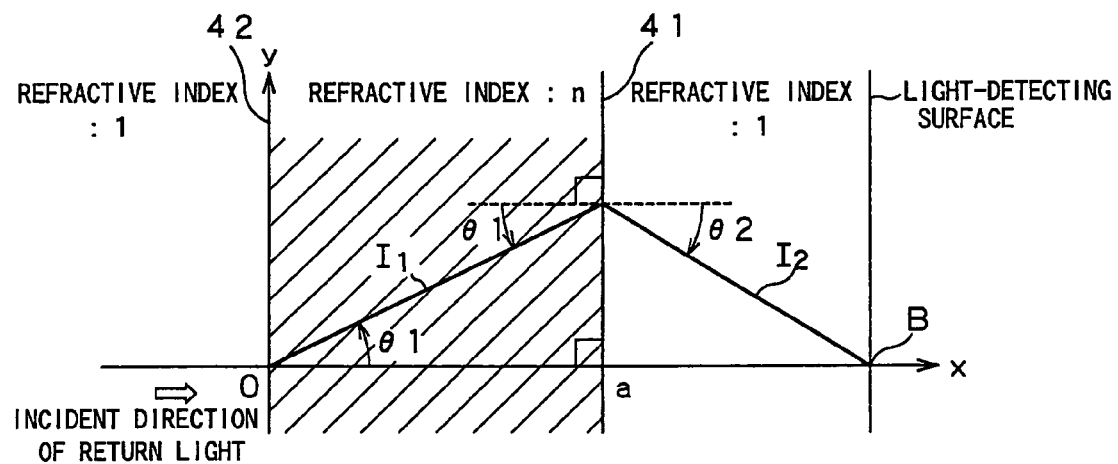
FIG. 8 explains a light-path deviation of the return light in the composite optical element provided in the optical system of the optical pickup according to the present invention.

Given that in the composite optical element 32, the wavelength of the return light is $\lambda$, the angle of the diffraction by the second diffraction grating 46 is $\theta_1$, the angle of the diffraction by the third diffraction grating 47 is $\theta_2$, the grating constant of the second diffraction grating 46 is $d_1$, the grating constant of the third diffraction grating 47 is $d_2$, the order of the diffraction by the second diffraction grating 46 is +1, the order of the diffraction by the third diffraction grating 47 is −1 and the refractive index of a medium between the second and third diffraction gratings 46 and 47 is n, that is, the refractive index of the resin material from which the composite optical element 32 is n, as shown in FIG. 8, the following formulas (8) and (9) are derived from the previously mentioned formula (3):

$$n \cdot \sin \theta_1 = \lambda/d_1 \qquad (8)$$

$$\sin \theta_2 - n \cdot \sin \theta_1 = -d_2 \qquad (9)$$

The "$\sin \theta_1$" and "$\sin \theta_2$" in the above formulas (8) and (9) can be expressed as given by the following formulas (10) and (11) using the aforementioned formulas (1) and (2):

$$\sin \theta_1 = \lambda/(d_1 \cdot n) \qquad (10)$$

$$\sin \theta_2 = \lambda/(1/d_1 - 1/d_2) \qquad (11)$$

The "$\cos \theta_1$" and "$\cos \theta_2$" can be expressed as given by the following formulas (12) and (13) using the formulas (10) and (11):

$$\cos \theta_1 = (1 - \lambda^2/(d_1 \cdot n)^2)^{1/2} \qquad (12)$$

$$\cos \theta_2 = (1 - \lambda^2 \cdot (1/d_1 - 1/d_2)^2)^{1/2} \qquad (13)$$

Given that an x-axis extends horizontally and perpendicularly to the second surface 42 toward the first surface 41 taking the second surface 42 as x=0, a y-axis extends vertically as a deviation from the x-axis, the main beam, diffracted by the first diffraction grating 45 to be a zero-order light beam, of the return light from the optical disk 2 and diffracted by the second diffraction grating 46 to be a positive first-order light beam is a light beam $I_1$, the light path of the light beam $I_1$ can be expressed as given by the following formula (14):

$$y = \tan \theta_1 \cdot x \qquad (14)$$

Also, given that the space between the first and second surface 41 and 42 is a, the intersection of the light beam $I_1$ with the first surface 41, that is, a position where the light beam $I_1$ is incident upon the third diffraction grating 47, can be expressed as given by the following formula (15):

$$x = a, \ y = a \cdot \tan \theta_1 \qquad (15)$$

Therefore, given that the return light, diffracted by the third diffraction grating 47 so as to be a negative first-order light beam, is light $I_2$, the light path of the light beam $I_2$ can be expressed as given by the following formula (16):

$$y = \tan \theta_2 \cdot x + a(\tan \theta_1 - \tan \theta_2) \qquad (16)$$

Given that the light beam $I_2$ intersects the x-axis at a point B, the position B can be expressed as given by the following formula (17):

$$x = a(1 - \tan \theta_1/\tan \theta_2), \ y = 0 \qquad (17)$$

As will be revealed from the formula (17), a position x on the x-axis depends upon a diffraction angle $\theta_1$ of the second diffraction grating 46. The diffraction angle $\theta_1$ is a function of the wavelength $\lambda$ as in the formula (8). So, in the above example, when the wavelength $\lambda$ varies, the diffraction angle $\theta_1$ will vary correspondingly and the coordinate of the point B will also change, so that a variation in wavelength of the outgoing light will result in a change in position of the beam spot in the light-detecting area of the light-emitting/-detecting element 31.

Therefore, since the position of the beam spot in the light-detecting area of the light-emitting/-detecting element 31 remains unchanged independently of any wavelength variation, so the second term of the right side of the formula (17) expressing the value x can be expressed with the wavelength $\lambda$ with the use of the formulas (10) to (13) as given by the following formula (18):

$$\text{When } d_2 < d_1, \qquad (18)$$

$$\tan \theta_1 / \tan \theta_2$$
$$= (\sin \theta_1 / \cos \theta_1) / (\sin \theta_2 / \cos \theta_2)$$
$$= -((d_1^2 d_2^2 / (d_2 - d_1)^2 - \lambda^2)/(n^2 d_1^2 - \lambda^2))^{1/2}$$

Through rearrangement of the above formula (18) by placing a condition given by the following formula (19) in the formula (18), the latter can be expressed by the following formula (20):

$$(n+1)d_2 = n d_1 \qquad (19)$$

$$\tan \theta_1/\tan \theta_2 = -1 \qquad (20)$$

As will be seen from the above formulas (19) and (20), the x coordinate of the point B of the third diffraction grating 47 remains unchanged independently of the wavelength $\lambda$.

That is, by designing the composite optical element 32 for the grating constant $d_1$ of the second diffraction grating 46 and grating constant $d_2$ of the third diffraction grating 47 to meet the condition given by the formula (19), the beam spot in the light-detecting area of the light-emitting/-detecting element 31 can be kept in a fixed position independently of any variation of the wavelength.

The grating constant $d_1$ of the second diffraction grating 46 and grating constant $d_2$ of the third diffraction grating 47 are determined as above. So, even if the return light from the optical disk 2, diffracted as a positive first-order light beam by the second diffraction grating 46, has the light path thereof deviated due to a variation in wavelength of the light beam emitted from the light-emitting/-detecting element 31 when it is separated from the outgoing light, the composite optical element 32 can always direct the return light from the optical disk 2 appropriately to a predetermined position in the light-detecting area of the light-emitting/-detecting element 31 by diffracting the return light by the third diffraction grating 47 to be a negative first-order light beam.

The limiting aperture 33 is disposed on the optical axis of the light passing by the second diffraction grating 46 of the composite optical element 32.

The objective lens 34 is formed from at least one convex lens, and disposed to focus, on the optical disk 2, the light beam emitted from the light-emitting/-detecting element 31 and limited by the limiting aperture 33.

Figure 9:
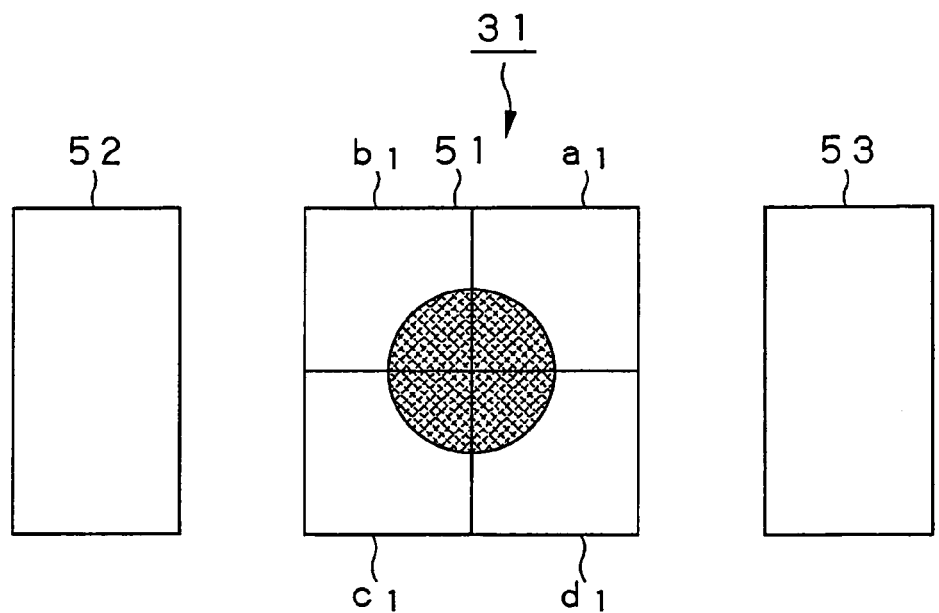
FIG. 9 explains a main-beam photodetector and side-beam photodetectors in a photodetector assembly provided in the optical system of the optical pickup according to the present invention.

As shown in FIG. 9, the light-emitting/-detecting element 31 includes a generally square main-beam photodetector 51 that detects a main beam being a zero-order light beam resulted from splitting by the first diffraction grating 45, and a pair of generally rectangular side-beam photodetectors 52 and 53 that detect two side beams being positive and negative first-order light beams also resulting from splitting by the first diffraction grating 45. The light-emitting/-detecting element 31 is disposed correspondingly to a position where the return light is incident having the light-path deviation thereof corrected by the third diffraction grating 47 in the composite optical element 32. In the light-emitting/-detecting element 31, the generally square main-beam photodetector 51 is disposed in the center, and the generally rectangular side-beam photodetectors 52 and 53 in a set are disposed across the main-beam photodetector 51.

As shown in FIG. 9, the main-beam photodetector 51 in the light-emitting/-detecting element 31 has a light-detecting surface quadrisected by a set of parting lines perpendicular to each other into light-detecting areas $a_1$, $b_1$, $c_1$ and $d_1$ upon which the return light will be incident having the light-path deviation thereof corrected by the third diffraction gating 47.

The lens driving mechanism in the optical pickup 3 includes a lens holder to hold the objective lens 34, a lens holder supporting member to support the lens holder to be movable biaxially, namely, in a focusing direction parallel to the optical axis of the objective lens 34 and a tracking direction perpendicular to the optical axis of the objective lens 34, and an electromagnetic drive unit to move the lens holder biaxially under the action of an electromagnetic force (these components are not illustrated).

The above lens driving mechanism moves the objective lens 34 in the focusing and tracking directions according to a focusing error signal from the main-beam photodetector 51 in the light-emitting/-detecting element 31 and tracking error signals from the side-beam photodetectors 52 and 53, to thereby focus the light beam emitted from the light-emitting/-detecting element 31 onto a recording track on the recording layer 2a in the optical disk 2.

Note that each of the first, second and third diffraction gratings 45, 46 and 47 in the composite optical element 32 may be a hologram element having a predetermined hologram pattern formed by etching. In this case, the hologram should preferably be a surface-relieved one or a brazed hologram, to improve the efficiency of diffraction.

In the optical disk drive 1 configured as above, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the objective lens 34 in the focusing and tracking directions, and thus the outgoing light is focused by the objective lens 34 onto a desired recording track on the optical disk 2. Then, in the optical disk drive 1, signals read by the optical pickup 3 are demodulated by the signal demodulation circuit 12, error-corrected by the error correction circuit 13, and then delivered as read signals at the interface 14.

In the optical disk drive 1, the outgoing light and return light travel along their respective light paths inside the optical pickup 3 as will be described below:

In the optical disk drive 1, to read information from the recording layer 2a in the optical disk 2, light emitted from the light-emitting/-detecting element 31 is split by the first diffraction grating 45 in the composite optical element 32 into three beams including a zero-order light beam and positive and negative first-order light beams, as shown in FIG. 5. Each of the three beams thus resulting from splitting of the outgoing light passes by the second diffraction grating 46 in the composite optical element 32, and is focused by the objective lens 34 onto the recording layer 2a in the optical disk 2.

The return light from the recording layer 2a in the optical disk 2 is split by the second diffraction grating 46 in the composite optical element 32 into three beams including a zero-order light beam and positive and negative first-order light beams. Of these three beams, the positive first-order light beam has the light path thereof separated as return light from that of the outgoing light, and is incident upon the third diffraction grating 47. The return light incident upon the third diffraction grating 47 is further split by the latter into three beams including a zero-order light beam and positive and negative first-order light beams. Of these beams, the negative first-order light beam is incident as return light upon each of the light-detecting areas $a_1$, $b_1$, $c_1$ and $d_1$ of the main-beam photodetector 51 in the light-emitting/-detecting element 31.

Then in the composite optical element 32, a light-path deviation of the return light, taking place in the second diffraction grating 46, will be corrected by the third diffraction grating 47, and the return light will be incident upon the light-detecting areas $a_1$, $b_1$, $c_1$ and $d_1$ of the main-beam photodetector 51 in the light-emitting/-detecting element 31.

Figure 10A:
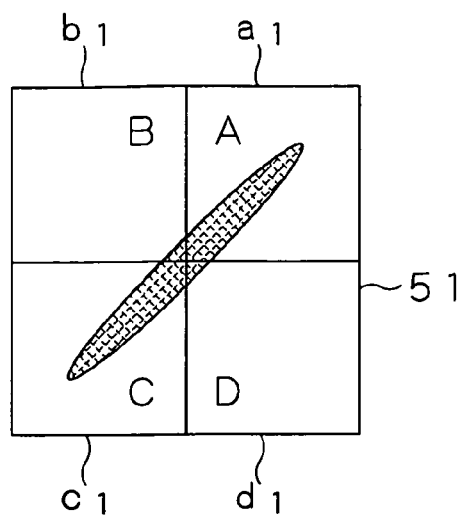
Figure 10B:
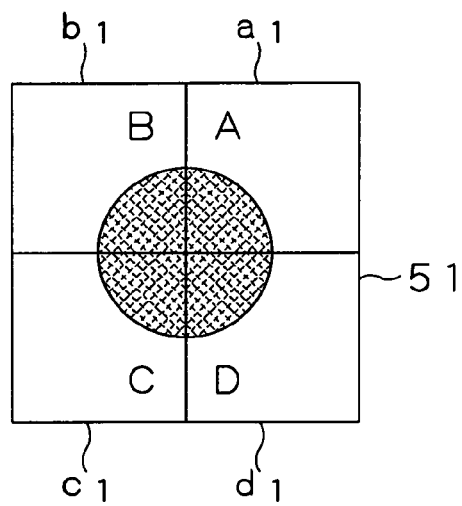

When the objective lens 34 is positioned in relation to the recording layer 2a in the optical disk 2 to just focus the return light on the recording layer 2a, the return light incident upon the light-detecting areas $a_1$, $b_1$, $c_1$ and $d_1$ of the main-beam photodetector 51 will define a circular beam spot as shown in FIG. 10B.

In case th beam spot is circular as shown in FIG. 10B, the light-detecting areas $a_1$ and $c_1$ of the main-beam photodetector 51 will be equal in amount of incident light to the light-detecting areas $b_1$ and $d_1$. If the objective lens 34 is excessively close to the recording layer 2a in the optical disk 2, it will be off the just-in-focus position, and astigmatism, taking place due to the passage by the composite optical element 32 of the return light having the light path thereof separated by the second diffraction grating 46 from that of the outgoing light, causes the return light incident upon the light-detecting areas $a_1$, $b_1$, $c_1$ and $d_1$ of the main-beam photodetector 51 to define a beam spot which has the form of an ellipse whose major axis extends over the light-detecting areas $a_1$ and $c_1$ as shown in FIG. 10A. Further, if the objective lens 34 is excessively apart from the recording layer 2a in the optical disk 2, it is off the just-in-focus position, and astigmatism, taking place due to the passage by the composite optical element 32 of the return light having the light path thereof separated by the second diffraction grating 46 from that of the outgoing light, causes the return light incident upon the light-detecting areas $a_1$, $b_1$, $c_1$ and $d_1$ of the main-beam photodetector 51 to define a beam spot which has the form of an ellipse whose major axis extends over the light-detecting areas $b_1$ and $d_1$ as shown in FIG. 10C, namely, an ellipse whose major axis is inclined 90 deg. in relation to that of the beam spot shown in FIG. 10A.

Figure 10C:
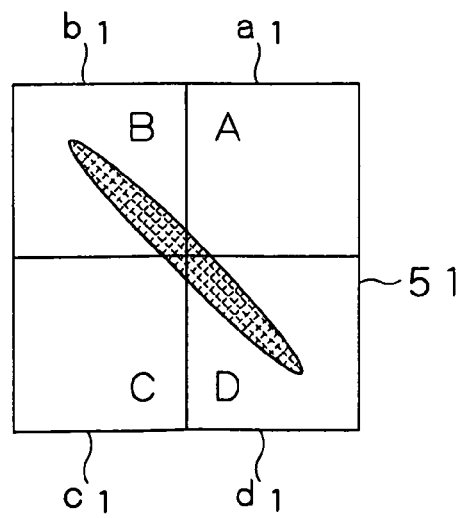

Thus, if the return light defines an elliptic beam spot as shown in FIGS. 10A and 10C, one of the set of light-detecting areas $a_1$ and $c_1$ and set of light-detecting areas $b_1$ and $d_1$ of the main-beam photodetector 51 will be larger or smaller in amount of incident light than the other.

Therefore, given that the light-detecting areas $a_1$, $b_1$, $c_1$ and $d_1$ detects outputs $Sa_1$, $Sb_1$, $Sc_1$ and $Sd_1$, respectively, the main-beam photodetector 51 provides a focusing error signal FE expressed as given by the following formula (21):

$$FE = (Sa_1 + Sc_1) - (Sb_1 + Sd_1) \tag{21}$$

That is, in case the objective lens 34 is positioned in the in-focus position in relation to the recording layer 2a in the optical disk 2, the main-beam photodetector 51 provides a focusing error signal FE which is zero (0), calculated using the formula (21). If the objective lens 34 is excessively close to the recording layer 2a in the optical disk 2, the main-beam photodetector 51 will provide a focusing error signal FE which is positive. On the other hand, if the objective lens 34 is excessively apart from the recording layer 2a in the optical disk 2, the main-beam photodetector 51 will provide a focusing error signal FE which is negative.

As above, the main-beam photodetector 51 in the light-emitting/-detecting element 31 provides a focusing error signal FE and read signal by detecting beam spots on the light-detecting areas $a_1$, $b_1$, $c_1$ and $d_1$ thereof.

The side-beam photodetectors 52 and 53 in a set detect side beams split by the first diffraction grating 45 into the positive and negative first-order light beams, reflected by the optical disk 2 to be return light as the positive first-order light beam, separated by the second diffraction grating 46 from the outgoing light, and having the light-path deviation thereof corrected by the third diffraction grating 47, and then incident upon the light-detecting surfaces of the side-beam photodetectors 52 and 53. The side-beam photodetectors 52 and 53 provide a tracking error signal TE by calculating a difference between the positive and negative first-order light beams outputs.

Figure 11:
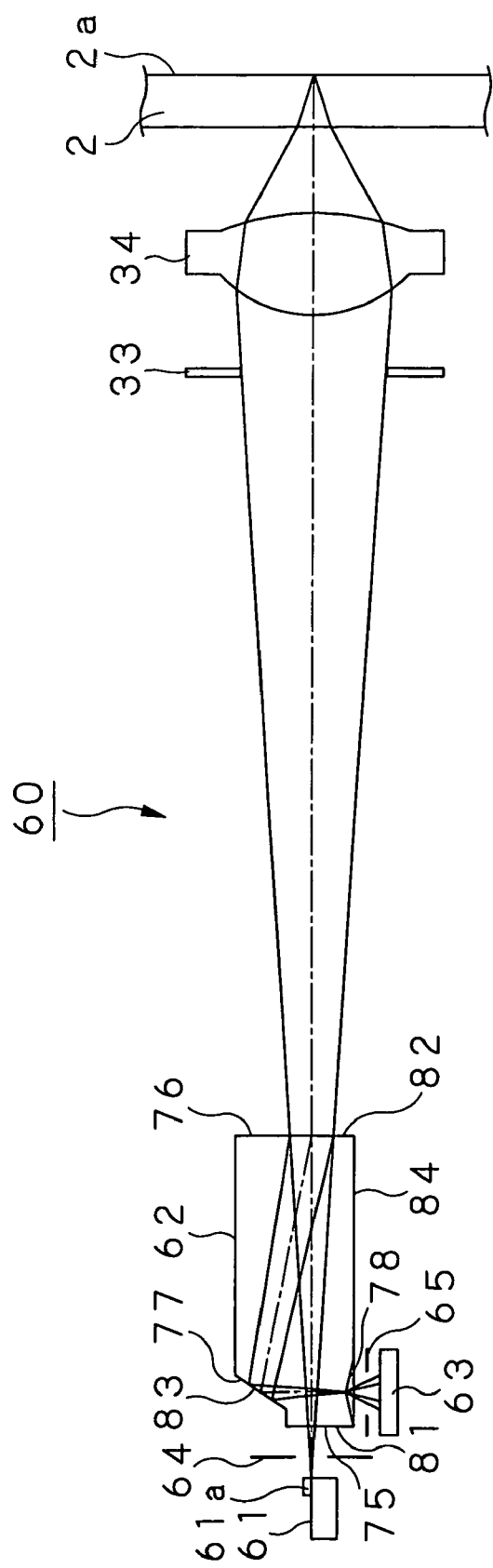
FIG. 11 is a schematic side elevation of a variant of the optical system included in the optical pickup provided in the optical disk drive according to the present invention.

Note that the optical pickup 3 may be configured to include, as shown in FIG. 11 for example, an optical system 60 that reads information from the optical disk 2, and a lens driving mechanism (not shown) that moves the objective lens included in the optical system 60 and will be described in detail later. The optical pickup 3 including the above optical system 60 will be described below. The same or similar components of the optical pickup 3 using the optical system 60 as to those of the optical pickup 3 including the aforementioned optical system 30 will be indicated with the same or similar references and will not be described in detail any more.

The optical system 60 in the optical pickup 3 includes, in the order following the light path, a light source 61 that emits a laser beam to the optical disk 2, a composite optical element 62 that splits the light beam emitted from the light source 61, separates return light from the optical disk 2 and the light beam (outgoing light) emitted from the light source 61 from each other and further splits the return light separated from the outgoing light, a limiting aperture 33 that limits the light beam emitted from the light source 61 and passing by the composite optical element 62 to a predetermined numerical aperture NA, an objective lens 34 that focuses the outgoing light limited by the limiting aperture 33 onto the recording layer 2a in the optical disk 2, and a photodetector assembly 63 that detects the return light from the optical disk 2. The optical system 60 further includes a first light shielding plate 64 provided between the light source 61 and composite optical element 62 to shield unnecessary light beams other than valid ones of the outgoing light, and a second light shielding plate 65 provided between the composite optical element 62 and photodetector assembly 63 to shield unnecessary light beams other than valid ones of the return light.

The light source 61 is a semiconductor laser that emits a laser beam of about 780 nm in wavelength, for example, from a light-emitting point 61a thereof.

Figure 12:
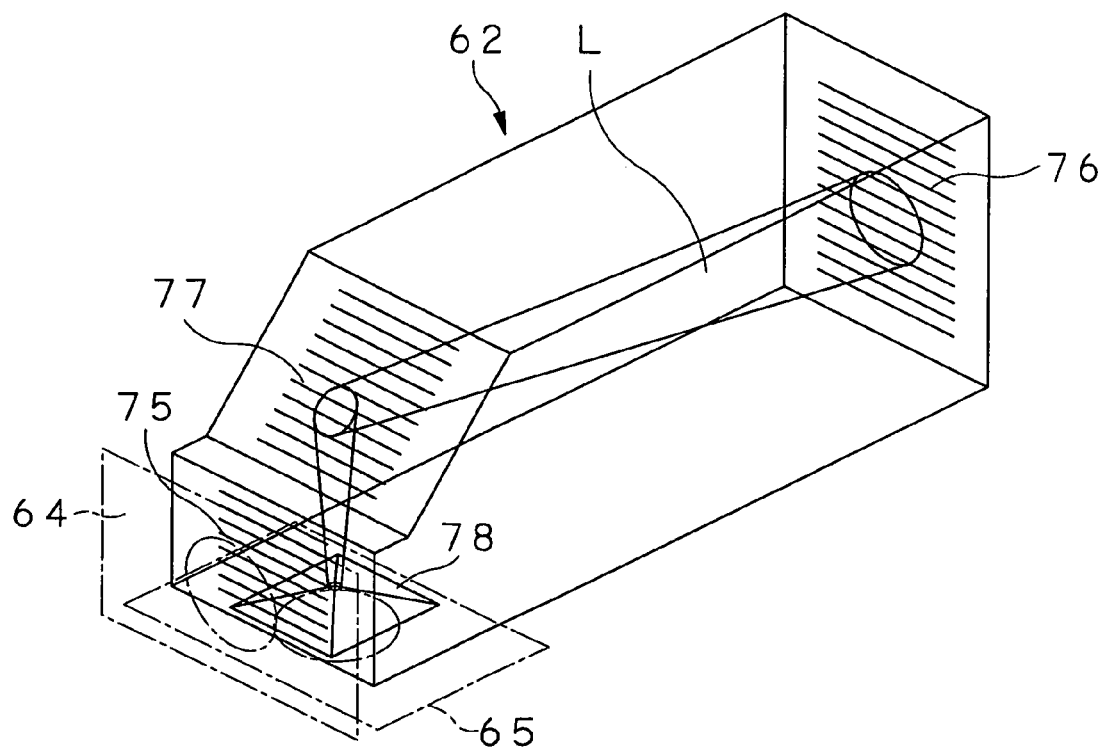
FIG. 12 is a perspective view of a composite optical element provided in the variant of the optical system of the optical pickup in FIG. 11.

As shown in FIGS. 11 and 12, the composite optical element 62 is formed like a block by injection molding of a resin material, for example. It has a first surface 81 facing the light source 61 and perpendicular to the optical axis of the light beam emitted from the light-emitting point 61a of the light source 61, a second surface 82 parallel and opposite to the first surface 81, a third surface 83 inclined a predetermined angle in relation to the second surface 82 and opposite to the latter, and a fourth surface 84 perpendicular to the first and second surfaces 81 and 82, inclined a predetermined angle in relation to the third surface 83 and opposite to the latter.

On the first surface 81, a first diffraction grating 75 is provided that splits the light beam emitted from the light-emitting point 61a of the light source 61 into three beams including a zero-order light beam and positive and negative first-order light beams. The optical system 60 adopts the so-called three-spot method (three-beam method) to provide a tracking error signal TE. It provides a tracking servo control by detecting, at the photodetector assembly 63, the positive and negative first-order light beams from the first diffraction grating 75 and detecting a difference between the positive and negative first-order light beams outputs.

On the second surface 82, a second diffraction grating is provided 76 that splits the zero-order light beam and positive and negative first-order light beams, resulted from diffraction by the first diffraction grating 75, of the return light from the optical disk 2, further splits, by diffraction, the zero-order light beam and positive and negative first-order light beams into a zero-order light beam and positive and negative first-order light beams, and makes the positive first-order light beam as return light travel along a light path separate from the light path of the outgoing light.

Further, a third diffraction grating 77 is provided on the above third surface 83. It is disposed on the light path of the return light split by the second diffraction grating 76 to reflect and diffract the return light, further split the return light into a zero-order light beam and positive and negative first-order light beams, and thus correct a light-path deviation, taking place in the second diffraction grating 76, of the negative first-order light beam, for example, as return light.

The third diffraction grating 77 has a specific reflecting film provided on the third surface 83 to totally reflect the incident return light. It functions as a so-called reflective diffraction grating.

Also, a beam-splitting prism 78 is provided on the fourth surface 84. It is disposed on the light path of the return light having the light-path deviation corrected by the third diffraction grating 77 to split the return light into four beams.

Figure 13:
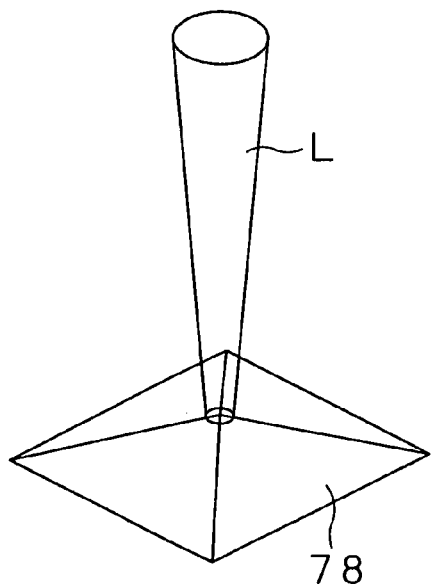
FIG. 13 is a perspective view of a beam-splitting prism included in the composite optical element in the variant of the optical system of the optical pickup in FIG. 11.
Figure 14:
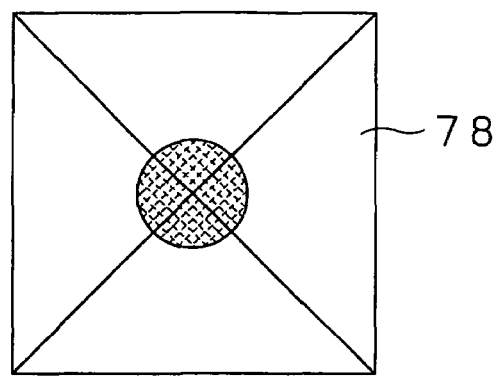
FIG. 14 is a view, from the return light-detecting side, of the beam-splitting prism included in the composite optical element in the variant of the optical system of the optical pickup in FIG. 11.

As shown in FIGS. 13 and 14, the beam-splitting prism 78 is shaped to have the form of a generally regular-tetragonal pyramid. The beam-splitting prism 78 is disposed in such a manner that the diffracted component of the negative first-order light beam reflected and diffracted by the third diffraction grating 77 will be incident at the center thereof upon the apex of the regular-tetragonal pyramid. The diffracted light is incident, at or close to the focus thereof, upon the apex of the regular-tetragonal pyramid. The beam-splitting prism 78 is disposed inside the composite optical element 62 with the apex thereof being directed inwardly of the composite optical element 62. That is, the beam-splitting prism 78 is disposed in such a manner that the zero-order light beam of the three beams from the first diffraction grating 75 will be diffracted by the second diffraction grating 76, and reflected and diffracted by the third diffraction grating 77 for incidence upon the apex of the beam-splitting prism 78. It should be noted that the beam-splitting prism 78 is disposed with the bottom thereof (namely, the bottom of the tetragonal pyramid) being perpendicular to the optical axis of the negative first-order light beam reflected and diffracted by the third diffraction grating 77.

The composite optical element 62 imparts a predetermined degree of astigmatism to the return light incident upon the beam-splitting prism 78 when the return light separated by the second diffraction grating 76 passes by the composite optical element 62. The composite optical element 62 can easily adjust defocusing in relation to the optical disk 2 by adjusting the optical-axial position of the light beam emitted from the light source 61.

The composite optical element 62 is formed from a resin material by injection molding as above. Alternatively, it may have the first, second and third diffraction gratings 75, 76 and 77 and beam-splitting prism 78 formed thereon by etching or any other mechanical processing. It should be noted that the material of the composite optical element 62 is not limited to the resin material but may be a transparent optical material such as nitric material. Further, the composite optical element 62 may be formed from a combination of these optical materials so that one part thereof may be different in material from the other part.

As in the previously described composite optical element 32, the composite optical element 62 designed on the basis of calculated values of the grating constants of the second and third diffraction gratings 76 and 77, an angle defined between the third and second surfaces 83 and 82, etc. can correct a light-path deviation, caused by a wavelength variation, of the return light, and thus direct the return light accurately to the apex of the beam-splitting prism 78.

In the composite optical element 62 thus configured, even if the return light from the optical disk 2, diffracted as a positive first-order light beam by the second diffraction grating 76, has the light path thereof deviated due to a variation in wavelength of the light beam emitted from the light source 61 when it is separated from the outgoing light, reflection and diffraction of the return light, as a negative first-order light beam, by the third diffraction grating 77 always directs the return light to the apex of the beam-splitting prism 78 and accurately directs all return light coming from the optical disk 2 and split by the beam-splitting prism 78 to a predetermined position on the light-detecting area of the photodetector assembly 63.

The limiting aperture 33 is disposed on the optical axis of the outgoing light having passed by the second diffraction grating 76 in the composite optical element 62.

The objective lens 34 is formed from at least one convex lens, and disposed to focus, on the optical disk 2, the light beam emitted from the light source 61 and limited by the limiting aperture 33.

Figure 15:
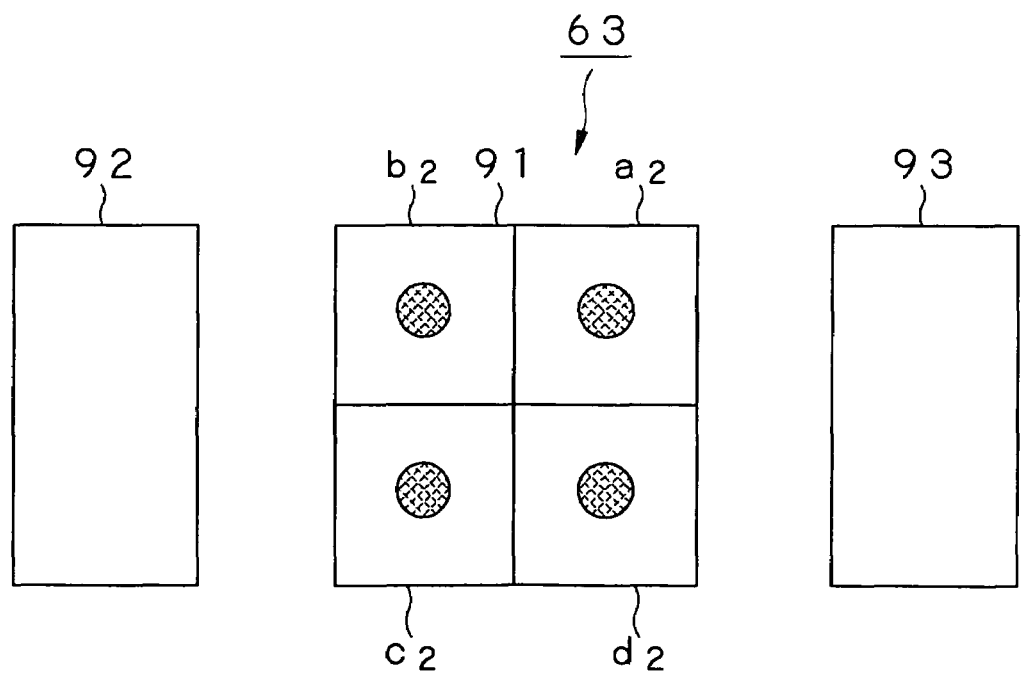
FIG. 15 explains a main-beam photodetector and side-beam photodetectors in the photodetector assembly provided in the variant of the optical system of the optical pickup in FIG. 11.

As shown in FIG. 15, the photodetector assembly 63 includes a generally square main-beam photodetector 91 that detects a main beam being a zero-order light beam from the first diffraction grating 75, and a pair of generally rectangular side-beam photodetectors 92 and 93 that detect two side beams being positive and negative first-order light beams from the first diffraction grating 75. The photodetector assembly 63 is disposed in a position corresponding to each return light split by the beam-splitting prism 78 in the composite optical element 62. In the photodetector assembly 63, the generally square main-beam photodetector 91 is disposed in the center, while the generally rectangular side-beam photodetectors 92 and 93 in a set are disposed across the main-beam photodetector 91.

The main-beam photodetector 91 in the photodetector assembly 63 has the surface thereof quadrisected by a set of parting lines perpendicular to each other into light-detecting areas $a_2$, $b_2$, $c_2$ and $d_2$. The light beams resulted from quadrisection of the return light by the beam-splitting prism 78 are incident upon the light-detecting areas $a_2$, $b_2$, $c_2$ and $d_2$, respectively.

The first light shielding plate 64 has a generally circular opening formed therein between the light source 61 and composite optical element 62 correspondingly to the valid beam of the outgoing light. The opening shields, by aperture limitation, limit unnecessary beams other than the valid beam. It can prevent any stray light not passing by the beam-splitting prism 78 in the composite optical element 62 from entering the photodetector assembly 63.

Also, the second light shielding plate 65 has a generally circular opening formed therein between the light source 62 and composite optical element 63 correspondingly to the valid beam of the outgoing light. The opening shields, by aperture limitation, limit unnecessary beams other than the valid beam. It can prevent any stray light not passing by the beam-splitting prism 78 in the composite optical element 62 from entering the photodetector assembly 63.

Note that the shape of the openings formed in the first and second light shielding plates 64 and 65, respectively, is not limited to the circular one but may be generally elliptic, polygonal or the like.

The openings formed in the first and second light shielding plates 64 and 65 shown in FIGS. 11 and 12 are shaped for only the zero-order light beam from the first diffraction grating 75, that is, the main beam. Such openings should be provided also for the positive and negative first-order light beams, namely, the side beams. Alternatively, the opening shape should be altered for the main and side beams, respectively.

The lens driving mechanism in the optical pickup 3 includes a lens holder to hold the objective lens 34, a lens holder support member to support the lens holder to be movable biaxially, namely, in a focusing direction parallel to the optical axis of the objective lens 34 and a tracking direction perpendicular to the optical axis of the objective lens 34, and an electromagnetic drive unit to move the lens holder biaxially under the action of an electromagnetic force (these components are not illustrated).

The above lens driving mechanism moves the objective lens 34 in the focusing and tracking directions according to a focusing error signal from the main-beam photodetector 91 in the photodetector assembly 63 and tracking error signal from the side-beam photodetectors 92 and 93, to thereby focus the outgoing light on a recording track on the recording layer 2a in the optical disk 2.

Note that the beam-splitting prism 78 included in the aforementioned composite optical element 62 may be shaped to have the form of an octagonal cone, for example. In this case, the main-beam photodetector 91 in the photodetector assembly 63 may be configured to have the light-detecting surface thereof divided radially from the center into eight areas. In the composite optical element 62, the beam-splitting prism 78 is provided inside the fourth surface 84. Alternatively, however, the beam-splitting prism 78 may be projected to outside the fourth surface 84. Further, the beam-splitting prism 78 in the composite optical element 62 is not limited in shape to the octagonal cone having flat surfaces but may be formed to have a plurality of curved surfaces. In this case, the light-detecting areas of the main-beam photodetector 91 in the photodetector assembly 63 will be formed correspondingly to the curved surfaces. Furthermore, each of the first to third diffraction gratings 75 to 77 in the composite optical element 62 may be a hologram element having a predetermined hologram pattern formed by etching or similar process, for example. In this case, the hologram element should preferably be a surface-relieved one or a brazed hologram, to improve the efficiency of diffraction.

Figure 16:
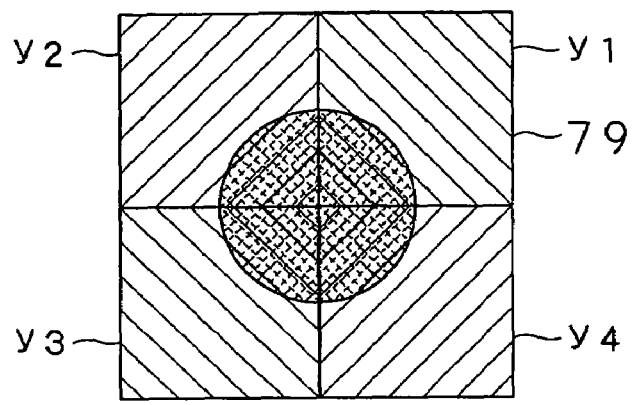
FIG. 16 is a plan view of a grating having a function equivalent to that of the beam-splitting prism included in the composite optical element in the variant of the optical system of the optical pickup in FIG. 11.

The composite optical element 62 may use a grating 79 divided in four areas as shown in FIG. 16 in place of the beam-splitting prism 78. The grating 79 is equal in effect to the beam-splitting prism 78. The grating 79 has divisional areas $y_1$, $y_2$, $y_3$ and $y_4$ to assure the same effect. The divisional areas $y_1$, $y_2$, $y_3$ and $y_4$ have formed therein recesses directed differently from one area to another. More specifically, the recesses in the divisional areas $y_1$ and $y_3$ are directed perpendicularly to those in the divisional areas $y_2$ and $y_4$. The grating 79 diffracts the incident return light from the optical disk 2 correspondingly to the directions of the recesses in the divisional areas $y_1$, $y_2$, $y_3$ and $y_4$ and grating constants to provide and direct four beams to the main-beam photodetector 91 in the photodetector assembly 63. The grating 79 is a hologram element having a predetermined hologram pattern formed by etching or similar process, for example. In this case, the hologram element should preferably be a surface-relieved one or a brazed hologram, to improve the efficiency of diffraction.

Further, the composite optical element 62 may be configured to have an internal reflecting surface which can be used to bend the light path for an improved freedom of the optical design.

Furthermore, the composite optical element 62 may have an increased angle of refraction such that the incident angle of the return light from the optical disk 2, incident upon the beam-splitting prism 78, will form an angle of less than 45 deg. with each surface of the beam-splitting prism 78, that is, each surface of the beam-splitting prism 78 will be inclined less than 45 deg. in order to prevent the incident return light from being totally reflected. Thus, the split beams of the return light can be separated more from each other, the divisional surface areas of the main-beam photodetector 91 can be separated more from each other, and the main-beam and side-beam photodetectors 91 and 92 and 93 can be separated more from each other. Thus, the optical pickup 3 may be assembled with lower precision.

In the optical disk drive 1 incorporating the optical pickup 3 including the aforementioned optical system 60, the servo circuit 10 generates and supplies a control signal to the biaxial actuator of the optical pickup 3 according to the focusing and tracking error signals detected by the optical pickup 3 from the return light from the optical disk 2, and the biaxial actuator moves the objective lens 34 in focusing and tracking directions according to the supplied focusing and tracking error signals to focus the outgoing light onto a desired recording track on the optical disk 2 through the objective lens 34. Then, in the optical disk drive 1, a signal thus read by the optical pickup 3 is demodulated and error-corrected by the signal demodulation circuit 12 and error correction circuit 13, respectively, to output a read signal from the interface 14.

The optical disk drive 1 incorporating the optical pickup 3 including the aforementioned optical system 60 will be described in detail concerning the light paths of the outgoing light and return light in the optical pickup 3 with reference to the accompanying drawings.

In the optical disk drive 1, to read information from the recording layer 2a in the optical disk 2, light emitted from the light source 61 has unnecessary components thereof shielded by the first shielding plate 64 for only the valid component to be incident upon the composite optical element 62, and split by the first diffraction grating 75 in the composite optical element 62 into three beams including a zero-order light beam and positive and negative first-order light beams, as shown in FIG. 11. Each of the three beams thus resulted from splitting of the outgoing light passes by the second diffraction grating 76 in the composite optical element 62, and is focused by the objective lens 34 onto the recording layer 2a in the optical disk 2.

The return light from the recording layer 2a in the optical disk 2 is diffracted by the second diffraction grating 76 of the composite optical element 62 and directed to the light path extending toward the third surface 83. The positive first-order light beam is incident upon the third diffraction grating 77. The positive first-order light beam from the second diffraction grating 76, incident upon the third diffraction grating 77, is reflected and diffracted again by the third diffraction grating 77, and the negative first-order light beam from the third diffraction grating 77 is incident upon the apex of the beam-splitting prism 78. The negative first-order light beam incident upon the apex of the regular-tetragonal pyramid shape of the beam-splitting prism 78 is incident upon each of the surfaces of the regular-tetragonal-pyramidal beam-splitting prism 78. The incident light beams upon the surfaces are refracted in different directions. Namely, the return light is split into four beams. The return light has unnecessary parts thereof shielded by the second light shielding plate 65, and only the valid part of the return light is incident upon the light-detecting areas $a_2$, $b_2$, $c_2$ and $d_2$ of the main-beam photodetector 91 of the photodetector assembly 63.

Figure 17A:
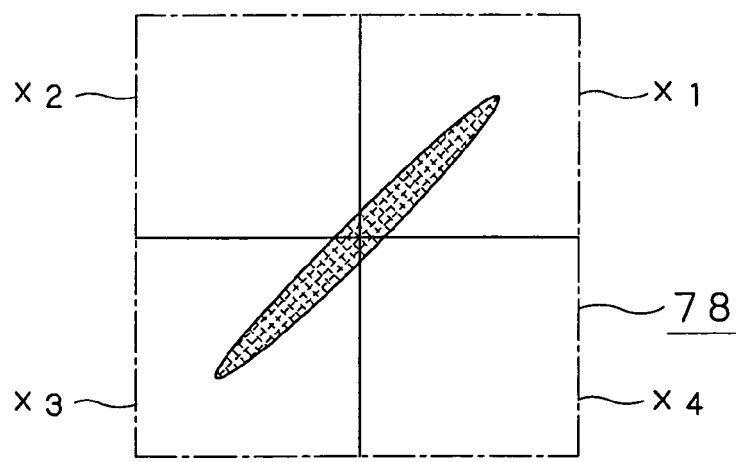
Figure 17B:
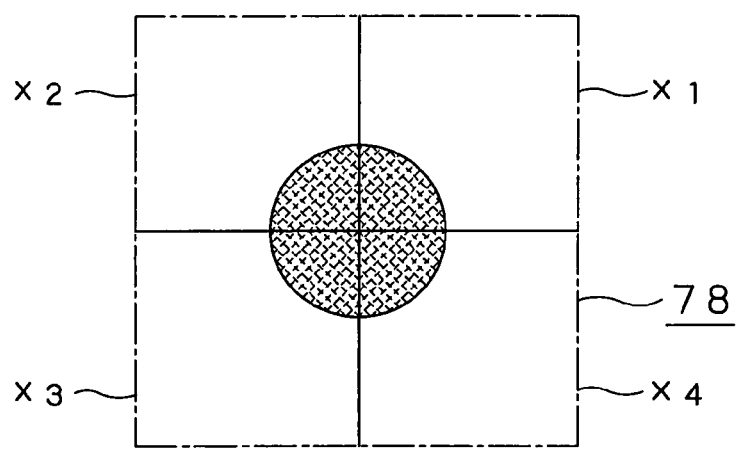

When the objective lens 34 is in the in-focus position in relation to the recording layer 2a in the optical disk 2, the return light diffracted by the third diffraction grating 77, incident upon the apex of the beam-splitting prism 78, will have a generally circular form as shown in FIG. 17B.

On the other hand, when the objective lens 34 is excessively close to the recording layer 2a in the optical disk 2, the objective lens 34 will be off the in-focus position as shown in FIG. 17A. Thus, astigmatism will take place because the diffracted light passes by the composite optical element 78. In this case, the incident light upon the apex of the beam-splitting prism 78 will take the form of an ellipse whose major axis extends obliquely to the upper right as shown in FIG. 17A.

Figure 17C:
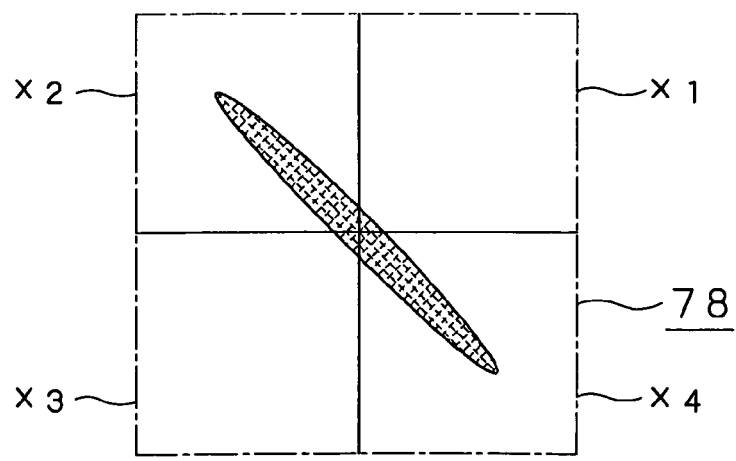

When the objective lens 34 is excessively apart from the recording layer 2a in the optical disk 2, the objective lens 34 will also be off the in-focus position as shown in FIG. 17C. Thus, astigmatism will also take place because the diffracted light passes by the composite optical element 62. In this case, the incident light upon the apex of the beam-splitting prism 78 will have the form of an ellipse whose major axis extends obliquely to the upper left as shown in FIG. 17C.

Therefore, when the diffracted light is incident upon the apex of the beam-splitting prism 78 with the objective lens 34 being off the in-focus position, the majority of the diffracted light is incident upon one of two sets of opposite side faces $x_1$ and $x_3$, and $x_2$ and $x_4$, while an extremely small part of the diffracted light will be incident upon the other set of surfaces.

More specifically, the diffracted light is split so that the majority of the diffracted light having the elliptical shape as shown in FIG. 17A will be incident upon one set of opposite side faces $x_1$ and $x_3$ of the beam-splitting prism 78, while the extremely small part of the diffracted light will be incident upon the other set of opposite side faces $x_2$ and $x_4$. Also, the majority of the diffracted light having the elliptical shape as shown in FIG. 17C will be incident upon the other set of opposite side faces $x_2$ and $x_4$ of the beam-splitting prism 78, while an extremely small part of the diffracted light will be incident upon the one set of opposite side faces $x_1$ and $x_3$.

The return light from the optical disk 2, which is a part of the zero-order light beam from the first diffraction grating 75, is diffracted by the second diffraction grating 76 to be a negative first-order light beam. This negative first-order light beam is incident upon each of the opposite side faces $x_1$, $x_2$, $x_3$ and $x_4$ of the beam-splitting prism 78 and diffracted in different directions. Thus, the return light is split into four return light beams which will be incident upon the light-detecting areas $a_2$, $b_2$, $c_2$ and $d_2$, respectively, of the main-beam photodetector 91 of the photodetector assembly 63.

Figure 18A:
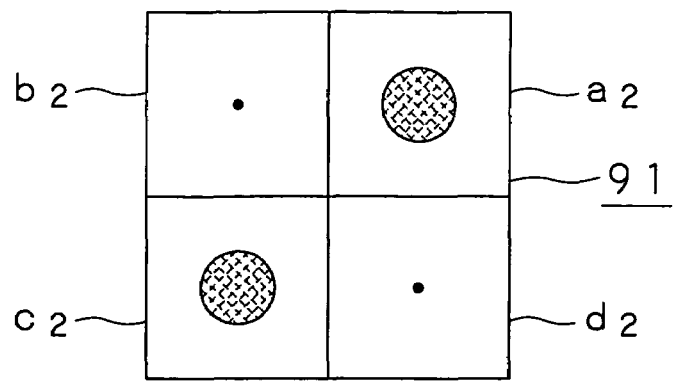
Figure 18B:
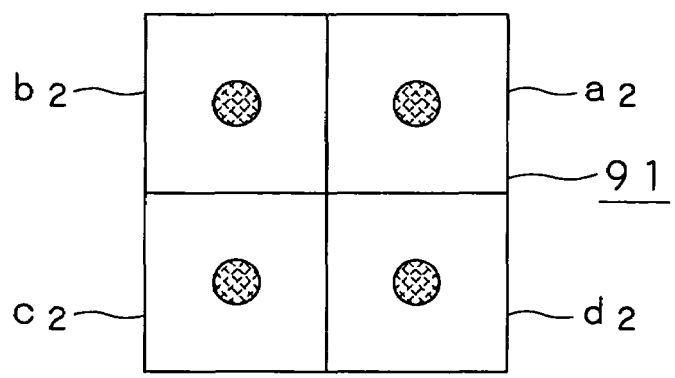
Figure 18C:
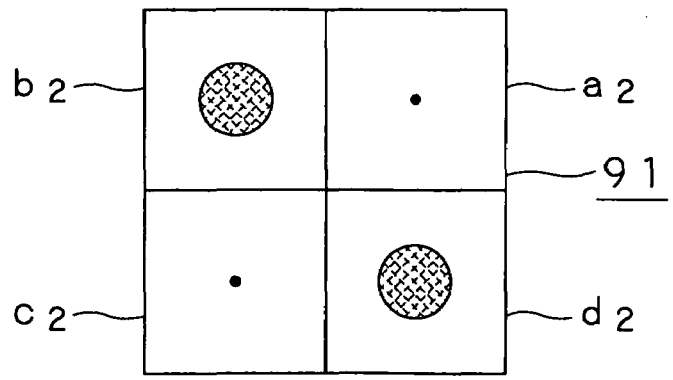

Thus, one of the two sets of opposite light-detecting areas $a_2$ and $c_2$, and $b_2$ and $d_2$, of the main-beam photodetector 91 will detect a larger amount of light, while the other set of opposite light-detecting areas will detect a smaller amount of light, as shown in FIGS. 18A and 18C.

More particularly, when the diffracted light having the elliptic shape as shown in FIG. 17A is incident upon the beam-splitting prism 78, the set of opposite light-detecting areas $a_2$ and $c_2$ of the main-beam photodetector 91 will detect a larger amount of light, while the other set of opposite light-detecting areas $b_2$ and $d_2$ will detect a smaller amount of light, as shown in FIG. 18A. Also, when the diffracted light having the elliptic shape as shown in FIG. 17C is incident upon the beam-splitting prism 78, the set of opposite light-detecting areas $b_2$ and $d_2$ of the main-beam photodetector 91 will detect a larger amount of light, while the other set of opposite light-detecting areas $a_2$ and $c_2$ will detect a smaller amount of light, as shown in FIG. 18C.

When the circular diffracted light as shown in FIG. 17B is incident upon the apex of the beam-splitting prism 78, both the sets of opposite light-detecting areas $a_2$ and $c_2$, and $b_2$ and $d_2$, of the main-beam photodetector 91 will detect an equal amount of light, as shown in FIG. 18B.

Therefore, given that outputs from the light-detecting areas $a_2$, $b_2$, $c_2$ and $d_2$ are $Sa_2$, $Sb_2$, $Sc_2$ and $Sd_2$, respectively, the main-beam photodetector 91 can calculate a focusing error signal FE by the following formula (22):

$$FE=(Sa_2+Sc_2)-(Sb_2+Sd_2) \quad (22)$$

More specifically, when the objective lens 34 is set in the in-focus position in relation to the recording layer 2a in the optical disk 2, the main-beam photodetector 91 calculates the formula (22) to provide a zero focusing error signal FE. When the objective lens 34 is excessively close to the recording layer 2a in the optical disk 2, the main-beam photodetector 91 calculates the formula (22) to provide a positive focusing error signal FE. Also, when the objective lens 34 is excessively apart from the recording layer 2a in the optical disk 2, the main-beam photodetector 91 calculates the formula (22) to provide a negative focusing error signal FE.

The main-beam photodetector 91 in the photodetector assembly 63 calculates a focusing error signal FE from outputs from the light-detecting areas $a_2$, $b_2$, $c_2$ and $d_2$ on each of which the incident light defines a beam spot, and provides a read signal.

The set of side-beam photodetectors 92 and 93 detect an amount of a return part, from the optical disk 2, of the positive and negative first-order light beams resulting from splitting of the outgoing light by the first diffraction grating 75 and incident upon the optical disk 2, and calculates a difference between the positive and negative first-order light beams to provide a tracking error signal TE.

In the optical disk drive 1, the servo circuit 10 controls the lens driving mechanism according to the focusing error signal FE and tracking error signal TE detected by the optical pickup 3 including the aforementioned optical system 30 or 60 to move the objective lens 34 in focusing and tracking directions. Thus, the outgoing light is focused on the recording layer 2a in the optical disk 2 to read information from the optical disk 2.

Since the second diffraction grating 46 in the composite optical element 32 included in the optical system 30 provided in the optical pickup 3 of the optical disk drive 1 diffracts the return light from the optical disk 2 and the third diffraction grating 47 also in the composite optical element 32 further diffracts the return light which is the positive first-order light beam from the second diffraction grating 46, the return light can be directed to an appropriate position even if the light beam emitted from the light-emitting/-detecting element 31 is varied in wavelength due to a variation of the ambient temperature.

Therefore, using the optical pickup simplified in structure with no increased number of parts in comparison with the conventional optical system, the optical disk drive 1 can operate with an improved reliability on the focusing error signal FE provided in the optical pickup 3.

Since the second diffraction grating 76 in the composite optical element 62 included in the optical system 60 in the optical pickup 3 of the optical disk drive 1 diffracts the return light from the optical disk 2, the third diffraction grating 77 also in the composite optical element 62 further diffracts the return light which is the positive first-order light beam from the second diffraction grating 76 and the beam-splitting prism 78 splits, into four beams, the return light which is the negative first-order light beam from the third diffraction grating 77, the return light can be directed to an appropriate position even if the light beam emitted from the light source 61 is varied in wavelength due to a variation of the ambient temperature.

Therefore, using the optical pickup simplified in structure with no increased number of parts in comparison with the conventional optical system, the optical disk drive 1 can operate with an improved reliability on the focusing error signal FE provided in the optical pickup 3.

Since the composite optical element 32 in the optical system 30 of the optical pickup 3 can separate the outgoing light and return light from each other and correct a light-path deviation caused by a variation in wavelength of the light beam emitted from the light-emitting/-detecting element 31, the optical system 30 can be configured to be simpler and smaller with a minimum necessary number of optical parts and thus the optical disk drive 1 can be produced with a reduced cost.

Therefore, because of the composite optical element 32 provided in the optical system 30 used in the optical pickup 3, the optical disk drive 1 can be produced with a higher productivity, less cost and higher reliability.

Since the composite optical element 62 in the optical system 60 of the optical pickup 3 included in the optical disk drive 1 can separate the outgoing light and return light from each other and correct a light-path deviation caused by a variation in wavelength of the light beam emitted from the light source 61, the optical system 60 can be configured simpler and smaller with a minimum necessary number of optical parts and thus can be produced with a reduced cost.

Therefore, because of the composite optical element 62 provided in the optical system 60 used in the optical pickup 3, the optical disk drive 1 can be produced with a higher productivity and reduced cost and have an improved reliability.

In case the optical disk drive 1 uses the optical pickup 3 including the optical system 30, a light source and a photodetector are formed integrally with each other as a single optical unit, namely, the light-emitting/-detecting element 31. Thus, the optical disk drive 1 can be formed from a further reduced number of parts and thus produced with a reduced cost.

In the aforementioned main-beam photodetector, the beam spot is divided by the parting lines. In the optical system 60 of the optical pickup 3 in the optical disk drive 1, however, the beam-splitting prism 78 provided in the composite optical element 62 splits, on the light path, the return light from the optical disk 2. So, by designing the main-beam photodetector 91 for a predetermined size of each of the light-detecting areas $a_2$, $b_2$, $c_2$ and $d_2$ upon which the four return light beams from the beam-splitting prism 78 are incident, respectively, the main-beam photodetector may not have the light-detecting surface thereof divided into the light-detecting areas with a high precision.

Thus, the main-beam photodetector 91 in the optical pickup 3 included in the optical disk drive 1 can be produced with a reduced cost, the position of the main-beam photodetector 91 can easily be adjusted in the process of producing the optical pickup 3, and the focusing error signal FE provided in the optical pickup 3 is more reliable.

Further, the optical system 60 used in the optical pickup 3 of the optical disk drive 1 has the first light shielding plate 64 provided therein. The first light shielding plate 64 can direct only the valid beam of the light beam emitted from the light source 61 to the composite optical element 62 to shield unnecessary incident light upon the composite optical element 62 and reduce irregular reflection of the stray light inside the composite optical element 62. Also in the optical disk drive 1, the second light shielding plate 65 is also provided in the optical system 60 in the optical pickup 3 to direct only the valid beam of the return light passing by the composite optical element 62 to the photodetector assembly 63. The second light shielding plate 65 can shield unnecessary incident light upon the photodetector assembly 63 and thus improve the reliability on the light-detection level of the photodetector assembly 63.

Note that the optical system 60 in the optical pickup 3 of the optical disk drive 1 is not limited to the aforementioned example including the first and second light shielding plates 64 and 65 as shown in FIGS. 11 and 12 but the composite optical element 62 may have a light-absorbing paint applied on the surface thereof or a light-opaque film formed, by evaporation, on the surface thereof or have the surface thereof roughed, for example, to shield unnecessary light.

In the optical disk drive 1, the so-called astigmatism is adopted in the aforementioned optical pickup 3 to provide a focusing error signal FE but any other light-detecting method such as the Foucault process or the like may be adopted for this purpose.

Further in the optical disk drive 1, if it is difficult to form a single element such as the aforementioned composite optical element 32 or 63 in the optical system 30 or 60, an optical system in which the optical elements are disposed separately as above may of course be formed to assure the same function as that of such a composite optical element.

On this account, configuration examples of the optical pickup 3 will be described below, not formed from a single element such as the composite optical element 32 or 62 but in which the optical elements are disposed as above. It should be noted that the aforementioned optical pickup 3 including the composite optical element 32 or 62 has the optical system configured to correct a light-path deviation but the optical pickup 3 which will be described below has an optical system that corrects astigmatism.

Figure 19:
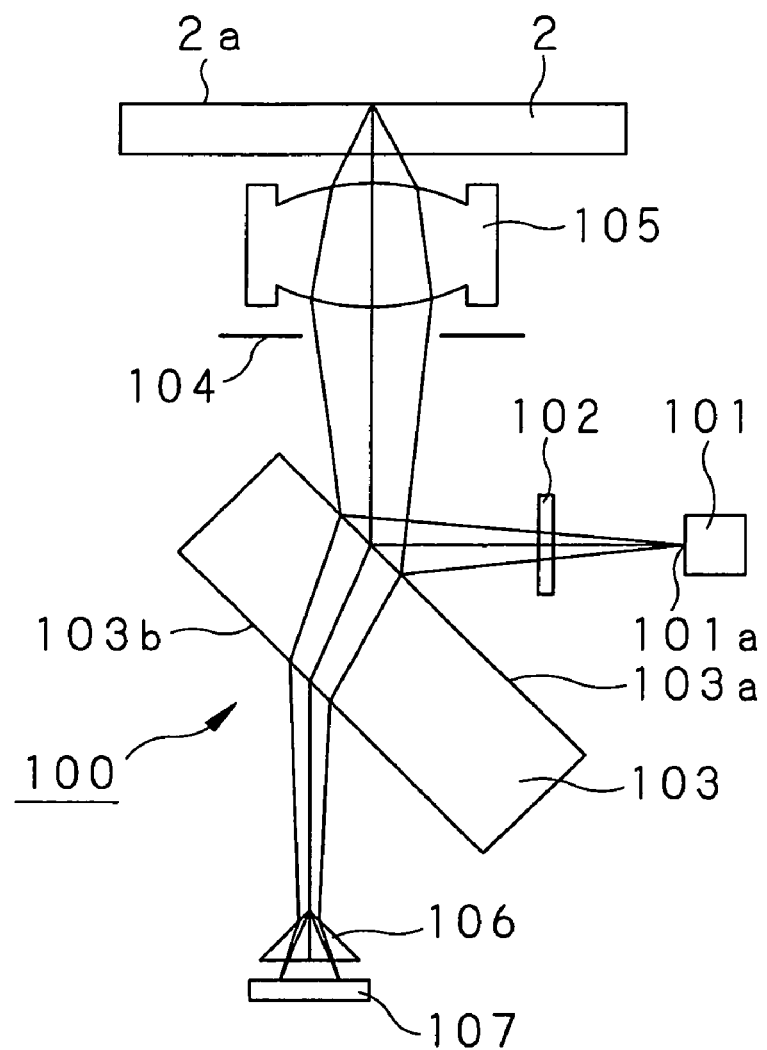
FIG. 19 is a schematic side elevation of another variant of the optical system of the optical pickup provided in the optical disk drive according to the present invention.

In a first example, the optical pickup 3 includes an optical system 100 that reads information from the optical disk 2, and a lens driving mechanism (not shown) that moves an objective lens included in the optical system 100 and which will be described in detail later, as shown in FIG. 19 for example. The optical pickup 3 including the optical system 100 will be described below, but the same or similar elements of the optical pickup 3 including the optical system 100 as or to those of the optical pickup 3 including the optical system 30 or 60 will be indicated with the same or similar references as or to those of the elements in the latter optical pickup 3 and will not be described in detail any more.

The optical system 100 of the optical pickup 3 includes, in the order following the light beam part, a light source 101 that emits a laser beam toward the optical disk 2, a diffraction grating 102 that splits the laser beam emitted from the light source 101 into three beams, a beam splitter 103 that reflects the outgoing three light beams from the diffraction grating 102, while allowing the return light from the optical disk 2 to pass through, a limiting aperture 104 that limits the outgoing light reflected by the beam splitter 103 to a predetermined numerical aperture NA, an objective lens 105 that focuses the outgoing light limited by the limiting aperture 104 onto the recording layer $2a$ of the optical disk 2, a beam-splitting prism 106 that splits, into four beams, the return light reflected by the optical disk 2 and passing by the beam splitter 103, and a photodetector assembly 107 that detects the return light split by the beam-splitting prism 106.

The light source 101 uses a semiconductor laser that emits a laser beam having a wavelength of 780 nm, for example, from a light-emitting point $101a$.

The diffraction grating 102 is to diffract the light beam emitted from the light source 101 into three beams including a zero-order light beam and positive and negative first-order light beams. It diverges the outgoing light in the direction of the recording track on the optical disk 2. The optical system 100 adopts the so-called DPP (differential push-pull) method to provide a tracking error signal TE, and it provides a tracking servo control by detecting, by the photodetector assembly 107, the positive and negative first-order light beams from the diffraction grating 102.

The beam splitter 103 is a flat transparent plate having first and second surfaces $103a$ and $103b$ parallel to each other. The first and second surfaces $103a$ and $103b$ are disposed each at a predetermined angle in relation to the light emitted from the light source 101. The beam splitter 103 reflects the light beam emitted from the light source 101 at the first surface $103a$ toward the optical disk 2, while allowing the return light from the optical disk 2 to pass through the first and second surfaces $103a$ and $103b$ and travel toward the beam-splitting prism 106.

The beam splitter 103 imparts a predetermined extent of astigmatism to the return light coming from the optical disk 2, passing by the beam splitter 103 and incident upon the beam-splitting prism 106. The beam splitter 103 can easily adjust the defocusing of the light beam in relation to the optical disk 2 by adjusting the optical-axial position of the light beam emitted from the light source 101.

On the first surface $103a$ of the beam splitter 103, a half mirror is provided that reflects the light beam emitted from the double-wavelength light source 101 while allowing the return light from the optical disk 2 to pass through. Also, on the second surface $103b$ of the beam splitter 103, a diffraction element is provided that corrects the extent of astigmatism of the return light from the optical disk 2. The diffraction element will correct the astigmatism of the return light passing by the beam splitter 103 to an appropriate extent for focus adjustment. The above diffraction element may be a hologram element having a predetermined hologram pattern formed by etching or similar process, for example. In this case, the hologram element should preferably be a surface-relieved one or a brazed hologram, to improve the efficiency of diffraction.

The limiting aperture 104 is disposed on the optical axis of the outgoing light reflected at the first surface 103a of the beam splitter 103 to limit the outgoing light to a predetermined numerical aperture.

The objective lens 105 is formed from at least one convex lens, and disposed to focus, on the optical disk 2, the light beam emitted from the light source 101 and limited by the limiting aperture 104.

Figure 20:
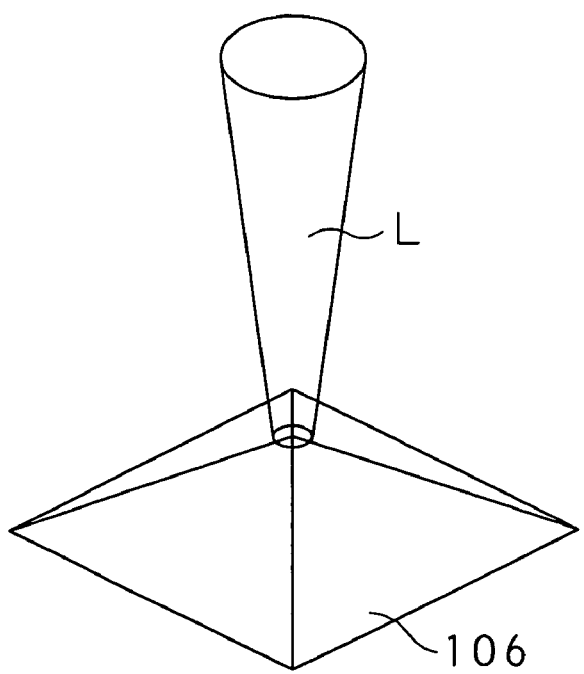
FIG. 20 is a perspective view of a beam-splitting prism provided in the variant of the optical system of the optical pickup in FIG. 19.
Figure 21:
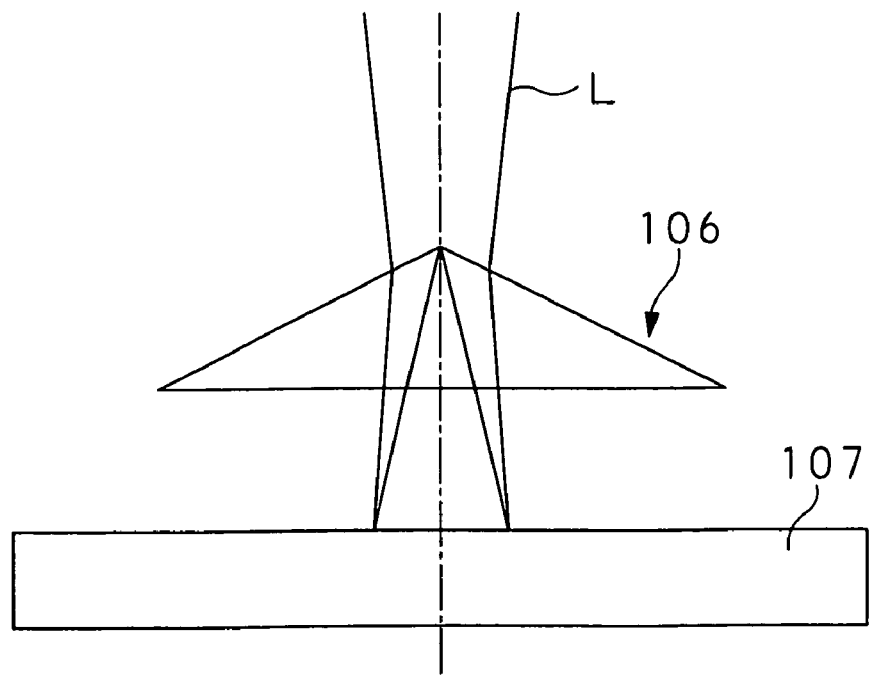
FIG. 21 is a side elevation of the beam-splitting prism provided in the variant of the optical system of the optical pickup in FIG. 19.

As shown in FIGS. 20 and 21, the beam-splitting prism 106 is shaped to have the form of a generally regular-tetragonal pyramid and disposed for the center of the return light having passed by the beam splitter 103 to fall, at or close to the focus of the return light, on that of the apex of the tetragonal pyramid. The beam-splitting prism 106 is positioned on the light path of the return light having passed by the beam splitter 103 to split the return light into four beams.

Also the beam-splitting prism 106 is disposed for the zero-order one of the three beams from the diffraction grating 102 to be incident upon the apex of the prism 106. It should be noted that the beam-splitting prism 106 has the regular-tetragonal pyramid bottom thereof disposed perpendicular to the optical axis of the zero-order one of the three beams from the diffraction grating 102.

The beam-splitting prism 106 is formed from a resin material by injection molding. It should be noted that the material of the composite optical element 106 is not limited to the resin material but may be a transparent optical material such as nitric material. Further, the beam-splitting prism 106 may be formed from a combination of these optical materials so that one part thereof may be different in material from the other part.

Figure 22:
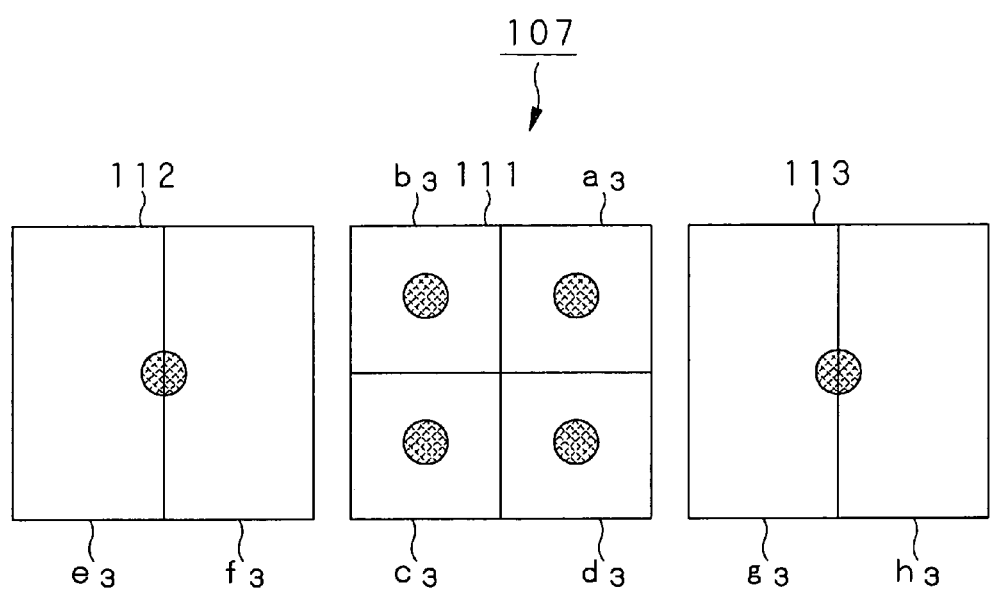
FIG. 22 explains a main-beam photodetector and side-beam photodetectors in a photodetector assembly provided in the variant of the optical system of the optical pickup in FIG. 19.

As shown in FIG. 22, the photodetector assembly 107 includes a generally square main-beam photodetector 111 that detects a main beam which is the zero-order light beam from the diffraction grating 102, and a pair of generally square side-beam photodetectors 112 and 113 each formed from a pair of generally rectangular areas and that detect two side beams, respectively, which are positive and negative first-order light beams from the diffraction grating 102. The photodetector assembly 107 is disposed correspondingly to the return light beams from the beam-splitting prism 106. That is, in the photodetector assembly 107, the generally square main-beam photodetector 111 is disposed in the center, and the pair of generally square side-beam photodetectors 112 and 113 is disposed across the main-beam photodetector 111.

The main-beam photodetector 111 in the photodetector assembly 107 is quadrisected into light-detecting areas $a_3$, $b_3$, $c_3$ and $d_3$ by a pair of parting lines perpendicular to each other. The return light beams resulted from quadrisection of the return light by the beam-splitting prism 106 are incident upon the light-detecting areas $a_3$, $b_3$, $c_3$ and $d_3$, respectively.

The side-beam photodetectors 112 and 113 of the photodetector assembly 107 are bisected by a set of parting lines into light-detecting areas $e_3$ and $f_3$, and $g_3$ and $h_3$, respectively. One of the return light beams from the optical disk 2, corresponding to the positive and negative first-order light beams from the diffraction grating 102, is incident upon the light-detecting areas $e_3$ and $f_3$, while the other return light beam from the optical disk 2, corresponding to the positive and negative first-order light beams from the diffraction grating 102, is incident upon the light-detecting areas $g_3$ and $h_3$.

The lens driving mechanism in the optical pickup 3 includes a lens holder to hold the objective lens 105, a holding support member to support the lens holder to be movable biaxially, namely, in a focusing direction parallel to the optical axis of the objective lens 105 and a tracking direction perpendicular to the optical axis of the objective lens 105, and an electromagnetic drive unit to move the lens holder biaxially under the action of an electromagnetic force (these components are not illustrated).

The above lens driving mechanism moves the objective lens 105 in a focusing direction according to a focusing error signal from the main-beam photodetector 111 in the photodetector assembly 107 and a tracking direction according to a tracking error signal from the side-beam photodetectors 112 and 123, to thereby focus the outgoing light on a recording track on the recording layer 2a in the optical disk 2.

In the optical disk drive 1 provided with the optical pickup 3 including the aforementioned optical system 100, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the objective lens 105 in the focusing and tracking directions, and thus the outgoing light is focused by the objective lens 105 onto a desired recording track on the optical disk 2. Then, in the optical disk drive 1, signals read by the optical pickup 3 are demodulated by the signal demodulation circuit 12 and error-corrected by the error correction circuit 13, and then delivered as read signals at the interface 14.

The outgoing light and return light travel along their respective light paths in the aforementioned optical system 100 of the optical pickup 3 as will be described below.

When the optical disk drive 1 reads information from the recording layer 2a of the optical disk 2, the light beam emitted from the light source 101 is split by the diffraction grating 102 into three beams including zero-order light beam and positive and negative first-order light beams as shown in FIG. 19. These three beams are reflected at the first surface 103a of the beam splitter 103, limited by the limiting aperture 104 to a predetermined numerical aperture NA, and focused by the objective lens 105 onto the recording layer 2a of the optical disk 2.

The return light from the recording layer 2a of the optical disk 2 is refracted at the first surface 103a of the beam splitter 103, passes by the beam splitter 103, is refracted at the second surface 103b and has the astigmatism corrected, and the return light corresponding to the zero-order light beam from the diffraction grating 102 is incident upon the apex of the beam-splitting prism 106. The return light incident upon the apex of the beam-splitting prism 106 having the form of a regular-tetragonal pyramid is incident upon each of the side faces of the regular-tetragonal pyramid, and thus refracted in different directions to be four return light beams which will be incident upon the light-detecting areas $a_3$, $b_3$, $c_3$ and $d_3$, respectively, of the main-beam photodetector 111 of the photodetector 107. Also, one of the return light beams from the optical disk 2, corresponding to the positive and negative first-order light beams coming from the diffraction grating 102 and passing by the beam splitter 103, is incident upon the light-detecting areas $e_3$ and $f_3$ of the side-beam photodetector 112 of the photodetector assembly 107, while the other return light beam is incident upon the light-detecting areas $g_3$ and $h_3$ of the side-beam photodetector 113 of the photodetector assembly 107.

Figure 23A:
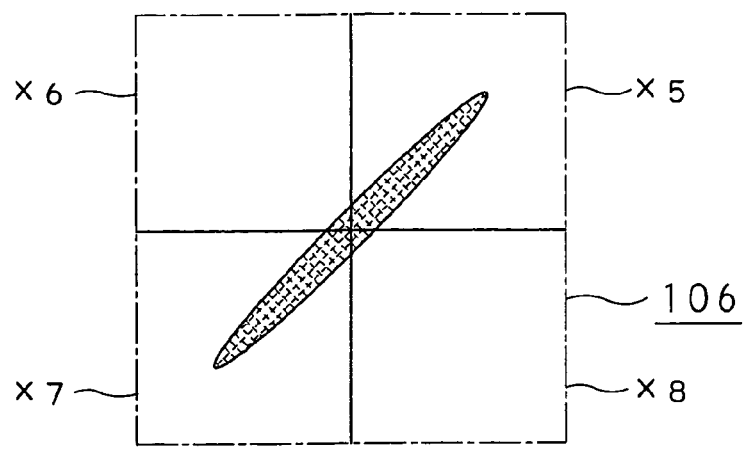
Figure 23B:
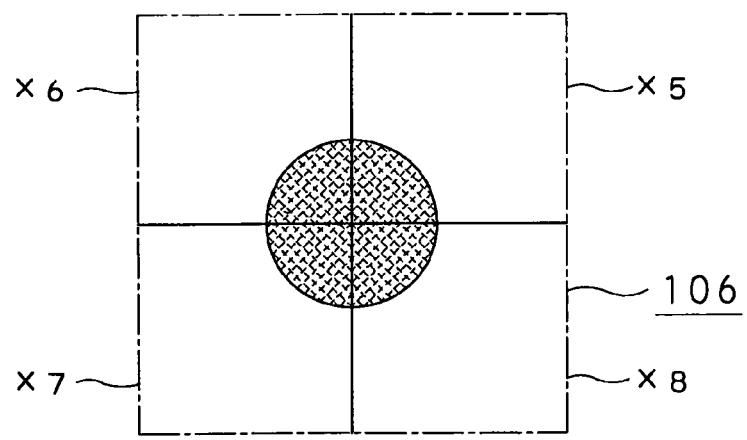

Note here that if the objective lens 105 is positioned in the just-in-focus position in relation to the recording layer 2a of the optical disk 2 as shown in FIG. 23B when the return light having passed by the beam splitter 103 is incident upon the apex of the beams splitting prism 106, the incident return light will take a generally circular shape.

On the other hand, if the objective lens 105 is excessively close to the recording layer 2a in the optical disk 2 when the return light is incident upon the apex of the beam-splitting prism 106, the objective lens 105 will be off the in-focus position as shown in FIG. 23A. Thus, astigmatism will take place because the return light passes by the beam splitter 103. In this case, the incident light upon the apex of the beam-splitting prism 106 will take the form of an ellipse whose major axis extends obliquely to the upper right as shown in FIG. 23A.

Figure 23C:
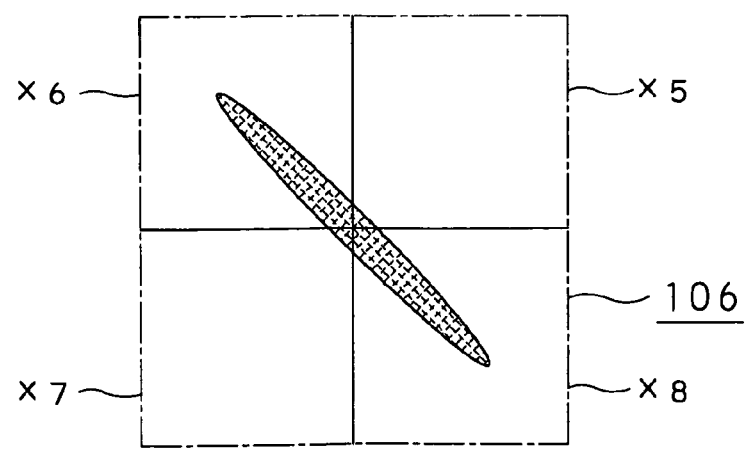

If the objective lens 105 is excessively apart from the recording layer 2a in the optical disk 2 when the return light is incident upon the apex of the beam-splitting prism 106, the objective lens 105 will also be off the in-focus position as shown in FIG. 23C. Thus, astigmatism will take place because the return light passes by the beam splitter 103. In this case, the incident light upon the apex of the beam-splitting prism 106 will also take the form of an ellipse whose major axis extends obliquely to the upper left as shown in FIG. 23C.

Therefore, when the return light is incident upon the apex of the beam-splitting prism 106 with the objective lens 105 being off the in-focus position, the majority of the return light is incident upon one of two sets of opposite side faces $x_5$ and $x_7$, and $x_6$ and $x_8$ of the beam-splitting prism 106, while an extremely small part of the return light will be incident upon the other set of surfaces.

More specifically, the majority of the return light having the elliptical shape as shown in FIG. 23A will be incident upon one set of opposite side faces $x_5$ and $x_7$ of the beam-splitting prism 106, while the extremely small part of the return light will be incident upon the other set of opposite side faces $x_6$ and $x_8$. Also, the majority of the return light having the elliptical shape as shown in FIG. 23C will be incident upon the other set of opposite side faces $x_6$ and $x_8$ of the beam-splitting prism 106, while the extremely small part of the return light will be incident upon the one set of opposite side faces $x_5$ and $x_7$.

The return light from the optical disk 2, which is a part of the zero-order light beam split by the diffraction grating 102, is diffracted by the beam-splitting prism 106 to be a negative first-order light beam. This negative first-order light beam is incident upon each of the opposite side faces $x_5$ and $x_6$, and $x_7$ and $x_8$ and diffracted in different directions. Thus, the return light is split into four return light beams which will be incident upon the light-detecting areas $a_3$, $b_3$, $c_3$ and $d_3$, respectively, of the main-beam photodetector 111 of the photodetector assembly 107.

Figure 24A:
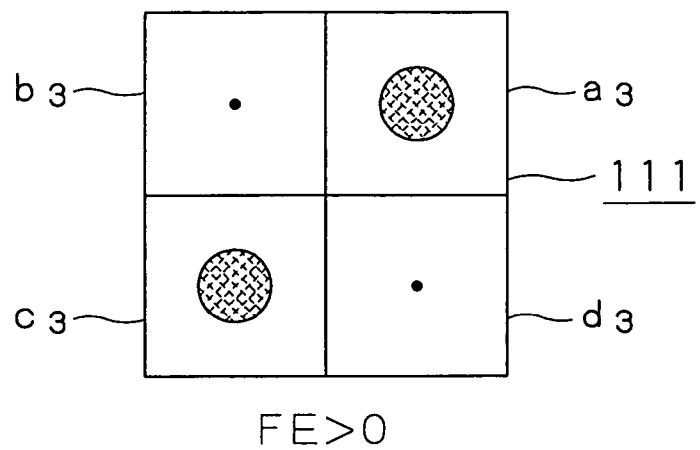
Figure 24B:
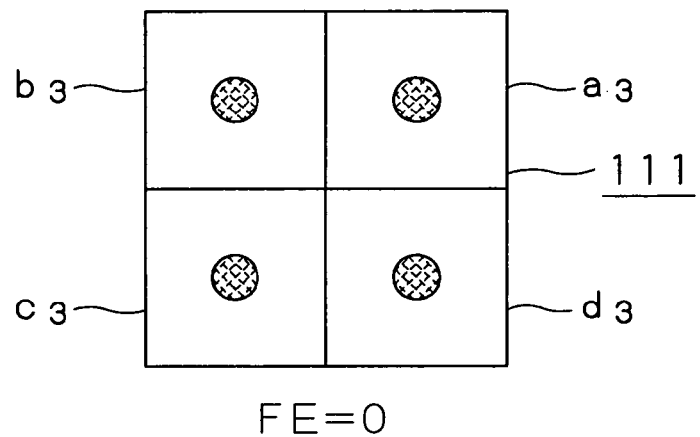
Figure 24C:
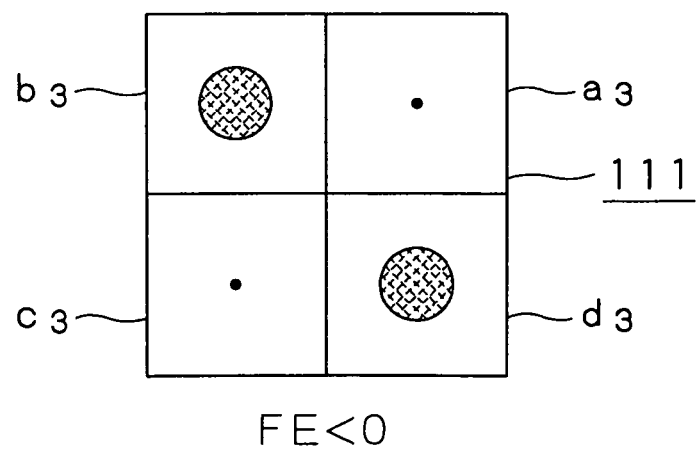

Thus, one of the two sets of opposite light-detecting areas $a_3$ and $c_3$, and $b_3$ and $d_3$, of the main-beam photodetector 111 detects a larger amount of light, while the other set will detect a smaller amount of light, as shown in FIGS. 24A and 24C.

More particularly, when the return light having the elliptic shape as shown in FIG. 23A is incident upon the beam-splitting prism 106, the set of opposite light-detecting areas $a_3$ and $c_3$ of the main-beam photodetector 111 will detect a larger amount of light, while the other set of opposite light-detecting areas $b_3$ and $d_3$ will detect a smaller amount of light, as shown in FIG. 24A. Also, when the return light having the elliptic shape as shown in FIG. 23C is incident upon the beam-splitting prism 106, the set of opposite light-detecting areas $b_3$ and $d_3$ of the main-beam photodetector 111 will detect a larger amount of light, while the other set of opposite light-detecting areas $a_3$ and $c_3$ will detect a smaller amount of light, as shown in FIG. 24C.

When the circular return light as shown in FIG. 23B is incident upon the apex of the beam-splitting prism 106, both the sets of opposite light-detecting areas $a_3$ and $c_3$, and $b_3$ and $d_3$, of the main-beam photodetector 111 will detect an equal amount of light, as shown in FIG. 24B.

Therefore, given that outputs from the light-detecting areas $a_3$, $b_3$, $c_3$ and $d_3$ of the main-beam photodetector 111 are $Sa_3$, $Sb_3$, $Sc_3$ and $Sd_3$, respectively, a focusing error signal FE can be calculated as given by the following formula (23):

$$FE=(Sa_3+Sc_3)-(Sb_3+Sd_3) \quad (23)$$

More specifically, when the objective lens 105 is set in the in-focus position in relation to the recording layer 2a in the optical disk 2, the main-beam photodetector 111 calculates the formula (23) to provide a zero focusing error signal FE. When the objective lens 105 is excessively close to the recording layer 2a in the optical disk 2, the main-beam photodetector 111 calculates the formula (23) to provide a positive focusing error signal FE. Also, when the objective lens 105 is excessively apart from the recording layer 2a in the optical disk 2, the main-beam photodetector 111 calculates the formula (23) to provide a negative focusing error signal FE.

The main-beam photodetector 111 in the photodetector assembly 107 calculates a focusing error signal FE on the basis of outputs from the light-detecting areas $a_3$, $b_3$, $c_3$ and $d_3$ on each of which the incident light defines a beam spot, and provides a read signal.

Also, the positive and negative first-order light beams, resulting from splitting by the diffraction grating 102, of the return light from the optical disk 2, are incident upon the light-detecting areas $e_3$ and $f_3$, and $g_3$ and $h_3$, respectively, of the pair of side-beam photodetectors 112 and 113.

Therefore, given that outputs from the light-detecting areas $e_3$ and $f_3$, and $g_3$ and $h_3$ of the pair of side-beam photodetectors 112 and 113 are $Se_3$ and $Sf_3$, and $Sg_3$ and $Sh_3$, respectively, a tracking error signal TE can be calculated as given by the following formula (24):

$$TE=(Sa_3+Sc_3)-(Sb_3+Sd_3)-\alpha((Se_3-Sf_3)+((Sg_3-Sh_3)) \quad (24)$$

In the optical pickup 3 including the optical system 100 configured as above, the astigmatism can appropriately be corrected by the second surface 103b of the beam splitter 103 and the return light can be split into four beams by the beam-splitting prism 106. So, the return light can appropriately be directed to each of the light-detecting areas of the photodetector assembly 107.

Figure 25:
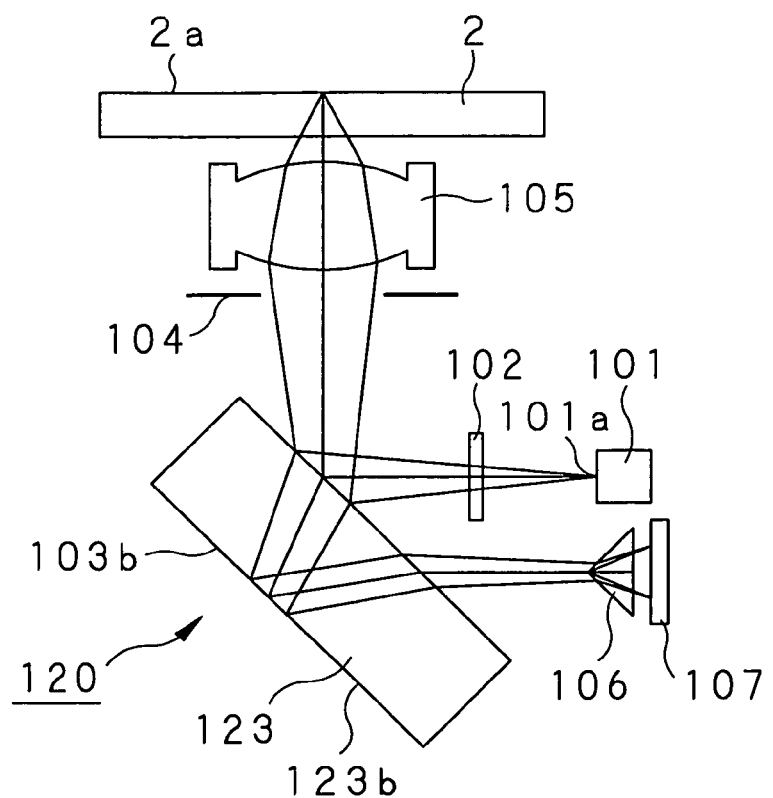
FIG. 25 is a schematic side elevation of a still another variant of the optical system of the optical pickup provided in the optical disk drive according to the present invention.

In a second example, the optical pickup 3 includes an optical system 120 that reproduces information for the optical disk 2, and a lens driving mechanism (not shown) that moves an objective lens included in the optical system 120 and which will be described in detail later, as shown in FIG. 25 for example. The optical pickup 3 including the optical system 120 will be described below, but it should be noted that the same or similar elements of this optical pickup 3 as or to those of the optical pickup 3 using the optical system 100 will be indicated with the same or similar references as or to those of the elements in the latter optical pickup 3 and will not be described in detail any more.

The optical system 120 of the optical pickup 3 includes, in the order following the light beam part, a light source 101 that emits a laser beam toward the optical disk 2, a diffraction grating 102 that splits the light beam emitted from the light source 101 into three beams, a beam splitter 123 that makes the outgoing three light beams from the diffraction grating 102 and the return light from the optical disk 2 travel along different light paths, respectively, a limiting aperture 104 that limits the outgoing light split by the beam splitter 123 to a predetermined numerical aperture NA, an objective lens 105 that focuses the outgoing light limited by the limiting aperture 104 onto the recording layer 2a of the optical disk 2, a beam-splitting prism 106 that splits, into four beams, the return light reflected by the optical disk 2 and passing by the beam splitter 123, and a photodetector assembly 107 that detects the return light split by the beam-splitting prism 106.

The beam splitter 123 is a flat transparent plate having first and second surfaces 123a and 123b parallel to each other. The first and second surfaces 123a and 123b are disposed each at a predetermined angle in relation to the light beam emitted from the light source 101. The light beam emitted from the light source 101 is reflected at the first surface 123a toward the optical disk 2, and the return light from the optical disk 2 passes by the first surface 123a, is reflected at the second surface 123b, then passes by the first surface 123a, and travels toward the beam-splitting prism 106. The beam splitter 123 provides a total reflection at the second surface 123b. The second surface 123b is a reflecting film formed by evaporation or a similar process to provide a total reflection of the return light.

The beam splitter 123 imparts a predetermined extent of astigmatism to the return light coming from the optical disk 2 for incidence upon the beam-splitting prism 106. The beam splitter 123 can easily adjust the defocusing of the light beam in relation to the optical disk 2 by adjusting the optical-axial position of the light beam emitted from the light source 101.

On the first surface 123a of the beam splitter 123, a half mirror is provided that reflects the light beam emitted from the double-wavelength light source 101, while allowing the return light from the optical disk 2 to pass through. Also, in an area on the first surface 123a of the beam splitter 123, at which the return light from the optical disk 2 outgoes, a diffraction element is provided that corrects the extent of astigmatism of the return light from the optical disk 2. The diffraction element will correct the astigmatism of the return light passing by the beam splitter 123 to an appropriate extent for focus adjustment. The above diffraction element may be a hologram element having a predetermined hologram pattern formed by etching or similar process, for example. In this case, the hologram element should preferably be a surface-relieved one or a brazed hologram, to improve the efficiency of diffraction.

As shown in FIGS. 20 and 21, the beam-splitting prism 106 is shaped to have the form of a generally regular-tetragonal pyramid and disposed for the center of the return light having passed by the beam splitter 123 to fall, at or close to the focus of the return light, on that of the apex of the tetragonal pyramid. The beam-splitting prism 106 is positioned on the light path of the return light having passed by the beam splitter 123 to split the return light into four beams.

In the optical disk drive 1 provided with the optical pickup 3 including the aforementioned optical system 120, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the objective lens 105 in the focusing and tracking directions, and thus the outgoing light is focused by the objective lens 105 onto a desired recording track on the optical disk 2. Then, in the optical disk drive 1, signals read by the optical pickup 3 are demodulated by the signal demodulation circuit 12 and error-corrected by the error correction circuit 13, and delivered as read signal at the interface 14.

The outgoing light and return light travel along the light paths in the aforementioned optical system 120 of the optical pickup 3 as will be described below.

When the optical disk drive 1 reads information from the recording layer 2a of the optical disk 2, the light beam emitted from the light source 101 is diffracted by the diffraction grating 102 into three beams including a zero-order light beam and positive and negative first-order light beams as shown in FIG. 25. These three beams are reflected at the first surface 123a of the beam splitter 123, limited by the limiting aperture 104 to a predetermined numerical aperture NA, and focused by the objective lens 105 onto the recording layer 2a of the optical disk 2.

The return light from the recording layer 2a of the optical disk 2 is refracted at the first surface 123a of the beam splitter 123, passes by the beam splitter 123, is reflected at the second surface 123b and has the astigmatism corrected in a light-outgoing area different from the light-detecting area of the first surface 123a, and the return light corresponding to the zero-order light beam resulting from diffraction by the diffraction grating 102 is incident upon the apex of the beam-splitting prism 106. The return light incident upon the apex of the beam-splitting prism 106 having the form of a regular-tetragonal pyramid is incident upon each of the side faces of the regular-tetragonal pyramid, and thus refracted in different directions to be four return light beams which will be incident upon the light-detecting areas $a_3$, $b_3$, $c_3$ and $d_3$, respectively, of the main-beam photodetector 111 of the photodetector assembly 107. Also, one of the return light beams from the optical disk 2, corresponding to the positive and negative first-order light beams coming from the diffraction grating 102 and passing by the beam splitter 123, is incident upon the light-detecting areas $e_3$ and $f_3$ of the side-beam photodetector 112 of the photodetector assembly 107, while the other return light beam is incident upon the light-detecting areas $g_3$ and $h_3$ of the side-beam photodetector 113 of the photodetector assembly 107.

In the optical pickup 3 including the optical system 120 configured as above, the astigmatism can appropriately be corrected by a diffraction grating provided in the light-outgoing area of the second surface 123a of the beam splitter 123 and the return light can be split into four beams by the beam-splitting prism 106. So, the return light can appropriately be directed to each of the light-detecting areas of the photodetector assembly 107.

Figure 26:
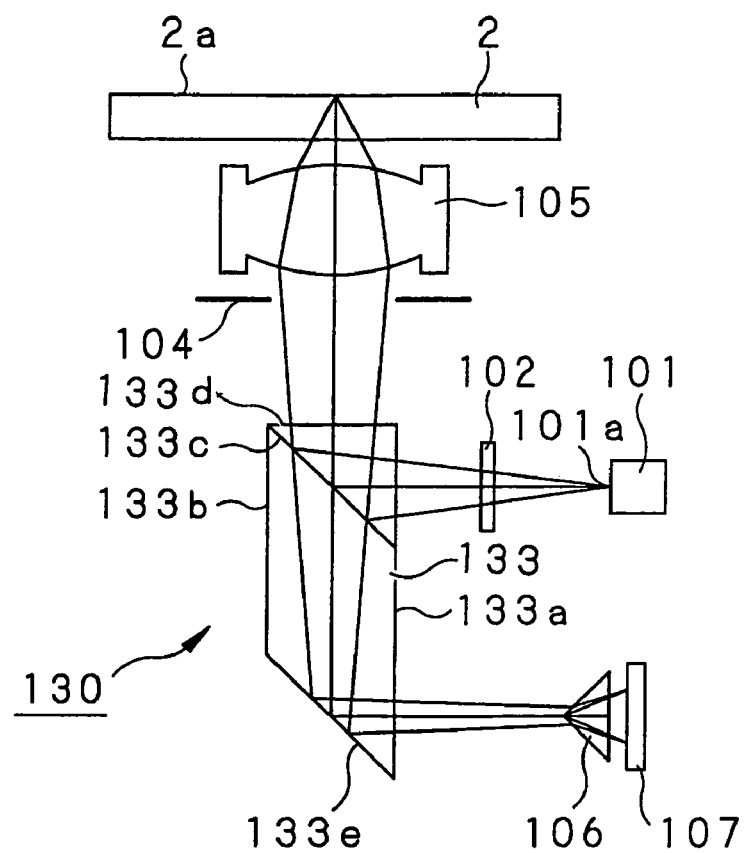
FIG. 26 is a schematic side elevation of a yet another variant of the optical system of the optical pickup provided in the optical disk drive according to the present invention.

In a third example, the optical pickup 3 includes an optical system 130 that reproduces information for the optical disk 2, and a lens driving mechanism (not shown) that moves an objective lens included in the optical system 130 and which will be described in detail later, as shown in FIG. 26 for example. The optical pickup 3 including the optical system 130 will be described below, but the same or similar elements of this optical pickup 3 as or to those of the optical pickup 3 using the optical system 100 will be indicated with the same or similar references as or to those of the elements in the latter optical pickup 3 and will not be described in detail any more.

The optical system 130 of the optical pickup 3 includes, in the order following the light beam part, a light source 101 that emits a laser beam toward the optical disk 2, a diffraction grating 102 that splits, by diffraction, the light beam emitted from the light source 101 into three beams, a beam splitter 133 that allows the outgoing three light beams resulted from diffraction by the diffraction grating 102 and the return light from the optical disk 2 to travel along different light paths, a limiting aperture 104 that limits the outgoing light split by the beam splitter 133 to a predetermined numerical aperture NA, an objective lens 105 that focuses the outgoing light limited by the limiting aperture 104 onto the recording layer 2a of the optical disk 2, a beam-splitting prism 106 that splits, into four beams, the return light reflected by the optical disk 2 and passing by the beam splitter 133, and a photodetector assembly 107 that detects the return light split by the beam-splitting prism 106.

The beam splitter 133 is a transparent member having a first surface 133a, a second surface 133b parallel to the first surface 133a, a third surface 133c positioned between the first and second surfaces 133a and 133b and inclined a predetermined angle in relation to the optical axis of the outgoing light, a fourth surface 133d perpendicular to the first and second surfaces 133a and 133b, and a fifth surface 133e generally parallel to the third surface 133c. In the beam splitter 133, the first and second surfaces 133a and 133b are disposed generally perpendicularly to the light beam emitted from the light source 101, the light beam emitted from the light source 101 passes by the first surface 133a, is reflected at the third surface 133c and passes by the fourth surface 133d toward the optical disk 2. The return light from the optical disk 2 passes by the fourth and third surfaces 133d and 133c, is reflected at the fifth surface 133e and passes by the first surface 133a toward the beam-splitting prism 106.

The beam splitter 133 provides a total reflection at the fifth surface 133e. The fifth surface 133e is a reflecting film formed by evaporation or a similar process to provide a total reflection of the return light.

Also, the beam splitter 133 imparts a predetermined extent of astigmatism to the return light from the optical disk 2 for incidence upon the beam-splitting prism 106. The beam splitter 133 can easily adjust the defocusing of the light beam in relation to the optical disk 2 by adjusting the optical-axial position of the light beam emitted from the light source 101.

On the third surface 133c of the beam splitter 133, a half mirror is provided that reflects the light beam emitted from the double-wavelength light source 101, while allowing the return light from the optical disk 2 to pass through. Also, in an area on the first surface 133a of the beam splitter 133, at which the return light from the optical disk 2 departs, a diffraction element is provided that corrects the extent of astigmatism of the return light from the optical disk 2. The diffraction element will correct the astigmatism of the return light passing by the beam splitter 133 to an appropriate extent for focus adjustment. Also, the above diffraction element may be a hologram element having a predetermined hologram pattern formed by etching or similar process, for example. In this case, the hologram element should preferably be a surface-relieved one or a brazed hologram, to improve the efficiency of diffraction.

As shown in FIGS. 20 and 21, the beam-splitting prism 106 is shaped to have the form of a generally regular-tetragonal pyramid and disposed for the center of the return light having passed by the beam splitter 133 to fall, at or close to the focus of the return light, on that of the apex of the tetragonal pyramid. The beam-splitting prism 106 is positioned on the light path of the return light having passed by the beam splitter 133 to split the return light into four beams.

In the optical disk drive 1 provided with the optical pickup 3 including the aforementioned optical system 130, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the objective lens 105 in the focusing and tracking directions, and thus the outgoing light is focused by the objective lens 105 onto a desired recording track on the optical disk 2. Then, in the optical disk drive 1, signals read by the optical pickup 3 are demodulated by the signal demodulation circuit 12 and error-corrected by the error correction circuit 13, and then delivered as read signal at the interface 14.

The outgoing light and return light travel along the light paths inside the aforementioned optical system 130 included in the optical pickup 3 as will be described below.

When the optical disk drive 1 reads information from the recording layer 2a of the optical disk 2, the light beam emitted from the light source 101 is split by the diffraction grating 102 into three beams including a zero-order light beam and positive and negative first-order light beams as shown in FIG. 26. These three beams pass through the first surface 133a of the beam splitter 133, are reflected at the third surface 133c, then pass through the fourth surface 133d, are limited by the limiting aperture 104 to a predetermined numerical aperture NA, and focused by the objective lens 105 onto the recording layer 2a of the optical disk 2.

The return light from the recording layer 2a of the optical disk 2 passes by the fourth and third surfaces 133d and 133c of the beam splitter 133, is reflected by the fifth surface 133e, and has the astigmatism corrected in a light-outgoing area different from the light-detecting area of the first surface 133a while passing by. The return light corresponding to the zero-order light beam from the diffraction grating 102 is incident upon the apex of the beam-splitting prism 106. The return light incident upon the apex of the beam-splitting prism 106 having the form of a regular-tetragonal pyramid is incident upon each of the side faces of the regular-tetragonal pyramid, and thus refracted in different directions to be four return light beams which will be incident upon the light-detecting areas $a_3$, $b_3$, $c_3$ and $d_3$, respectively, of the main-beam photodetector 111 of the photodetector assembly 107. Also, one of the return light beams from the optical disk 2, corresponding to the positive and negative first-order light beams coming from the diffraction grating 102 and passing by the beam splitter 133, is incident upon the light-detecting areas $e_3$ and $f_3$ of the side-beam photodetector 112 of the photodetector assembly 107, while the other return light is incident upon the light-detecting areas $g_3$ and $h_3$ of the side-beam photodetector 113 of the photodetector assembly 107.

In the optical pickup 3 including the optical system 130 configured as above, the astigmatism can appropriately be corrected by a diffraction grating provided in the light-outgoing area of the first surface 133a of the beam splitter 133 and the return light can be split into four beams by the beam-splitting prism 106. So, the return light can appropriately be directed to each of the light-detecting areas of the photodetector assembly 107.

Figure 27:
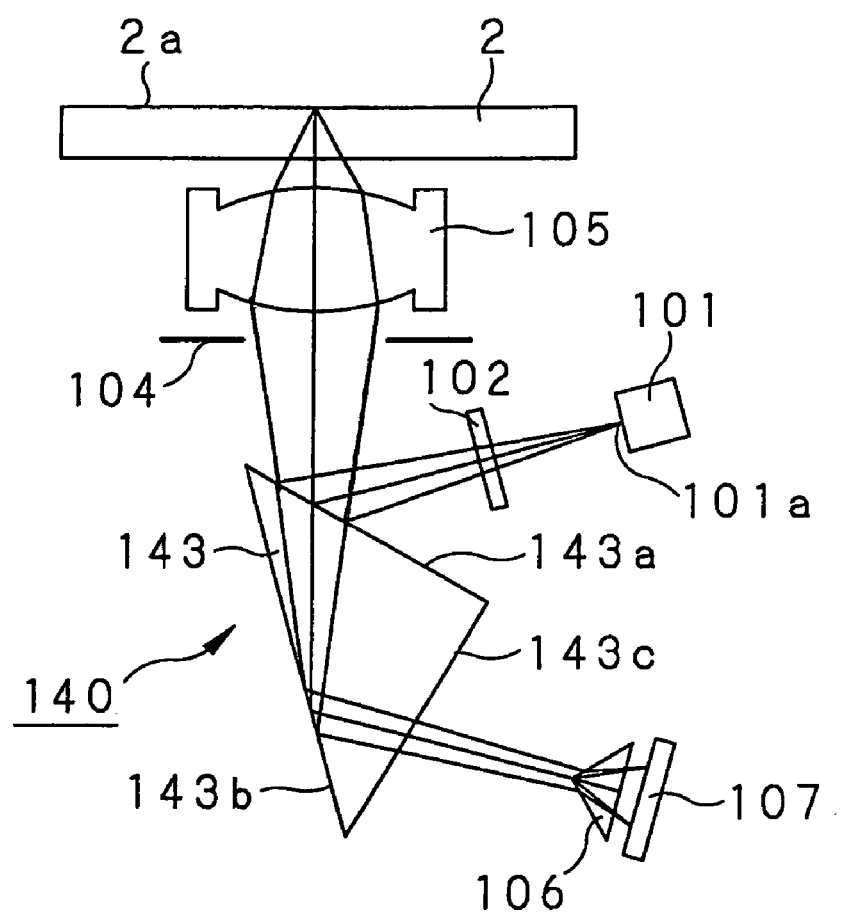
FIG. 27 is a schematic side elevation of a still yet another variant of the optical system of the optical pickup provided in the optical disk drive according to the present invention.

In a fourth example, the optical pickup 3 includes an optical system 140 that reads information from the optical disk 2, and a lens driving mechanism (not shown) that moves an objective lens included in the optical system 140 and which will be described in detail later, as shown in FIG. 27 for example. The optical pickup 3 including the optical system 140 will be described below, but it should be noted that the same or similar elements of this optical pickup 3 using the optical system 140 as or to those of the optical pickup 3 using the optical system 100 will be indicated with the same or similar references as or to those of the elements in the latter optical pickup 3 and will not be described in detail any more.

The optical system 140 of the optical pickup 3 includes, in the order following the light beam part, a light source 101 that emits a laser beam toward the optical disk 2, a diffraction grating 102 that splits the light beam emitted from the light source 101 into three beams, a beam splitter 143 that makes the outgoing three light beams from the diffraction grating 102 and the return light from the optical disk 2 travel along different light paths, respectively, a limiting aperture 104 that limits the outgoing light split by the beam splitter 143 to a predetermined numerical aperture NA, an objective lens 105 that focuses the outgoing light limited by the limiting aperture 104 onto the recording layer 2$a$ of the optical disk 2, a beam-splitting prism 106 that splits, into four beams, the return light reflected by the optical disk 2 and passing by the beam splitter 143, and a photodetector assembly 107 that detects the return light split by the beam-splitting prism 106.

The beam splitter 143 is a transparent member shaped to have a generally isosceles-triangular form having a first surface 143$a$, second surface 143$b$ perpendicular to the first surface 143$a$, and a third surface 143$c$ connected to the first and second surfaces 143$a$ and 143$b$. In the beam splitter 143, the light beam emitted from the light source 101 is reflected at the first surface 143$a$ toward the optical disk 2, and the return light from the optical disk 2 passes by the first surface 143$a$, is reflected at the second surface 143$b$ and passes by the third surface 143$c$, and travels to the beam-splitting prism 106. The beam splitter 143 provides a total reflection at the second surface 143$b$. The second surface 143$b$ is a reflecting film formed by evaporation or a similar process to provide a total reflection of the return light.

Also, the beam splitter 143 imparts a predetermined extent of astigmatism to the return light from the optical disk 2 for incidence upon the beam-splitting prism 106. The beam splitter 143 can easily adjust the defocusing of the light in relation to the optical disk 2 by adjusting the optical-axial position of the light beam from the light source 101.

On the first surface 143$a$ of the beam splitter 143, a half mirror is provided that reflects the light beam emitted from the double-wavelength light source 101, while allowing the return light from the optical disk 2 to pass through. Also, on the third surface 143$c$ of the beam splitter 143, there is provided a diffraction element that corrects the extent of astigmatism of the return light from the optical disk 2. The diffraction element will correct the astigmatism of the return light passing by the beam splitter 143 to an appropriate extent for focus adjustment. The above diffraction element may be a hologram element having a predetermined hologram pattern formed by etching or similar process, for example. In this case, the hologram element should preferably be a surface-relieved one or a brazed hologram, to improve the efficiency of diffraction.

As shown in FIGS. 20 and 21, the beam-splitting prism 106 is shaped to have the form of a generally regular-tetragonal pyramid and disposed for the center of the return light having passed by the beam splitter 143 to fall, at or close to the focus of the return light, on that of the apex of the tetragonal pyramid. The beam-splitting prism 106 is positioned on the light path of the return light having passed by the beam splitter 143 to split the return light into four beams.

In the optical disk drive 1 provided with the optical pickup 3 including the aforementioned optical system 140, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the objective lens 105 in the focusing and tracking directions, and thus the outgoing light is focused by the objective lens 105 onto a desired recording track on the optical disk 2. Then, in the optical disk drive 1, signals read by the optical pickup 3 are demodulated by the signal demodulation circuit 12 and error-corrected by the error correction circuit 13, and then delivered as read signal at the interface 14.

The outgoing light and return light travel along their respective light paths in the aforementioned optical system 140 of the optical pickup 3 as will be described below.

When the optical disk drive 1 reads information from the recording layer 2$a$ of the optical disk 2, the light beam emitted from the light source 101 is split by the diffraction grating 102 into three beams including a zero-order light beam and positive and negative first-order light beams as shown in FIG. 27. These three beams are reflected at the first surface 143$a$ of the beam splitter 143, limited by the limiting aperture 104 to a predetermined numerical aperture NA, and focused by the objective lens 105 onto the recording layer 2$a$ of the optical disk 2.

The return light from the recording layer 2$a$ of the optical disk 2 passes by the first surface 143$a$ of the beam splitter 143, is reflected at the second surface 143$b$, and has the astigmatism corrected at the third surface 143$c$ and passes by the latter surface. The return light corresponding to the zero-order light beam resulted from diffraction by the diffraction grating 102 is incident upon the apex of the beam-splitting prism 106. The return light incident upon the apex of the beam-splitting prism 106 having the form of a regular-tetragonal pyramid is incident upon each of the side faces of the regular-tetragonal pyramid, and thus refracted in different directions to be four return light beams which will be incident upon the light-detecting areas $a_3$, $b_3$, $c_3$ and $d_3$, respectively, of the main-beam photodetector 111 of the photodetector 107. Also, one of the return light from the optical disk 2, corresponding to the positive and negative first-order light beams coming from the diffraction grating 102 and passing by the beam splitter 143, is incident upon the light-detecting areas $e_3$ and $f_3$ of the side-beam photodetector 112 of the photodetector assembly 107, while the other return light is incident upon the light-detecting areas $g_3$ and $h_3$ of the side-beam photodetector 113 of the photodetector assembly 107.

In the optical pickup 3 including the optical system 140 configured as above, the astigmatism can appropriately be corrected by a diffraction grating provided in the light-outgoing area of the first surface 143$a$ of the beam splitter 143, and the return light can be split into four beams by the beam-splitting prism 106. So, the return light can appropriately be directed to each of the light-detecting areas of the photodetector assembly 107.

In the optical disk drive 1 including one of the aforementioned first to fourth examples of the optical pickup 3, the servo circuit 10 controls the lens driving mechanism according to a focusing error signal FE and tracking error signal TE detected by the optical pickup 3 including one of the optical systems 100, 120, 130 and 140 to move the objective lens 105 in focusing and tracking directions, to thereby focus the outgoing light on the recording layer 2a of the optical disk 2 for reading information from the optical disk 2.

Since the beam splitter 103, 123, 133 or 143 in the optical pickup 3 of the optical disk drive 1 can correct the astigmatism of return light from the optical disk 2 to an appropriate extent as above, it is possible to provide a more reliable focusing error signal by inhibiting the beam spot from being deformed for incidence of the return light upon the beam-splitting prism 106.

In the aforementioned optical disk drive 1, the optical pickup 3 can be configured similarly to the conventional optical pickup. Thus, the optical pickup 3 can be produced with a reduced cost, the optical elements can be disposed more freely and the optical system can be configured easily.

Further, since the beam-splitting prism 106 provided in the optical pickup 3 in the optical disc drive 1, shown in FIG. 19, 25, 26, or 27, splits, on the light path, the return light from the optical disk 2, so the main-beam photodetector 107 may have the light-detecting surface thereof divided into light-detecting areas $a_3$, $b_3$, $c_3$ and $d_3$ for detecting four return light beams, respectively, from the beam-splitting prism 106 with a lower precision of positioning than that required for an optical pickup in which a beam spot is divided by the parting lines of the main-beam photodetector.

Thus, the main-beam photodetector 107 in the optical pickup 3 of the optical disk drive 1 according to the present invention can be produced with a reduced cost, the position of the main-beam photodetector 107 can easily be adjusted in the process of producing the optical pickup 3, and the focusing error signal FE provided in the optical pickup 3 is more reliable.

Note that in the optical disk drive 1, the aforementioned beam-splitting prism 106 may be shaped to have the form of an octagonal pyramid, for example. In this case, the main-beam photodetector 111 of the photodetector assembly 107 may have the light-detecting surface thereof divided by radial parting lines into eight radial areas extending from the center. Also, the beam-splitting prism 106 is not limited in shape to any pyramid defined by flat surfaces but may be shaped to have a plurality of curved surfaces. In this case, the beam-splitting prism 106 is provided for the curved surfaces thereof to correspond to the divisional areas, respectively, of the main-beam photodetector 111 of the photodetector assembly 107.

In the optical disk drive 1 according to the present invention, the beam-splitting prism 106 may be a hologram element having a predetermined hologram pattern formed by etching or similar process. Also, in case a hologram element is used, it should preferably be a surface-relieved one or a brazed hologram, to improve the efficiency of diffraction.

Also, the optical disk drive 1 may use the grating 79 divided in four areas as shown in FIG. 16 in place of the beam-splitting prism 106. The grating 79 is equal in effect to the beam-splitting prism 106. The grating 79 has divisional areas $y_1$, $y_2$, $y_3$ and $y_4$ to assure the same effect. The divisional areas $y_1$, $y_2$, $y_3$ and $y_4$ have formed therein recesses directed differently from one area to another. More specifically, the recesses in the divisional areas $y_1$ and $y_3$ are directed perpendicularly to those in the divisional areas $y_2$ and $y_4$. The grating 79 diffracts the incident return light from the optical disk 2 correspondingly to the directions of the recesses in the divisional areas $y_1$, $y_2$, $y_3$ and $y_4$ and grating constants to provide and direct four beams to the main-beam photodetector 111 of the photodetector assembly 107. The grating 79 is a hologram element having a predetermined hologram pattern formed by etching or similar process, for example. In this case, the hologram element should preferably be a surface-relieved one or a brazed hologram, to improve the efficiency of diffraction.

Further, in the optical disk drive 1, the light path may be configured to have an internal reflecting surface which can be used to bend the light path for an improved freedom of the optical design.

In the optical disk drive 1 according to the present invention, the beam-splitting prism 106 may have an increased angle of refraction such that the return light from the optical disk 2, incident upon the beam-splitting prism 106, will form an angle of less than 45 deg. with each surface of the beam-splitting prism 106, that is, each surface of the beam-splitting prism 106 will be inclined less than 45 deg. in order to prevent the incident return light from being totally reflected. Thus, the split beams of the return light can be separated more from each other, the divisional surface areas of the main-beam photodetector 111 can be separated more from each other, and the main-beam and side-beam photodetectors 111 and 112 and 113 can be separated more from each other. Thus, the optical pickup 3 may be assembled with lower precision.

Note that in the optical disk drive 1, the so-called astigmatism is adopted in the aforementioned optical pickup 3 to provide a focusing error signal FE but any other light-detecting method such as the Foucault process or the like may be adopted for this purpose. In the optical disk drive 1, the optical pickup 3 adopts the so-called DPP (differential push-pull) method to provide a tracking error signal TE, but it should be noted that any other method of detection such as DPD (differential phase detection) may be adopted for this purpose.

In the aforementioned optical pickup 3 of the optical disk drive 1 according to the present invention, the element to correct the astigmatism is provided on the light-outgoing surface of the beam splitter 103, 123, 133 or 143, but it may be provided in any other location. It should preferably provided on the return light-incident or -outgoing surface of the beam-splitting prism 106.

Further in the optical pickup 3 of the optical disk drive 1, the diffraction element is used to correct the astigmatism. However, it should be noted that the astigmatism correcting element may not be limited to the diffraction element but the astigmatism may be corrected using a cylindrical surface.

In the foregoing, the optical pickups 3 including the optical systems 30 and 60 to correct the light-path deviation, and those with the optical systems 100, 120, 130 and 140 to correct the astigmatism, have been illustrated and described concerning their configuration and operation. However, the optical pickup 3 may use an optical system to correct both a light-path deviation and astigmatism.

The optical pickup 3 including an optical system that corrects both a light-path deviation and astigmatism is configured as will be illustrated and described by way of example in the following. It should be noted that the same or similar elements in the example optical system in the optical pickup 3 as or to those in the optical system of the optical pickup 3 including the optical system 30 or 60 will be indicated with the same or similar references as or to those for the elements in the optical pickup 3 using the optical system 30 or 60 and will not be described in detail any more.

Figure 28:
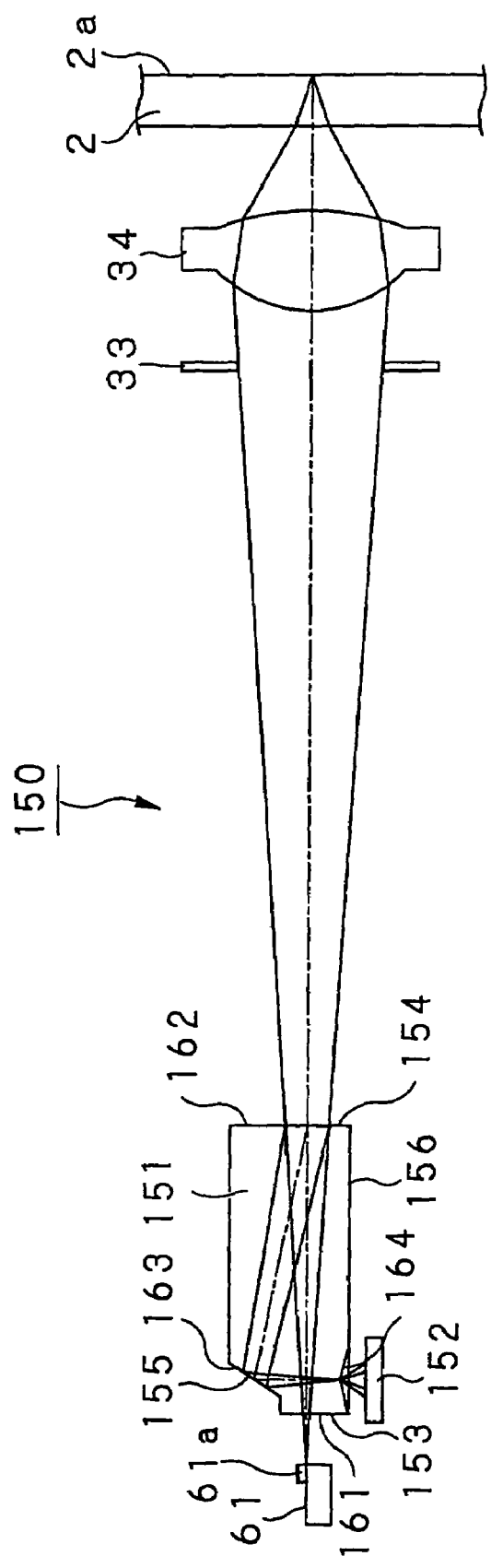
FIG. 28 is a schematic side elevation of a further variant of the optical system of the optical pickup provided in the optical disk drive according to the present invention.

As shown in FIG. 28, the optical system, generally indicated with a reference 150, used in the above optical pickup 3 includes, in the order following the light path, a light source 61 that emits a laser beam to the optical disk 2, a composite optical element 151 that splits the light beam emitted from the light source 61, separates the return light from the optical disk 2 and the outgoing light from each other, and further splits the return light separated from the outgoing light, a limiting aperture 33 that limits the light beam emitted from the light source 61 and passing by the composite optical element 151 to a predetermined numerical aperture NA, an objective lens 34 that focuses the outgoing light limited by the limiting aperture 33 onto the recording layer 2a of the optical disk 2, and a photodetector assembly 152 that detects the return light from the optical disk 2.

The light source 61 is a semiconductor laser that emits a laser beam having a wavelength of about 780 nm, for example, from the light-emitting point 61a.

Figure 29:
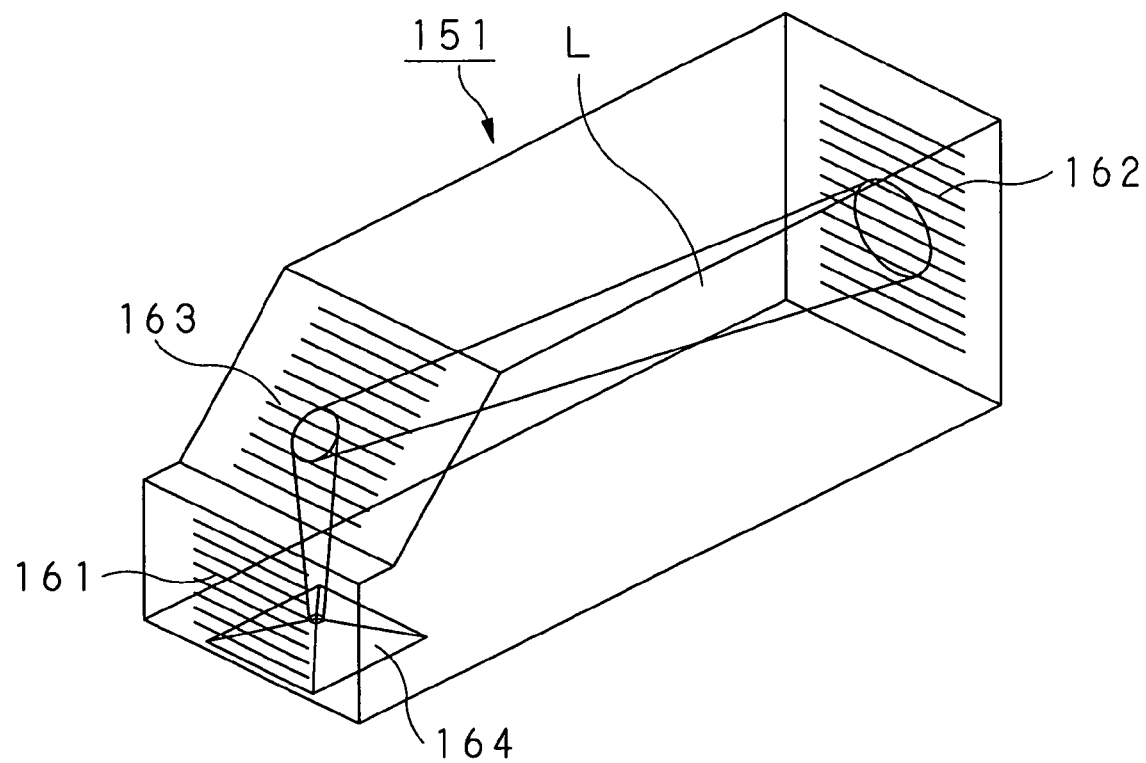
FIG. 29 is a perspective view of a composite optical element provided in the variant of the optical system of the optical pickup in FIG. 28.

As shown in FIGS. 28 and 29, the composite optical element 151 is formed like a block by injection molding of a resin material, for example. It has a first surface 153 facing the light source 61 and perpendicular to the optical axis of the light beam emitted from the light-emitting point 61a of the light source 61, a second surface 154 parallel and opposite to the first surface 153, a third surface 155 inclined a predetermined angle in relation to the second surface 154 and opposite to the latter, and a fourth surface 156 perpendicular to the first and second surfaces 153 and 154, and inclined a predetermined angle in relation to the third surface 155 and opposite to the latter.

On the first surface 153, a first diffraction grating 161 is provided that splits the light beam emitted from the light-emitting point 61a of the light source 61 into three beams including a zero-order light beam and positive and negative first-order light beams. The optical system 150 adopts the so-called DPP method (differential phase detection) to provide a tracking error signal TE. It provides a tracking servo control by detecting, at the photodetector assembly 152, the positive and negative first-order light beams from the first diffraction grating 161.

On the second surface 154, a second diffraction grating 162 is provided that diffracts the zero-order light beam and positive and negative first-order light beams, resulted from splitting of the return light from the optical disk 2 by the first diffraction grating 161, further splits the zero-order light beam and positive and negative first-order light beams into a zero-order light beam and positive and negative first-order light beams, and separates the light path of the positive first-order light beam as return light from that of the outgoing light.

On the above third surface 155, a hologram element 163 is provided disposed on the light path of the return light split by the second diffraction grating 162 to reflect and split, by diffraction, the return light into a zero-order light beam and positive and negative first-order light beams, and thus correct a light-path deviation, taking place in the second diffraction grating 162, of the negative first-order light beam, for example, as return light.

The hologram element 163 has a specific reflecting film provided on the third surface 155 to totally reflect incident return light. It functions as a so-called reflective diffraction grating. The hologram element 163 is a predetermined hologram pattern formed by etching. The hologram element 163 should preferably be a surface-relieved one or a brazed hologram, to improve the efficiency of diffraction.

On the fourth surface 156, a beam-splitting prism 164 is provided disposed on the return-light light path, of which the deviation has been corrected by the hologram element 163, to split the return light into four beams.

Figure 30:
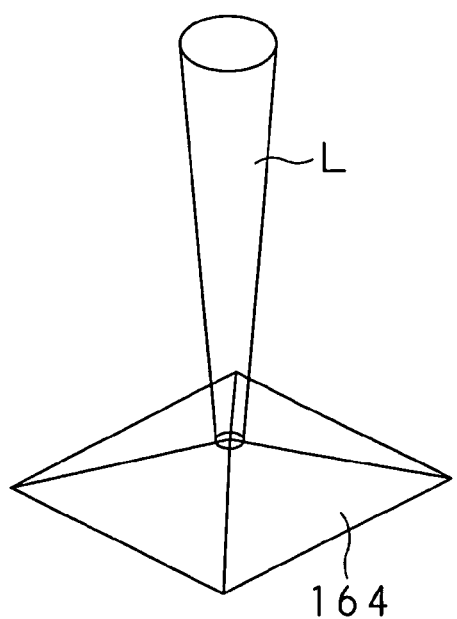
FIG. 30 is a perspective view of a beam-splitting prism in the composite optical element provided in the variant of the optical system of the optical pickup device in FIG. 28
Figure 31:
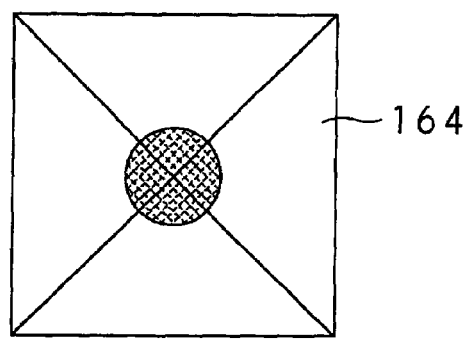
FIG. 31 is a view, from the return light-detecting side, of the beam-splitting prism provided in the composite optical element provided in the variant of the optical system of the optical pickup in FIG. 28.

As shown in FIGS. 30 and 31, the beam-splitting prism 164 is shaped to have the form of a generally regular-tetragonal pyramid, and disposed for the center of the negative first-order light beam reflected and diffracted by the hologram element 163 to fall, at or close to the focus of the diffracted light, on that of the apex of the regular-tetragonal pyramid.

The beam-splitting prism 164 is provided inside the composite optical element 151 with the apex thereof being directed inwardly of the latter. That is, the beam-splitting prism 164 is disposed in such a manner that the zero-order light beam of the three beams from the first diffraction grating 161 will be diffracted by the second diffraction grating 162, reflected and diffracted by the hologram element 163 for incidence upon the apex of the beam-splitting prism 164. It should be noted that the beam-splitting prism 164 is disposed for the regular-tetragonal pyramid bottom to be perpendicular to the optical axis of the negative first-order light beam reflected and diffracted by the hologram element 163.

The composite optical element 151 imparts a predetermined extent of astigmatism to the return light incident upon the beam-splitting prism 164 when the return light split by the second diffraction grating 162 passes by the composite optical element 151. The composite optical element 151 can easily adjust defocusing in relation to the optical disk 2 by adjusting the optical-axial position of the light beam emitted from the light source 61.

The composite optical element 151 is formed by injection molding of a resin material. Alternatively, it may have the first and second diffraction gratings 161 and 162, hologram element 163 and beam-splitting prism 164 formed thereon by etching or machining. It should be noted that the material of the composite optical element 151 is not limited to the resin material but may be a transparent optical material such as nitric material. Further, the composite optical element 151 may be formed from a combination of these optical materials so that one part thereof may be different in material from the other part.

Note here that by designing the composite optical element 151 on the basis of calculated grating constants of the second diffraction grating 162 and hologram element 163, angle formed between the third and second surfaces 155 and 154, etc., as in the foregoing description of the composite optical elements 32 and 62, it is possible to correct a light-path deviation of the return light, caused by a wavelength variation, and thus accurately direct the return light to the apex of the beam-splitting prism 164.

Also, in the composite optical element 151, the astigmatism can be corrected by a hologram element 167 provided on the third surface 155 to an optimum extent for the focusing servo as in the aforementioned optical systems 100, 120, 130 and 140.

In the composite optical element 151 configured as above, even if the return light from the optical disk 2, diffracted as a positive first-order light beam by the second diffraction grating 162, has the light path thereof deviated due to a variation in wavelength of the light beam emitted from the light source 61 when it is separated from the outgoing light, reflection and diffraction, by the hologram element 163, of the return light from the optical disk 2 as negative first-order always directs the return light to the apex of the beam-splitting prism 164 and thus accurately directs each return light split by the beam-splitting prism 164 to a predetermined position on each of the light-detecting areas of the photodetector assembly 152.

The limiting aperture 33 is disposed on the optical axis of the outgoing light having passed by the second diffraction grating 162 in the composite optical element 151.

The objective lens 34 is formed from at least one convex lens, and disposed to focus, on the optical disk 2, the light beam emitted from the light source 61 and limited by the limiting aperture 33.

Figure 32:
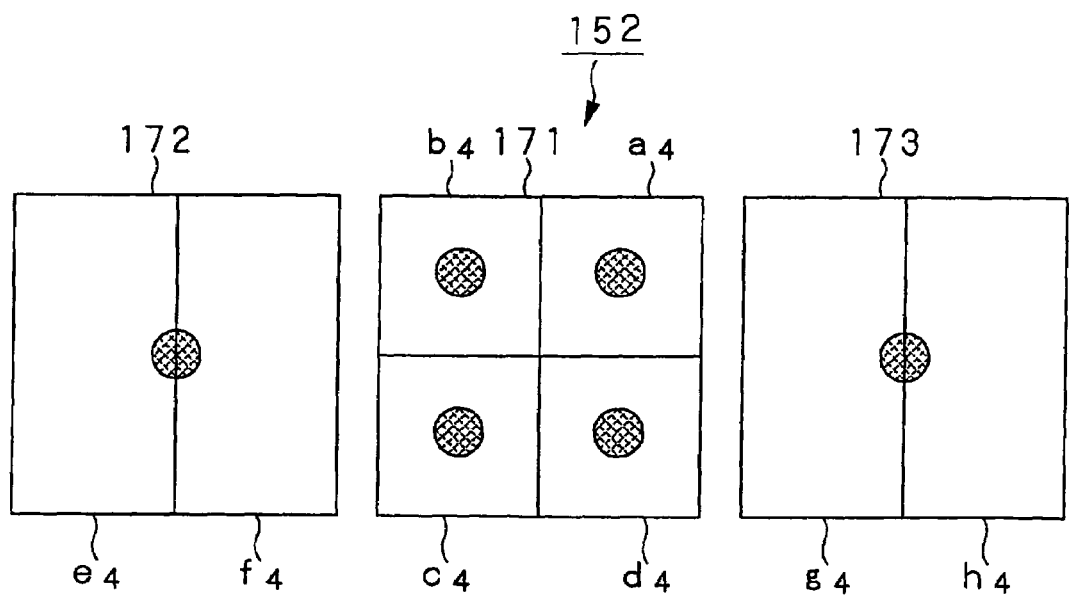
FIG. 32 explains a main-beam photodetector and side-beam photodetectors of a photodetector provided in the variant of the optical system of the optical pickup in FIG. 28.

As shown in FIG. 32, the photodetector assembly 152 includes a generally square main-beam photodetector 171 that detects a main beam that is a zero-order light beam from the first diffraction grating 161, and a pair of generally rectangular side-beam photodetectors 172 and 173 that detect two side beams that are positive and negative first-order light beams from the first diffraction grating 161. The photodetector assembly 152 is disposed in a position corresponding to each return light split by the beam-splitting prism 164 in the composite optical element 151. In the photodetector assembly 152, the generally square main-beam photodetector 171 is disposed in the center, and the generally rectangular side-beam photodetectors 172 and 173 in a set are disposed across the main-beam photodetector 171.

Also, the main-beam photodetector 171 in the photodetector assembly 152 has the surface thereof divided into light-detecting areas $a_4$, $b_4$, $c_4$ and $d_4$ by a set of parting lines perpendicular to each other. The light beams resulting from quadrisection of the return light by the beam-splitting prism 164 are incident upon the light-detecting areas $a_4$, $b_4$, $c_4$ and $d_4$, respectively.

The side-beam photodetectors 172 and 173 of the photodetector assembly 152 have the light-detecting surfaces thereof bisected by parting lines, respectively, into light-detecting areas $e_4$ and $f_4$, and $g_4$ and $h_4$. Upon the light-detecting areas $e_4$ and $f_4$, one of the return light beams from the optical disk 2 is incident, corresponding to the positive and negative first-order light beams from the first diffraction grating 161. Also, the other return light from the optical disk 2 is incident upon the light-detecting areas and $g_4$ and $h_4$.

The lens driving mechanism in the optical pickup 3 includes a lens holder to hold the objective lens 34, a lens holder support member to support the lens holder to be movable biaxially, namely, in a focusing direction parallel to the optical axis of the objective lens 34 and a tracking direction perpendicular to the optical axis of the objective lens 34, and an electromagnetic drive unit to move the lens holder biaxially under the action of an electromagnetic force (these components are not illustrated).

The above lens driving mechanism moves the objective lens 34 in a focusing direction according to a focusing error signal from the main-beam photodetector 171 in the photodetector assembly 152 and a tracking direction according to a tracking error signal from the side-beam photodetectors 172 and 173, to thereby focus the outgoing light onto a recording track on the recording layer $2a$ in the optical disk 2.

Note that the beam-splitting prism 164 included in the aforementioned composite optical element 151 may be shaped to have the form of an octagonal cone, for example. In this case, the main-beam photodetector 171 in the photodetector assembly 152 may be configured to have the light-detecting surface thereof divided radially from the center into eight areas. In the composite optical element 151, the beam-splitting prism 164 is provided inside the fourth surface 156. However, the beam-splitting prism 164 may be projected to outside the fourth surface 156. Further, the beam-splitting prism 164 in the composite optical element 151 is not limited in shape to the octagonal cone having flat surfaces but may be formed to have a plurality of curved surfaces. In this case, the light-detecting areas of the main-beam photodetector 171 in the photodetector assembly 152 will be formed correspondingly to the curved surfaces. Furthermore, each of the first and second diffraction gratings 161 and 162 in the composite optical element 151 may be a hologram element having a predetermined hologram pattern formed by etching or similar process, for example. In this case, the hologram element should preferably be a surface-relieved one or a brazed hologram, to improve the efficiency of diffraction.

The composite optical element 151 may use a grating 79 divided in four areas as shown in FIG. 16 in place of the beam-splitting prism 164. The grating 79 is equal in effect to the beam-splitting prism 164. The grating 79 has divisional areas $y_1$, $y_2$, $y_3$ and $y_4$ to assure the same effect. To assure the same effect as that of the beam-splitting prism 164, the divisional areas $y_1$, $y_2$, $y_3$ and $y_4$ have formed therein recesses directed differently from one area to another. More specifically, the recesses in the divisional areas $y_1$ and $y_3$ are directed perpendicularly to those in the divisional areas $y_2$ and $y_4$. The grating 79 diffracts the incident return light from the optical disk 2 correspondingly to the directions of the recesses in the divisional areas $y_1$, $y_2$, $y_3$ and $y_4$ and grating constants to provide and direct four beams to the main-beam photodetector 171 in the photodetector assembly 152. The grating 79 is a hologram element having a predetermined hologram pattern formed by etching or similar process, for example. In this case, the hologram element should preferably be a surface-relieved one or a brazed hologram, to improve the efficiency of diffraction.

Further, the composite optical element 151 may be configured to have an internal reflecting surface which can be used to bend the light path for an improved freedom of the optical design.

Furthermore, the composite optical element 151 may have an increased angle of refraction such that the return light from the optical disk 2, incident upon the beam-splitting prism 164, will form an angle of less than 45 deg. with each surface of the beam-splitting prism 164, that is, each surface of the beam-splitting prism 164 will be inclined less than 45 deg. in order to prevent the incident return light from being totally reflected. Thus, the split beams of the return light can be separated more from each other, the divisional surface areas of the main-beam photodetector 171 can be separated more from each other, and the main-beam and side-beam photodetectors 171 and 172 and 173 can be separated more from each other. Thus, the optical pickup 3 may be assembled with lower precision.

In the optical disk drive 1 incorporating the optical pickup 3 using the aforementioned optical system 150, the servo circuit 10 generates and supplies a control signal to the biaxial actuator of the optical pickup 3 on the basis of the focusing and tracking error signals detected by the optical pickup 3 from the return light from the optical disk 2, and the biaxial actuator moves the objective lens 34 in focusing and tracking directions according to the supplied focusing and tracking error signals, to thereby focus the outgoing light on a desired recording track on the optical disk 2. Then, in the optical disk drive 1, signals thus read by the optical pickup 3 are demodulated and error-corrected by the signal demodulation circuit 12 and error correction circuit 13, respectively, to provide a read signal from the interface 14.

The optical disk drive 1 incorporating the optical pickup 3 using the aforementioned optical system 150 will be described in detail concerning the light paths of the outgoing light and return light in the optical pickup 3 with reference to the accompanying drawings.

In the optical disk drive 1, to read information from the recording layer 2a in the optical disk 2, a light beam emitted from the light source 61 is split by the first diffraction grating 161 of the composite optical element 151 into three beams including a zero-order light beam and positive and negative first-order light beams, as shown in FIG. 28. Each of the three beams thus resulting from splitting of the outgoing light passes by the second diffraction grating 162 in the composite optical element 151, and is focused by the objective lens 34 onto the recording layer 2a in the optical disk 2.

The return light from the recording layer 2a in the optical disk 2 is diffracted by the second diffraction grating 162 of the composite optical element 151, and directed to the light path extending toward the third surface 155. The positive first-order light beam is incident upon the hologram element 163. The positive first-order light beam incident from the second diffraction grating 162 upon the hologram element 163 is reflected and diffracted by the hologram element 163, and the negative first-order light beam is incident upon the apex of the beam-splitting prism 164. The hologram element 163 corrects a light-path deviation of the positive first-order light beam from the second diffraction grating 162, caused by the second diffraction grating 162 itself, and also the astigmatism. The negative first-order light beam incident upon the apex of the regular-tetragonal pyramid shape of the beam-splitting prism 164 is incident upon each of the surfaces of the regular-tetragonal pyramid shape of the beam-splitting prism 164. The incident light beams upon the surfaces are refracted in different directions. Namely, the return light is split into four beams which will be incident upon the light-detecting areas $a_4$, $b_4$, $c_4$ and $d_4$ of the main-beam photodetector 171 of the photodetector assembly 152.

Figure 33A:
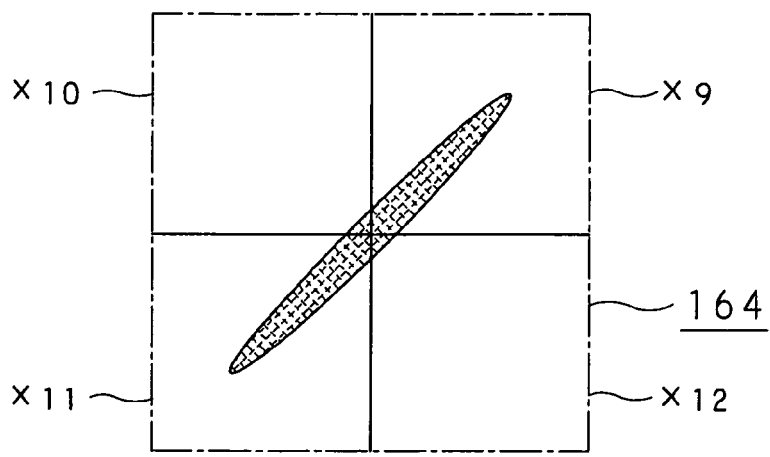

When the objective lens 34 is in the in-focus position in relation to the recording layer 2a in the optical disk 2, the return light diffracted by the hologram element 163, incident upon the apex of the beam-splitting prism 164, will take a generally circular form as shown in FIG. 33A.

On the other hand, when the objective lens 34 is excessively close to the recording layer 2a in the optical disk 2, the objective lens 34 will be off the in-focus position as shown in FIG. 33A. Thus, astigmatism will take place because the diffracted light passes by the composite optical element 151. Thus, the incident light upon the apex of the beam-splitting prism 164 will take the form of an ellipse whose major axis extends obliquely to the upper right as shown in FIG. 33A.

Figure 33B:
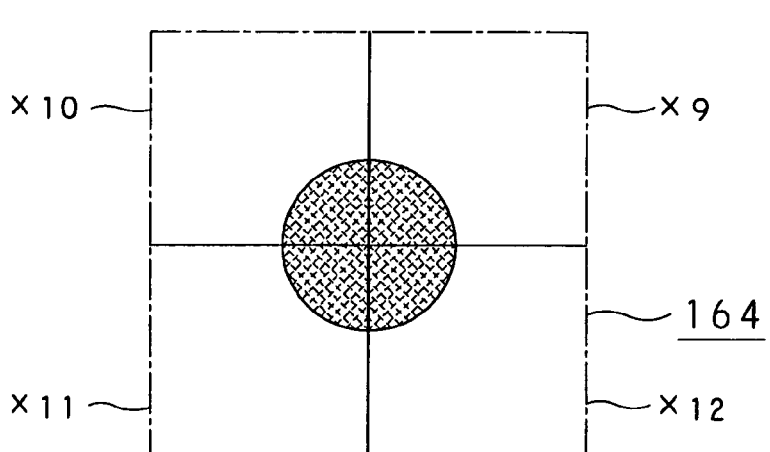
Figure 33C:
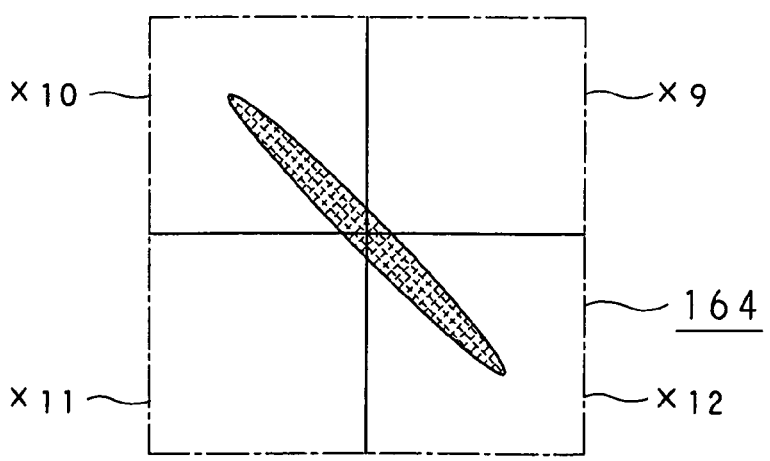

When the objective lens 34 is excessively apart from the recording layer 2a in the optical disk 2, the objective lens 34 will also be off the in-focus position as shown in FIG. 33C. Thus, astigmatism will also take place because the diffracted light passes by the composite optical element 151. Thus, the incident light upon the apex of the beam-splitting prism 164 will also take the form of an ellipse whose major axis extends obliquely to the upper left as shown in FIG. 33C.

Therefore, when the diffracted light is incident upon the apex of the beam-splitting prism 164 with the objective lens 34 being off the in-focus position, the majority of the diffracted light is incident upon one of two sets of opposite side faces $x_9$ and $x_{11}$ or $x_{10}$ and $x_{12}$, while an extremely small part of the diffracted light will be incident upon the other set of surfaces.

More specifically, the diffracted light is split in such a manner that the majority of the diffracted light having the elliptical shape as shown in FIG. 33A will be incident upon one set of opposite side faces $x_9$ and $x_{11}$ of the beam-splitting prism 164, while the extremely small part of the diffracted light will be incident upon the other set of opposite side faces $x_{10}$ and $x_{12}$. Also, the majority of the diffracted light having the elliptical shape as shown in FIG. 33C will be incident upon the other set of opposite side faces $x_{10}$ and $x_{12}$ of the beam-splitting prism 164, while the extremely small part of the diffracted light will be incident upon the one set of opposite side faces $x_9$ and $x_{11}$.

The return light from the optical disk 2, which is a part of the zero-order light beam from the first diffraction grating 161, is diffracted by the second diffraction grating 162 to be negative first-order light beam. This negative first-order light beam is incident upon each of the opposite side faces $x_9$ and $x_{10}$ and $x_{11}$ and $x_{12}$ of the beam-splitting prism 164, and diffracted in different directions. Thus, the return light is split into four return light beams which will be incident upon the light-detecting areas $a_4$, $b_4$, $c_4$ and $d_4$, respectively, of the main-beam photodetector 171 of the photodetector assembly 152.

Figure 34A:
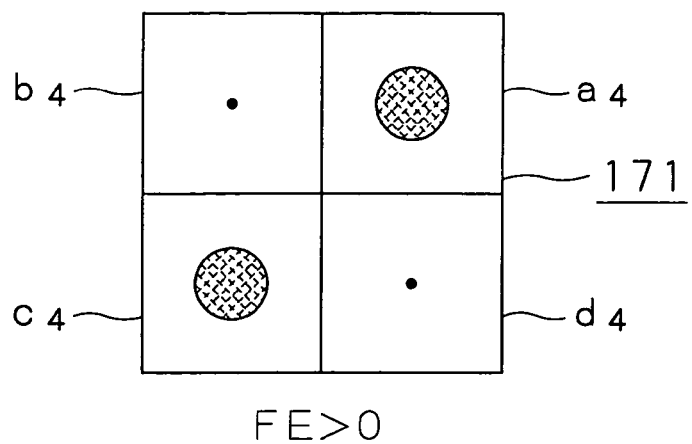
Figure 34B:
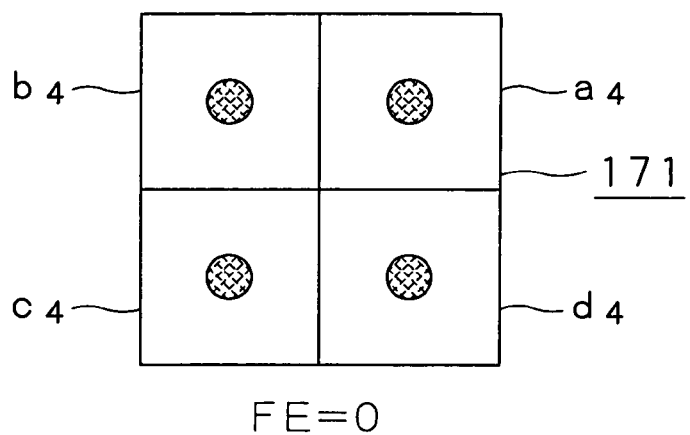
Figure 34C:
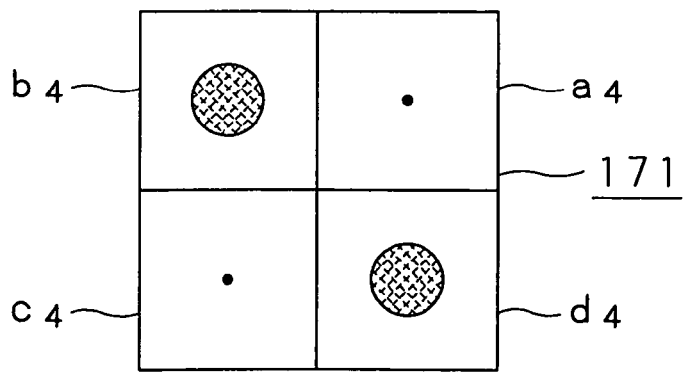

Thus, one of the two sets of opposite light-detecting areas $a_4$ and $c_4$, and $b_4$ and $d_4$, of the main-beam photodetector 171 detects a larger amount of light, while the other set of opposite light-detecting areas will detect a smaller amount of light, as shown in FIGS. 34A and 34C.

More particularly, when the diffracted light having the elliptic shape as shown in FIG. 34A is incident upon the beam-splitting prism 164, the set of opposite light-detecting areas $a_4$ and $c_4$ of the main-beam photodetector 171 will detect a larger amount of light, while the other set of opposite light-detecting areas $b_4$ and $d_4$ will detect a smaller amount of light, as shown in FIG. 34A. Also, when the diffracted light having the elliptic shape as shown in FIG. 34C is incident upon the beam-splitting prism 164, the set of opposite light-detecting areas $b_4$ and $d_4$ of the main-beam photodetector 171 will detect a larger amount of light, while the other set of opposite light-detecting areas $a_4$ and $c_4$ will detect a smaller amount of light, as shown in FIG. 34C.

When the circular diffracted light as shown in FIG. 33B is incident upon the apex of the beam-splitting prism 164, both the sets of opposite light-detecting areas $a_4$ and $c_4$, and $b_4$ and $d_4$, of the main-beam photodetector 171 will detect an equal amount of light, as shown in FIG. 34B.

Therefore, given that outputs from the light-detecting areas $a_4$, $b_4$, $c_4$ and $d_4$ are $Sa_4$, $Sb_4$, $Sc_4$ and $Sd_4$, respectively, the main-beam photodetector 171 can calculate a focusing error signal FE by the following formula (25):

$$FE=(Sa_4+Sc_4)-(Sb_4+Sd_4) \quad (25)$$

More specifically, when the objective lens 34 is set in the in-focus position in relation to the recording layer 2a in the optical disk 2, the main-beam photodetector 91 calculates the formula (25) to provide a zero focusing error signal FE. When the objective lens 34 is excessively close to the recording layer 2a in the optical disk 2, the main-beam photodetector 171 calculates the formula (25) to provide a positive focusing error signal FE. Also, when the objective lens 34 is excessively apart from the recording layer 2a in the optical disk 2, the main-beam photodetector 171 calculates the formula (25) to provide a negative focusing error signal FE.

The main-beam photodetector 171 in the photodetector assembly 152 calculates a focusing error signal FE on the basis of outputs from the light-detecting areas $a_4$, $b_4$, $c_4$ and $d_4$ on each of which the incident light defines a beam spot, and provides a read signal.

Also, the positive and negative first-order light beams, resulting from splitting of the return light from the optical disk 2 by the first diffraction grating 161, are incident upon the light-detecting areas $e_4$ and $f_4$, and $g_4$ and $h_4$ of the pair of side-beam photodetectors 172 and 173, respectively.

Therefore, given that outputs from the light-detecting areas $e_4$ and $f_4$, and $g_4$ and $h_4$ of the pair of side-beam photodetectors 172 and 173 are $Se_4$ and $Sf_4$, and $Sg_4$ and $Sh_4$, respectively, a tracking error signal TE can be calculated as given by the following formula (26):

$$FE=(Sa_4+Sc_4)-(Sb_4+Sd_4)-\alpha((Se_4-Sf_4)+((Sg_4-Sh_4)) \qquad (26)$$

In the optical disk drive 1, the servo circuit 10 controls the lens driving mechanism according to the focusing error signal FE and tracking error signal TE detected by the optical pickup 3 including the aforementioned optical system 150 to move the objective lens 34 in focusing and tracking directions. Thus, the outgoing light is focused on the recording layer 2a in the optical disk 2 to read information from the optical disk 2.

The second diffraction grating 162 in the composite optical element 151 provided in the optical system 150 in the optical pickup 3 of the optical disk drive 1 diffracts the return light from the optical disk 2 and the hologram element 163 also in the composite optical element 151 further diffracts, as return light, the positive first-order light beam from the second diffraction grating 162. Thus, the return light can be directed to an appropriate position and the astigmatism can appropriately be corrected by the hologram element 163 even if the light beam emitted from the light source 61 is varied in wavelength due to a variation of the ambient temperature.

Therefore, using the optical pickup simplified in structure with no increased number of parts as in the composite optical element 151 in comparison with the conventional optical system, the optical disk drive 1 can operate with an improved reliability on the focusing error signal FE.

In the optical system 150 included in the optical pickup 3 of the optical disk drive 1, the outgoing light and return light can be separated from each other, and both the light-path deviation caused by a variation in wavelength of the light beam emitted from the light source 61 and the astigmatism can be corrected, by the composite optical element 151 alone. So, the optical system 150 needs only a minimum number of optical parts, can be configured more simply and smaller and produced with less cost.

Therefore, because of the composite optical element 151 in the optical system 150 used in the optical pickup 3, the optical disk drive 1 can be produced with a higher productivity and a reduced cost and have improved reliability.

With the aforementioned main-beam photodetector, the beam spot is divided by the parting lines. In the optical pickup 3 (shown in FIG. 28) in the optical disk drive 1, however, the beam-splitting prism 151 provided in the composite optical element 164 splits, on the light path, the return light from the optical disk 2. So, by designing the main-beam photodetector 171 for a predetermined size of each of the light-detecting areas $a_4$, $b_4$, $c_4$ and $d_4$ upon which the four return light beams from the beam-splitting prism 164 are incident, respectively, the main-beam photodetector may not have the light-detecting surface thereof divided in the light-detecting areas with a high precision.

Thus, the main-beam photodetector 171 in the optical pickup 3 of the optical disk drive 1 according to the present invention can be produced with a reduced cost, the position of the main-beam photodetector 171 can easily be adjusted in the process of producing the optical pickup 3, and the focusing error signal FE provided in the optical pickup 3 has improved reliability.

Note that in the optical disk drive 1, the so-called astigmatism is employed in the aforementioned optical pickup 3 to provide a focusing error signal FE but any other light-detecting method such as the Foucault process or the like may be adopted for this purpose.

Further in the optical disk drive 1, if it is difficult to form a single element such as the aforementioned composite optical element 151, an optical system in which the optical elements are disposed separately as above may be used to assure the same function as that of such a composite optical element.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in

INDUSTRIAL APPLICABILITY

As having been described in the foregoing, in the optical pickup device according to the present invention, use of the aforementioned composite optical element in the optical pickup of the optical disk drive makes it possible to produce the optical pickup with a higher productivity and a reduced cost, and provide a more reliable focusing error signal.

Further, in the optical disk drive according to the present invention, use of the aforementioned composite optical element in an optical pickup makes it possible to produce the optical pickup with a higher productivity and a reduced cost, and provide a more reliable focusing error signal.

In the optical device used in the optical pickup device according to the present invention, a light-path deviation caused by a variation in wavelength of a light beam emitted from the light source is corrected by the wavelength variation correcting means when return light from an optical disk is split by the diffraction means, whereby the light can appropriately be directed to the light-detecting means. Thus, a more reliable focusing error signal can be provided in the optical disk drive.

In another optical device according to the present invention, the astigmatism can be corrected to an optimum extent when return light from the optical disk has the light path thereof separated from that of the outgoing light (light emitted from the light source), whereby the return light can be shaped appropriately for guiding to the return-light splitting means. Thus, a more reliable focusing error signal can be provided in the optical disk drive.

Using the composite optical element according to the present invention in an optical pickup device makes it possible to produce the optical pickup with a higher productivity and a reduced cost, and provide a more reliable focusing error signal.

The invention claimed is:
1. An optical pickup device comprising:
    a light source that emits a light beam having a predetermined wavelength;
    an objective lens that focuses the light beam emitted from the light source onto an optical disk and collects return light from the optical disk;

a composite optical element including a diffraction element that allows the light beam emitted from the light source to pass through, while diffracting the return light from the optical disk, and a light-path deviation correcting means disposed in a position where the return light diffracted by the diffraction element is incident to correct a light-path deviation of the return light, caused in the diffraction element by a variation in wavelength of the light beam emitted from the light source and direct the return light to a predetermined position; and a light-detecting means for detecting, at a plurality of light-detecting areas thereof, the return light having the light-path deviation thereof corrected by the light-path deviation correcting means, wherein the composite optical element further includes a return-light splitting means disposed in a position where the return light having a light-path deviation thereof corrected by the light-path deviation correcting means is incident to split the return light into a plurality of beams and direct the plurality of beams to the plurality of light-detecting areas of the light-detecting means, wherein the composite optical element is a combination of the diffraction element, light-path deviation correcting means and the return-light splitting means, formed integrally with each other by molding a resin material, wherein the return-light splitting means is a prism having a plurality of flat or curved surfaces, wherein the prism included in the composite optical element is shaped to have the form of a regular-tetragonal pyramid and splits, into four beams, the return light having a light-path deviation thereof corrected by the light-pathdeviation correcting means; and the light-detecting means has the light-detecting area thereof quartered to detect four return light beams, respectively, from the prism included in the composite optical element.

2. The optical pickup device as set forth in claim 1, wherein the prism is configured so that the return light having a light-path deviation thereof corrected by the light-path deviation correcting means is incident at an angle of less than 45 deg. upon each surface of the prism.

3. The optical pickup device as set forth in claim 1, wherein the light-path deviation correcting means corrects astigmatism taking place on the light path of the light beam emitted from the light source.

4. An optical pickup device comprising:

a light source that emits a light beam having a predetermined wavelength;

an objective lens that focuses the light beam emitted from the light source onto an optical disk and collects return light from the optical disk;

a composite optical element including a diffraction element that allows the light beam emitted from the light source to pass through, while diffracting the return light from the optical disk, and a light-path deviation correcting means disposed in a position where the return light diffracted by the diffraction element is incident to correct a light-path deviation of the return light, caused in the diffraction element by a variation in wavelength of the light beam emitted from the light source and direct the return light to a predetermined position; and a light-detecting means for detecting, at a plurality of light-detecting areas thereof, the return light having the light-path deviation thereof corrected by the light-path deviation correcting means, wherein the composite optical element further includes a reflecting means for reflecting the light beam emitted from the light source on the light path of the light beam toward the diffraction element and/or the return light diffracted by the diffraction element on the light path of the light beam toward the predetermined position.

5. The optical pickup device as set forth in claim 4, wherein the composite optical element is a combination of the diffraction element, light-path deviation correcting means and reflecting means, formed integrally with each other by molding a resin material.

6. An optical pickup device comprising:

a light source that emits a light beam having a predetermined wavelength;

an objective lens that focuses the light beam emitted from the light source onto an optical disk and collects return light from the optical disk;

a composite optical element including a diffraction element that allows the light beam emitted from the light source to pass through, while diffracting the return light from the optical disk, and a light-path deviation correcting means disposed in a position where the return light diffracted by the diffraction element is incident to correct a light-path deviation of the return light, caused in the diffraction element by a variation in wavelength of the light beam emitted from the light source and direct the return light to a predetermined position; and a light-detecting means for detecting, at a plurality of light-detecting areas thereof, the return light having the light-path deviation thereof corrected by the light-path deviation correcting means, wherein:

the composite optical element further includes another diffraction element disposed between the light source and first diffraction element to split the light beam emitted from the light source into three beams including a zero-order light beam and positive and negative first-order light beams; and the light-detecting means detects the zero-order light beam, resulted from splitting, by the second diffraction element, of the return light split by the return-light splitting means to provide a focusing error signal, and also the positive and negative first-order light beams from the second diffraction element to provide a tracking error signal.

7. The optical pickup device as set forth in claim 6, wherein the composite optical element is a combination of the diffraction element, light-path deviation correcting means and second diffraction element, formed integrally with each other by molding a resin material.

8. The optical pickup device as set forth in claim 6, wherein the second diffraction element is a hologram.

9. An optical pickup device comprising:

a light source that emits a light beam having a predetermined wavelength;

an objective lens that focuses the light beam emitted from the light source onto an optical disk and collects return light from the optical disk;

a composite optical element including a diffraction element that allows the light beam emitted from the light source to pass through, while diffracting the return light from the optical disk, and a light-path deviation correcting means disposed in a position where the return light diffracted by the diffraction element is incident to correct a light-path deviation of the return light, caused in the diffraction element by a variation in wavelength of the light beam emitted from the light source and direct the return light to a predetermined position;

a light-detecting means for detecting, at a plurality of light-detecting areas thereof, the return light having the light-path deviation thereof corrected by the light-path deviation correcting means; and a light shielding means provided between the light source and diffraction element to shield light beams other than valid ones on the light path of the light emitted from the light source.

10. An optical pickup device comprising:

a light source that emits a light beam having a predetermined wavelength;

an objective lens that focuses the light beam emitted from the light source onto an optical disk and collects return light from the optical disk;

a composite optical element including a diffraction element that allows the light beam emitted from the light source to pass through, while diffracting the return light from the optical disk, and a light-path deviation correcting means disposed in a position where the return light diffracted by the diffraction element is incident to correct a light-path deviation of the return light, caused in the diffraction element by a variation in wavelength of the light beam emitted from the light source and direct the return light to a predetermined position;

a light-detecting means for detecting, at a plurality of light-detecting areas thereof, the return light having the light-path deviation thereof corrected by the light-path deviation correcting means; and a light shielding means for shielding light beams other than valid ones on the light path of the return light directed by the light-path deviation correcting means to a predetermined position.

11. An optical pickup device comprising:

a light source that emits a light beam having a predetermined wavelength;

a beam splitter that makes the light beam emitted by the light source travel along a light path and return light from an optical disk travel along another light path, and corrects astigmatism on the light path of the return light;

an objective lens that focuses the light beam emitted from the light source onto an optical disk and collects return light from the optical disk;

a return-light splitting means disposed in a position where the return light split by the beam splitter is incident to split the return light into a plurality of beams; and a light-detecting means for detecting, at a plurality of light-detecting areas thereof, the plurality of beams resulting from the splitting of the return light by the return-light splitting means and the return light splitting means being a prism having a plurality of flat or curved surfaces, and wherein the prism is shaped to have the form of a regular-tetragonal pyramid and splits, into four beams, the return light having a light-path deviation thereof corrected by the light-path deviation correcting means.

12. The optical pickup device as set forth in claim 11, wherein the prism is configured so that the return light split by the beam splitter will be incident at an angle of less than 45 deg. upon each surface of the prism.

13. The optical pickup device as set forth in claim 11, further comprising another diffraction element disposed between the light source and beam splitter to split the light beam emitted from the light source into three beams including a zero-order light beam and positive and negative first-order light beams.

14. An optical pickup device comprising:

a light source that emits a light beam having a predetermined wavelength;

a beam splitter that makes the light beam emitted from the light source travel along a light path and return light from an optical disk travel along another light path, and corrects astigmatism on the light path of the return light;

an objective lens that focuses the light beam emitted from the light source onto the optical disk and collects the return light from the optical disk;

a return-light splitting means disposed in a position where the return light split by the beam splitter is incident to split the return light into a plurality of beams;

a light-detecting means for detecting, at a plurality of light-detecting areas thereof, the plurality of beams resulting from splitting of the return light by the return-light splitting means, and the return-light splitting means being a prism having a plurality of flat or curved surfaces, and a reflecting means for reflecting the light beam emitted from the light source on the light path of the light beam toward the beam splitter and/or the return light split by the beam splitter on the light path of the light beam toward the predetermined position.

15. An optical pickup device comprising:

a light source that emits a light beam having a predetermined wavelength;

a beam splitter that makes the light beam emitted from the light source travel along a light path and return light from an optical disk travel along another light path, and corrects astigmatism on the light path of the return light;

an objective lens that focuses the light beam emitted from the light source onto the optical disk and collects the return light from the optical disk;

a return-light splitting means disposed in a position where the return light split by the beam splitter is incident to split the return light into a plurality of beams; and a light-detecting means for detecting, at a plurality of light-detecting areas thereof, the plurality of beams resulting from splitting of the return light by the return-light splitting means, and the return-light splitting means being a prism having a plurality of flat or curved surfaces, wherein the beam splitter is shaped to have a flat form having first and second surfaces, and reflects the light beam emitted from the light source at the first surface, while allowing the return light to pass through both the first and second surfaces.

16. An optical pickup device comprising:

a light source that emits a light beam having a predetermined wavelength;

a beam splitter that makes the light beam emitted from the light source travel along a light path and return light from an optical disk travel along another light path, and corrects astigmatism on the light path of the return light;

an objective lens that focuses the light beam emitted from the light source onto the optical disk and collects the return light from the optical disk;

a return-light splitting means disposed in a position where the return light split by the beam splitter is incident to split the return light into a plurality of beams; and a light-detecting means for detecting, at a plurality of light-detecting areas thereof, the plurality of beams resulting from splitting of the return light by the return-light splitting means, and the return-light splitting means being a prism having a plurality of flat or curved surfaces, wherein the beam splitter is shaped to have a generally flat form having first and second surfaces, reflects the light beam emitted from the light source at the first surface, receives the return light incident upon the first surface, and reflects it at the second surface, while allowing it to pass through the first surface.

17. An optical pickup device comprising:
a light source that emits a light beam having a predetermined wavelength;
a beam splitter that makes the light beam emitted from the light source travel along a light path and return light from an optical disk travel along another light path, and corrects astigmatism on the light path of the return light;
an objective lens that focuses the light beam emitted from the light source onto the optical disk and collects the return light from the optical disk;
a return-light splitting means disposed in a position where the return light split by the beam splitter is incident to split the return light into a plurality of beams; and
a light-detecting means for detecting, at a plurality of light-detecting areas thereof, the plurality of beams resulting from splitting of the return light by the return-light splitting means, and the return-light splitting means being a prism having a plurality of flat or curved surfaces,
wherein the beam splitter is shaped to have at least first, second and third surfaces disposed to form a isosceles triangle, reflects the light beam emitted from the light source at the first surface, receives the return light incident upon the first surface, and reflects it at the second surface, while allowing it to pass through the third surface.

18. An optical pickup device comprising:
a light source that emits a light beam having a predetermined wavelength;
a beam splitter that makes the light beam emitted from the light source travel along a light path and return light from an optical disk travel along another light path, and corrects astigmatism on the light path of the return light;
an objective lens that focuses the light beam emitted from the light source onto the optical disk and collects the return light from the optical disk;
a return-light splitting means disposed in a position where the return light split by the beam splitter is incident to split the return light into a plurality of beams;
a light-detecting means for detecting, at a plurality of light-detecting areas thereof, the plurality of beams resulting from splitting of the return light by the return-light splitting means, and the return-light splitting means being a prism having a plurality of flat or curved surfaces, and
a light shielding means provided between the light source and diffraction element to shield light beams other than valid ones on the light path of the light beam emitted from the light source.

19. An optical pickup device comprising:
a light source that emits a light beam having a predetermined wavelength;
a beam splitter that makes the light beam emitted from the light source travel along a light oath and return light from an optical disk travel along another light path, and corrects astigmatism on the light path of the return light;
an objective lens that focuses the light beam emitted from the light source onto the optical disk and collects the return light from the optical disk;
a return-light splitting means disposed in a position where the return light split by the beam splitter is incident to split the return light into a plurality of beams;
a light-detecting means for detecting, at a plurality of light-detecting areas thereof, the plurality of beams resulting from splitting of the return light by the return-light splitting means, and the return-light splitting means being a prism having a plurality of flat or curved surfaces, and
a light shielding means for shielding light beams other than valid ones on the light path of the return light split by the beam splitter.

20. An optical disk drive including an optical pickup that writes and/or reads information to and/or from an optical disk, and a disk rotation driving means that drives to rotate the optical disk, the optical pickup comprising:
a light source that emits a light beam having a predetermined wavelength;
an objective lens that focuses the light beam emitted from the light source onto the optical, disk and collects return light from the optical disk;
a composite optical element including a diffraction element that allows the light beam emitted from the light source to pass through, while diffracting the return light from the optical disk, and a light-path deviation correcting means disposed in a position where the return light diffracted by the diffraction element is incident to correct a light-path deviation of the return light, caused in the diffraction element by a variation in wavelength of the light beam emitted from the light source, and direct the return light to a predetermined position; and
a light-detecting means for detecting, at a plurality of light-detecting areas thereof, the return light having the light-path deviation thereof corrected by the light-path deviation correcting means
wherein the composite optical element further includes a reflecting means for reflecting the light beam emitted from the light source on the light path of the light beam toward the diffraction element and/or the return light diffracted by the diffraction element on the light path of the light beam toward the predetermined position.

* * * * *

UNITED STATES PATENT AND TRADEMARK OFFICE
CERTIFICATE OF CORRECTION

PATENT NO. : 7,064,900 B2  
APPLICATION NO. : 10/492657  
DATED : June 20, 2006  
INVENTOR(S) : Norio Fukasawa et al.

It is certified that error appears in the above-identified patent and that said Letters Patent is hereby corrected as shown below:

Column 47:  
Line 33, "light-pathdeviation" should read -- light-path deviation --.

Column 52:  
Line 6, "oath" should read -- path --.  
Line 35, "optical,disk" should read -- optical disk --.

Signed and Sealed this

Thirteenth Day of March, 2007

JON W. DUDAS  
*Director of the United States Patent and Trademark Office*